(12) United States Patent
Siu et al.

(10) Patent No.: US 12,121,185 B2
(45) Date of Patent: Oct. 22, 2024

(54) LOCKING MECHANISM

(71) Applicant: BREVILLE PTY LIMITED, Alexandria (AU)

(72) Inventors: Eddie Siu, Alexandria (AU); Khon Thai, Alexandria (AU); Bin Geng, Alexandria (AU); Raymond George Corkin, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 740 days.

(21) Appl. No.: 17/256,972

(22) PCT Filed: Jun. 28, 2019

(86) PCT No.: PCT/AU2019/050681
§ 371 (c)(1),
(2) Date: Dec. 29, 2020

(87) PCT Pub. No.: WO2020/000050
PCT Pub. Date: Jan. 2, 2020

(65) Prior Publication Data
US 2021/0177211 A1 Jun. 17, 2021

(30) Foreign Application Priority Data

Jun. 29, 2018 (AU) ................................ 2018902354
Dec. 21, 2018 (AU) ................................ 2018904901

(51) Int. Cl.
*A47J 43/07* (2006.01)
*A23N 1/02* (2006.01)
(Continued)

(52) U.S. Cl.
CPC ............ *A47J 43/0772* (2013.01); *A23N 1/02* (2013.01); *A47J 36/10* (2013.01); *A47J 43/0761* (2013.01); *A47J 27/0804* (2013.01); *A47J 43/075* (2013.01)

(58) Field of Classification Search
CPC ................ A47J 27/0804; A47J 27/0806; A47J 27/0808; A47J 27/0811; A47J 43/046;
(Continued)

(56) References Cited

U.S. PATENT DOCUMENTS

| 4,111,372 A | 9/1978 | Hicks et al. |
| 2007/0209528 A1 | 9/2007 | Chang |

(Continued)

FOREIGN PATENT DOCUMENTS

| DE | 2014112267 A1 * | 3/2016 | .......... A47J 43/0761 |
| EP | 0963726 A1 | 12/1999 | |

(Continued)

OTHER PUBLICATIONS

European Search Report for EP 19827032.4 dated Mar. 3, 2022.
International Search Report for Application No. PCT/AU2019/050681, mailing date Sep. 18, 2019.

*Primary Examiner* — Reginald Alexander
(74) *Attorney, Agent, or Firm* — Tarolli, Sundheim, Covell & Tummino LLP

(57) ABSTRACT

A locking mechanism (104) for a kitchen device (101) having a vessel (105), the vessel (105) providing an interior space and having a rim (106) surrounding an opening (105a) of the space, and a lid (121) to engage the rim (106) to close the space, the locking mechanism (104) comprising: a retaining arm (107), the retaining arm (107) being attachable to the device (101) and movable between a free position, wherein the lid (121) is movable with respect to the vessel (105), and a retaining position, wherein the retaining arm (107) is engageable with the lid (121) to retain the lid (121)

(Continued)

against the vessel (105) to at least partly close the opening (105*a*); a securing assembly (108), the securing assembly (108) being attachable to the device (101) to engage the retaining arm (107) and movable between a free position, wherein the retaining arm (107) may be moved between the free position and the retaining position, and a securing position, wherein the securing assembly (108) engages the retaining arm (107) to prevent movement of the retaining arm (107) from the retaining position; a processor; and an electric motor (157) operated by the processor to move the securing assembly (108) between the free position and the securing position.

16 Claims, 65 Drawing Sheets

(51) Int. Cl.
*A47J 36/10* (2006.01)
*A47J 27/08* (2006.01)

(58) Field of Classification Search
CPC ...... A47J 43/0761; A47J 43/075; A47J 36/10; A23N 1/02
See application file for complete search history.

(56) References Cited

U.S. PATENT DOCUMENTS

| | | |
|---|---|---|
| 2008/0217446 A1 | 9/2008 | Clapp et al. |
| 2015/0037480 A1 | 2/2015 | Carlson |
| 2015/0216358 A1 | 8/2015 | Xu et al. |
| 2016/0345766 A1 * | 12/2016 | Sapire ................ A47J 27/0815 |

FOREIGN PATENT DOCUMENTS

| | | | | |
|---|---|---|---|---|
| EP | 1222888 A2 * | 7/2002 | .......... | A47J 27/0811 |
| EP | 2005867 A1 | 12/2008 | | |
| KR | 200449308 A1 * | 6/2010 | ............ | A47J 43/046 |
| WO | WO-2016102090 A1 * | 6/2016 | .......... | A47J 27/0804 |
| WO | WO 2019/012208 A1 | 1/2019 | | |

* cited by examiner

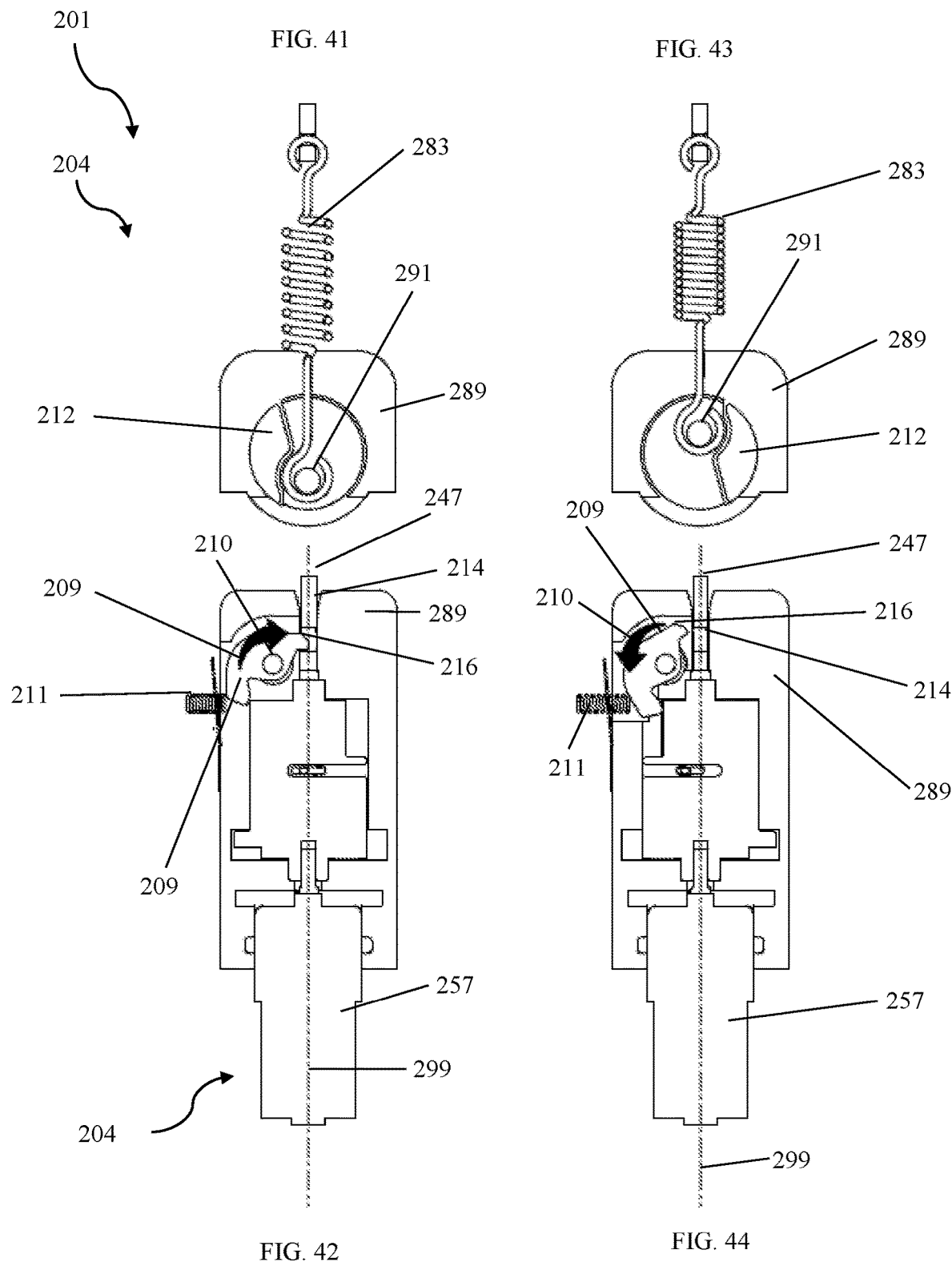

center position over-center
clamped position

LOCKING MECHANISM

FIELD

This invention relates to a locking mechanism.

BACKGROUND

Recently, kitchen devices performing a variety of stirring, processing, blending and/or heating of ingredients have become popular in the consumer and commercial markets. These devices may be referred to as multicookers. A problem that has emanated from the increasing popularity of such multicookers is that stirring and/or blending heated substances such that they have large amounts of kinetic as well as thermal energy can present a substantial risk to users operating the device. Therefore, safety systems have been integrated into devices performing kinetic operations such as stirring or blending on heated ingredients to decrease the risk of users being exposed to and/or injured by the heated ingredients.

However, presently known safety systems, such as the one disclosed in US 2013/0206771 A1, provide insufficient feedback to users that the safety system has completed its locking process. Such simple systems may be sufficient for blenders, however food processors capable of heating and cooking cannot rely on this type of arrangement alone, as manual and automatic systems alone cannot provide definitive feedback to the device, as well as the user, about the state of the safety system. Manual locking arms are generally only suitable for devices that operate at lower kinetic energies such as food processors. In kitchen device with high kinetic energies electronic and/or motorised safety systems are desirable. The kitchen device is then able to control and time the safety system to ensure that the ingredients have dissipated adequate kinetic energy to ensure the kitchen device can be opened safely. Traditionally, high kinetic energy blenders do not have this requirement as the ingredients are cold and would not cause serious injury if they are opened prematurely. However, heated kitchen devices with blending capability require electronically controlled safety systems to avoid this hazard.

Further, presently known safety systems can provide impediments, due to their physical location, against locating a lid on top of the vessel, both of which are parts of the kitchen device. Presently known safety systems can also be hazardous to users, and the system itself, due to exposed moving parts. Some solutions have implemented purely automatic safety systems, however the lack of manual feedback may be undesirable for a positive user experience.

SUMMARY OF INVENTION

It is an object of the present invention to substantially overcome the above problems or at least provide a useful alternative to the above described arrangements.

In a first aspect, the present invention provides a locking mechanism for a kitchen device having a vessel, the vessel providing an interior space and having a rim surrounding an opening of the space, and a lid to engage the rim to close the space, the locking mechanism comprising:
  a retaining arm, the retaining arm being attachable to the device and movable between a free position, wherein the lid is movable with respect to the vessel, and a retaining position, wherein the retaining arm is engageable with the lid to retain the lid against the vessel to at least partly close the opening;
  a securing assembly, the securing assembly being attachable to the device to engage the retaining arm and movable between a free position, wherein the retaining arm may be moved between the free position and the retaining position, and a securing position, wherein the securing assembly engages the retaining arm to prevent movement of the retaining arm from the retaining position;
  a processor; and
  an electric motor operated by the processor to move the securing assembly between the free position and the securing position.

Preferably, when the retaining arm is in the retaining position, the retaining arm is urged towards the vessel such that the lid is urged towards the vessel.

Preferably, the locking mechanism further comprises a locking spring, wherein the retaining arm is urged towards the vessel by the locking spring, wherein the locking spring is in a predetermined state when the retaining arm is in the free position, and the locking spring is in a tensioning state relative to the predetermined state when the retaining arm is in the retaining position,
  wherein the movement of the retaining arm from the free position to the retaining position moves the locking spring from the predetermined state to the tensioning state.

Preferably, the locking mechanism further comprises a securing sensor that communicates with the processor to indicate whether the securing assembly is in the securing position.

Preferably, the locking mechanism further comprises a retaining sensor that communicates with the processor to indicate whether the retaining arm is in the retaining position.

Preferably, the retaining arm further includes a lid sensor that communicates with the processor to indicate whether the lid is located on the vessel.

Preferably, the securing assembly is, in use, located inside the kitchen device.

Preferably, the retaining arm includes a protrusion adapted to engage a recess in the lid when the retaining arm is moved in an arm direction from the free position to the retaining position.

Preferably, the securing assembly comprises a securing member that pivots about a first axis between a free position and a securing position when the securing assembly moves between the free position and the securing position,
  wherein the securing member comprises a restraint that, when the securing assembly is in the securing position, engages the retaining arm to secure the retaining arm in a secured retaining position.

Preferably, the restraint includes a blocking extrusion that extends in a plane normal to the first axis.

Preferably, the locking mechanism further comprises a first and/or second securing member sensor that is adapted to communicate with a processor, wherein:
  the first securing member sensor is adapted to indicate that the securing member is in the securing position, and
  the second securing member sensor is adapted to indicate that the securing member is in the free position.

Preferably, the restraint includes a latch that pivots about a second axis between a free and a securing position, the latch, when in the securing position, engages a slot in the retaining arm to secure the retaining arm in the secured retaining position.

Preferably, the latch is biased towards the free position.

Preferably, the second axis is substantially perpendicular to the first axis.

Preferably, the securing member has a protrusion that, when the securing member pivots from the free position to the securing position, urges the latch to move from the free position to the securing position.

Preferably, the securing assembly includes a solenoid that is adapted to move the latch from the free position to the securing position.

Preferably, the restraint comprises a restraining spring, wherein the restraining spring is connected to the securing member and the retaining arm, such that when the securing member pivots to the securing position the restraining spring is moved from a predetermined state to a tensioning state relative to the predetermined state to secure the retaining arm in the secured retaining position.

Preferably, in the tensioning position, the restraining spring is tensioned to a force of between 100 N to 400N.

Preferably, the locking mechanism further comprises a drive mechanism, wherein the electric motor moves the securing assembly between the free position and the securing position using the drive mechanism.

Preferably, the drive mechanism is a belt or cable drive.

Preferably, the drive mechanism comprises a bevel gear.

Preferably, the drive mechanism comprises a worm and gear set.

Preferably, the worm and gear set comprises a pinion gear pivotable about a pinion gear axis and the drive mechanism further comprises:
- a driving pin located on the pinion gear, radially spaced from the pinion gear axis;
- a driving tab connected to the driving pin and the securing assembly, such that when the pinion gear pivots about the pinion gear axis the driving tab moves the securing assembly between the free and the securing position.

Preferably, the securing assembly includes a bridge member connected to the securing member, and the driving tab is connected to the bridge member to move the bridge member between a free and a securing position.

Preferably, the bridge member includes a central yoke pivotably received in a central portion of the bridge member such that the central yoke is pivotable relative to the bridge member about a first yoke axis, and wherein the driving tab is connected to a yoke pin, such that the driving tab is pivotable relative to the central yoke about a second yoke axis.

Preferably, the first yoke axis is generally perpendicular to the second yoke axis.

Preferably, the drive mechanism comprises a bridge member converting a rotary motion of the electric motor to a linear motion of the bridge member.

Preferably, the first securing member sensor is arranged to indicate whether the bridge member is in a position indicating that the securing assembly is in the free position.

Preferably, the drive mechanism is a common drive mechanism;
the securing assembly has two or more securing members pivoted by the common drive mechanism; and
the securing assembly is moved between the free position and the securing position using a single electric motor.

Preferably, the restraint includes a hook adapted to engage a pin on the retaining arm to secure the retaining arm in the secured retaining position.

Preferably, the securing assembly includes a toggle linkage.

Preferably, movement of the toggle linkage from the free position to the securing position in a lever direction moves the retaining arm from the free position to the retaining position.

Preferably, the securing position of the toggle linkage is a further distance in the lever direction than a corresponding distance in the lever direction causing movement of the retaining arm to the retaining position, and
further movement of the toggle linkage in the lever direction urges the retaining arm towards the vessel.

In a second aspect, the present invention provides a kitchen device having:
a vessel, the vessel providing an interior space and having a rim surrounding an opening of the space;
a lid to engage the rim to close the space; and
the locking mechanism of the first aspect.

Preferably, the lid has a recess located in a ramp that extends upwardly from the lid, the ramp sloping downwardly and towards the free position of the retaining arm, such that when the retaining arm is moved from the free position to the retaining position, the retaining arm engages the ramp and urges the lid against the vessel.

Preferably, the lid has a seal adapted to engage the vessel when the retaining arm is in the retaining position and thereby assisting to retain the lid against the vessel.

Preferably, the seal includes a sealing lip that engages a side wall of the vessel to seal the vessel, and wherein the sealing lip extends substantially parallel with a side wall of the vessel such that a normal force between the sealing lip and the side wall causes frictional resistance to removal of the lid from the vessel.

Preferably, the kitchen device has a body and further includes:
a retaining arm seal located between the body and the retaining arm, the retaining arm seal having a concave portion with a lowest point located between the body and the retaining arm.

Preferably, the kitchen device further includes:
a body snap piece to fasten the retaining arm seal to the body and to resist rotational movement of the retaining arm seal relative to the body; and
an arm snap piece to fasten the retaining arm seal to the retaining arm and reduce contact between the retaining arm and the retaining arm seal.

In a third aspect, the present invention provides a method for operating a kitchen device having a vessel and a lid, the method comprising the steps of:
moving a retaining arm from a free position to a retaining position such that the retaining arm retains the lid against the vessel;
determining that the retaining arm is in the retaining position;
determining that the lid is present on the vessel;
moving a securing assembly from a free position to a securing position thereby securing the retaining arm from moving from the retaining position; and
determining that the securing assembly is in the securing position.

In a fourth aspect, the present invention provides a locking mechanism for a kitchen device having a vessel, the vessel providing an interior space and having a rim surrounding an opening of the space, and a lid to engage the rim to close the space, the locking mechanism comprising:
a securing pin, the securing pin being attachable to the device and movable between a free position, wherein the lid is movable with respect to the vessel, and a securing position, wherein the securing pin is engageable with the lid to retain the lid on the vessel to at least partly close the opening; and a secondary securing mechanism, the secondary securing mechanism being attachable to the device to engage the vessel and movable between a free position, wherein the vessel is movable relative to the kitchen device, and a vessel securing position, wherein the secondary securing mechanism engages the vessel to prevent movement of the vessel relative to the kitchen device.

Preferably, the locking mechanism further comprises:

a moving member attached to the securing pin;

a securing motor to drive the moving member, and thereby move the securing pin between the free position and the securing position; and a processor adapted to actuate the securing motor to drive the moving member.

Preferably, the locking mechanism further comprises a secondary securing motor to drive the secondary securing mechanism between the free position and the vessel securing position, and wherein the processor is adapted to actuate the secondary securing motor to drive the secondary securing assembly.

Preferably, the secondary securing mechanism includes one or more securing members that, when the secondary securing mechanism is in the securing position, engage a respective securing hold located in a lower portion of the vessel.

Preferably, the moving member comprises a drive assembly to move the securing pin between the free position and the securing position, the drive assembly having a shaft.

Preferably, the drive mechanism includes a rack located on the moving member and a pinion gear located on the shaft.

Preferably, the drive mechanism includes a screw-drive.

Preferably, the screw-drive includes a thread formed on an inner surface of the securing pin that engages a thread formed on an outer surface of the shaft.

In a fifth aspect, the present invention provides a locking mechanism for a kitchen device having a vessel and a lid, the locking mechanism comprising:

a retaining arm movable between a free position and a retaining position;

a securing assembly to engage the retaining arm and movable between a free position and a securing position; and an electric motor to move the securing assembly between the free position and the securing position.

Preferably, the locking mechanism further comprises a processor adapted to control the electric motor using a motor controller.

Preferably, the locking mechanism further comprises a first sensor that communicates with the processor to indicate whether the retaining arm is in the retaining position.

Preferably, the locking mechanism further comprises a drive mechanism, wherein the electric motor moves the securing assembly using the drive mechanism, and wherein the drive mechanism comprises a bridge member converting a rotary motion of the electric motor to a linear motion of the bridge member.

Preferably, the locking mechanism further comprises a second sensor that communicates with the processor to indicate whether the bridge member is in a position indicating that the securing assembly is in the free position.

Preferably, the securing assembly includes a pivoting member, wherein the bridge member acts on the pivoting member to move the securing assembly between the free and the securing position.

Preferably, the pivoting member is a hook adapted to engage a pin on the retaining arm to secure the retaining arm in a secured retaining position.

Preferably, the locking mechanism further comprises a third sensor that communicates with the processor to indicate whether the hook is in a position indicating that the retaining arm is in the secured retaining position.

Preferably, the securing assembly is moved by the bridge member on at least two points of contact, and the bridge member is moved by a single electric motor.

Preferably, the drive mechanism comprises a bevel gear.

Preferably, the drive mechanism comprises a worm and gear set.

Preferably, when the retaining arm is in the free position the lid may be removed from the vessel, and when the retaining arm is in the retaining position, the lid is not able to be removed from the vessel.

Preferably, the locking mechanism further comprises a fourth sensor that communicates with the processor to indicate whether the retaining arm is in the retaining position.

Preferably, the retaining arm includes a lid sensor that communicates with the processor to indicate whether the lid is located on the vessel.

Preferably, when the securing assembly is in the securing position, the retaining arm is not movable from the secured retaining position.

BRIEF DESCRIPTION OF DRAWINGS

Preferred embodiments of the present invention will now be described, by way of examples only, with reference to the accompanying drawings, wherein similar parts and features are indicated by having equal one and ten values, while the hundred values indicate the embodiment number:

FIG. 41 is a detailed cut-away front view of a kitchen device having a locking mechanism according to a third embodiment of the invention.

FIG. 42 is a detailed cut-away top section view of the kitchen device of FIG. 41.

FIG. 43 is a detailed cut-away front view of the kitchen device of FIG. 41 in a second configuration.

FIG. 44 is a detailed cut-away top section view of the kitchen device of FIG. 41 in the configuration of FIG. 43.

DESCRIPTION OF EMBODIMENTS

Figure 1:
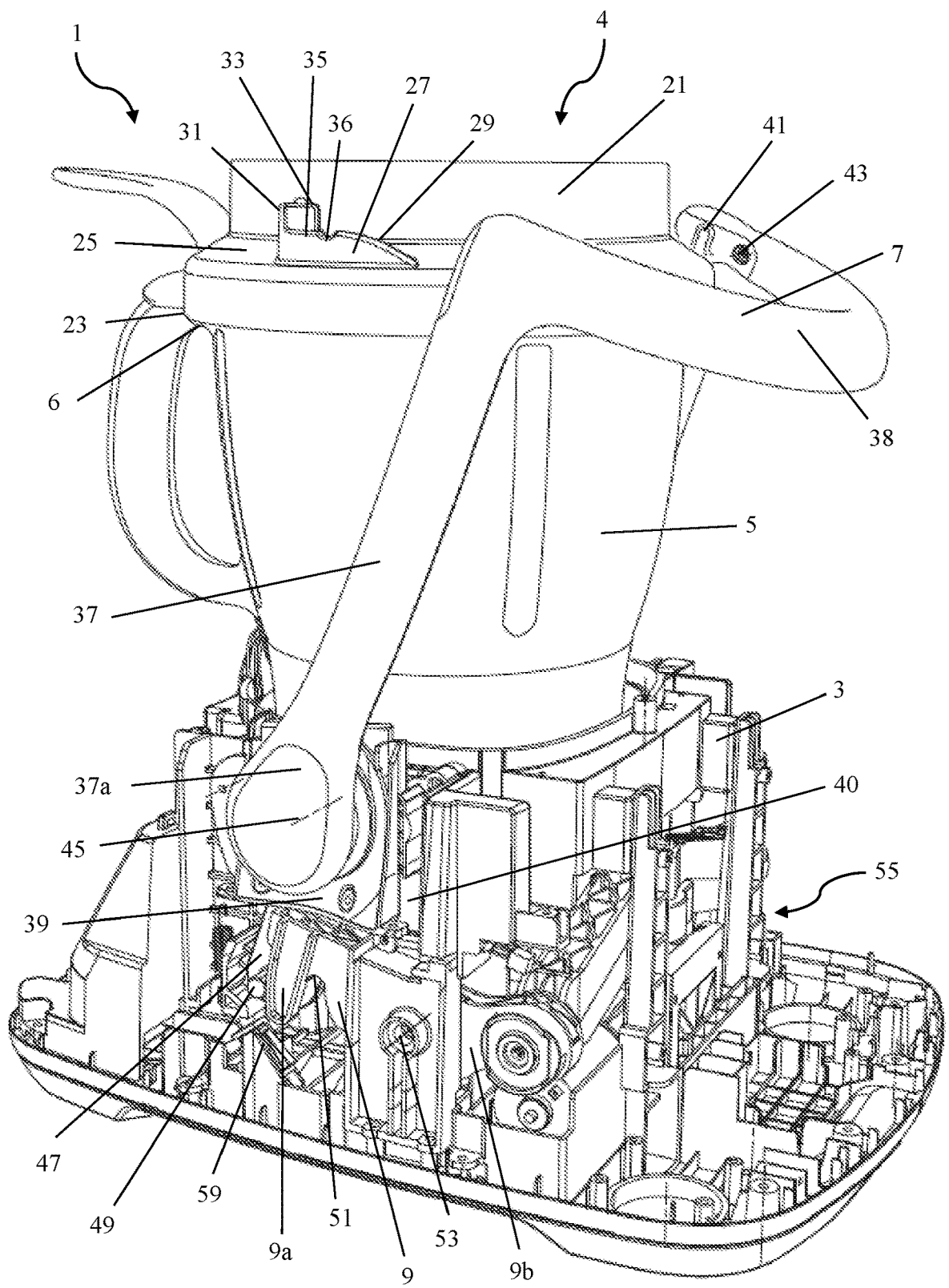
FIG. 1 is a perspective cut-away view of a kitchen device having a locking mechanism according to an embodiment of the invention with a retaining arm in a free position.

A kitchen device 1, such as the kitchen device 1 shown in FIG. 1, may include a locking mechanism 4 according to a preferred form of the present invention. As shown in FIG. 1, the kitchen device 1 typically has a body 3 and a vessel 5, having a vessel rim 6, mounted thereon. The kitchen device 1 also has a power switch (not shown). A lid 21 is also provided and, in use, placed atop the vessel 5. The lid 21 has a lid rim 23 extending beyond the vessel rim 6 of the vessel 5, and an upper surface 25. On the upper surface 25 there are located two projections 27 on opposite sides of the lid 21. The projections 27 have a rounded leading edge, or ramp, 29 and an upright stop edge 31. Extending from the upright stop edge is a contact edge 33. A guiding edge 35 extends between the leading edge 29 and the stop edge 31. The guiding edge 35 has a notch 36.

Figure 3:
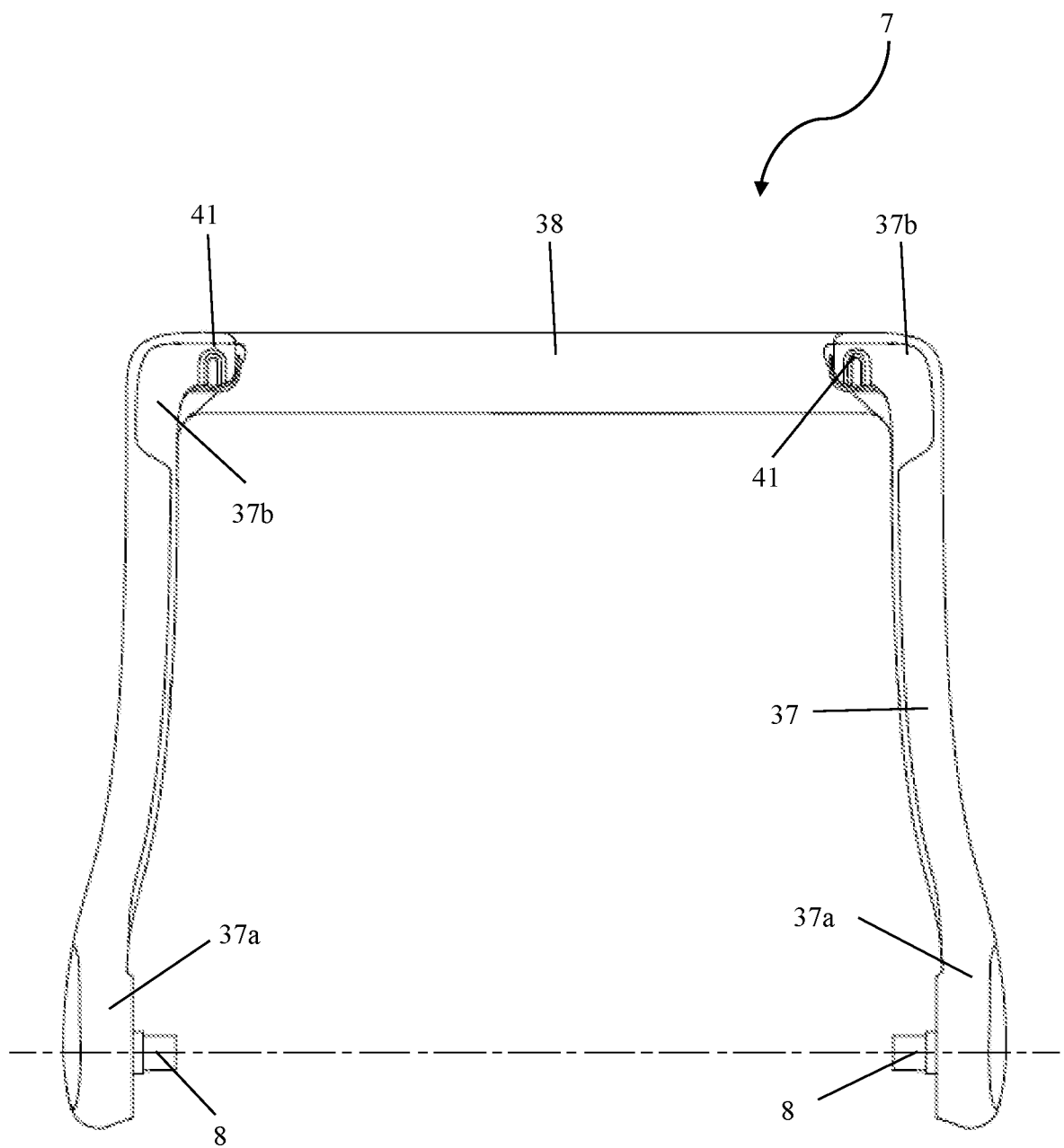
FIG. 3 is a front section view of the retaining arm of the kitchen device of FIG. 1.
Figure 4:
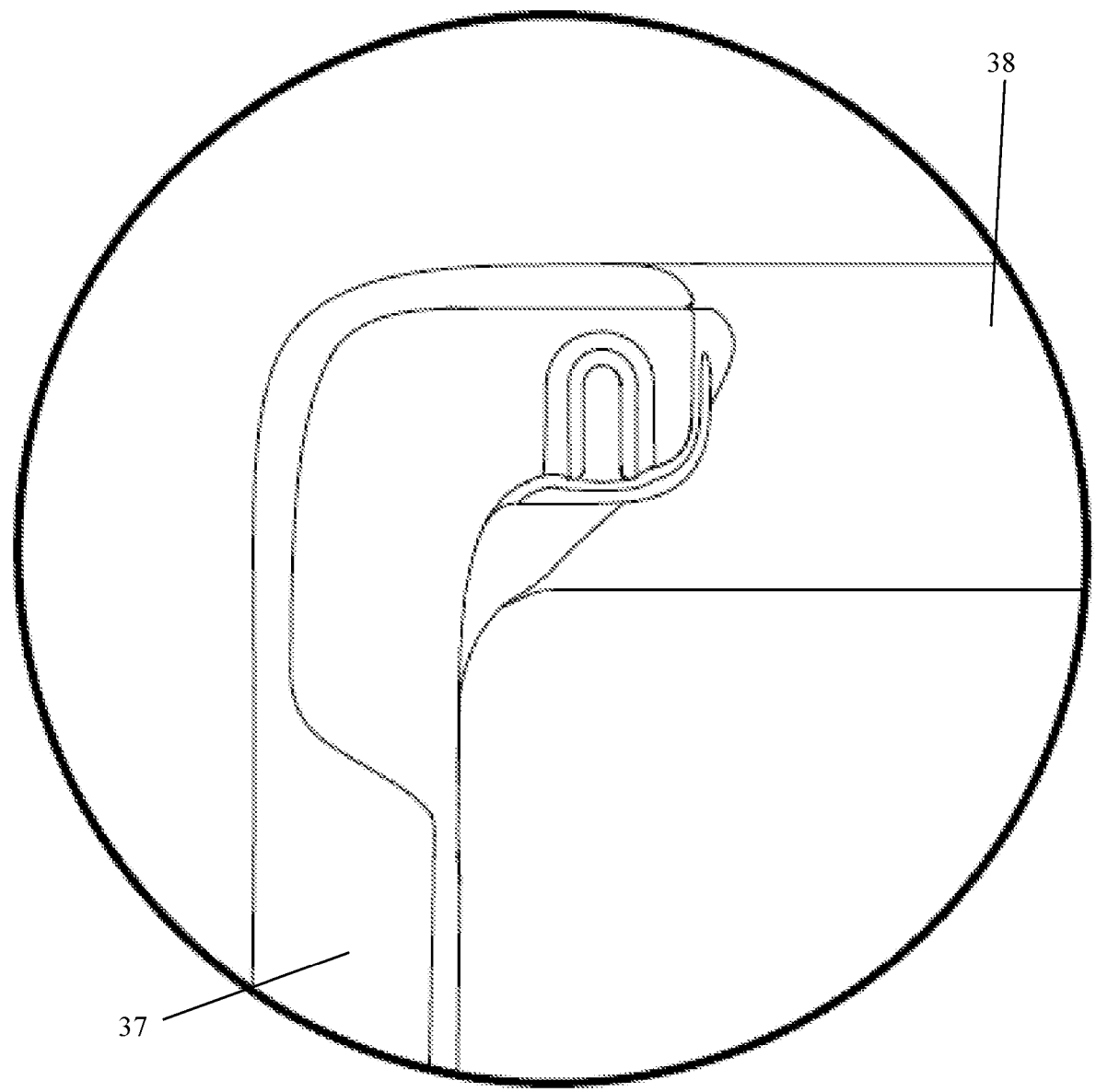
FIG. 4 is a detailed front section view of the retaining arm of the kitchen device of FIG. 1.

The locking mechanism 4 includes a retaining arm 7 and a pair of securing hooks 9. The retaining arm 7 has a pair of longitudinally extending members 37. The longitudinally extending members 37 are, at a first end 37a, attached to the body 3 using a hinge 39. At a second end 37b, the members 37 are joined by a perpendicularly extending rounded member 38. The retaining arm 7 also has a channel 41 located at each second end 37b of the members 37. A lid detection switch 43 is located in each channel 41. The channels 41 are adapted to receive the contact edges 33 when the locking arm 7 is in the locking position, thereby securing the lid 21 against the vessel 5. As shown in FIG. 3, the retaining arm 7 has a rotating projection 8 located at each first end 37a of the longitudinally extending members 37. The rotating projections 8 engage with the hinge 39 to allow pivoting of the retaining arm 7 with respect to the body 3 about a generally horizontal hinge axis 45 through an acute angle. Also, as shown in FIGS. 3 and 4, the channels 41 are substantially vertical slots with a rounded end point.

Figure 2:
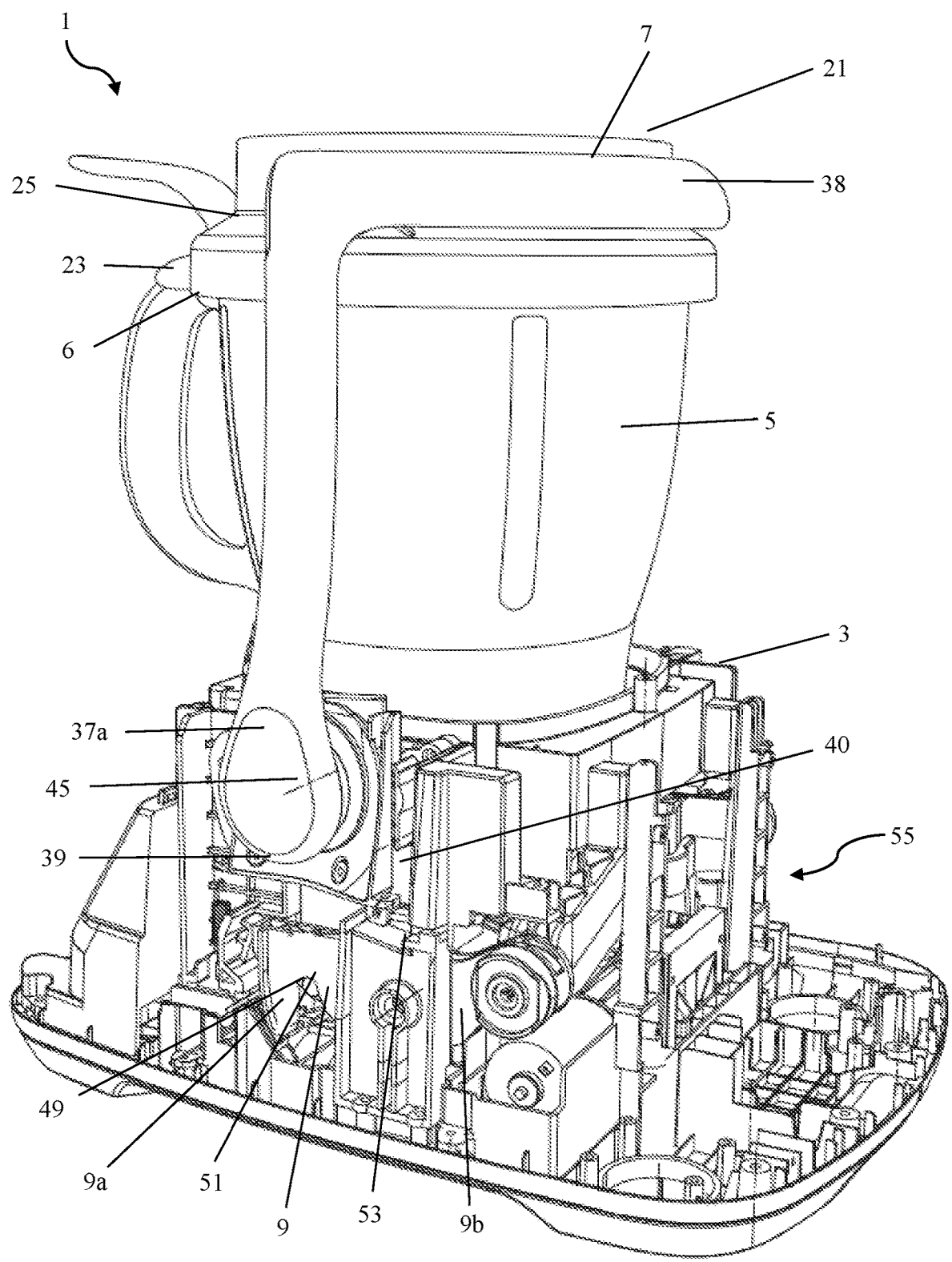
FIG. 2 is a perspective cut-away view of the kitchen device of FIG. 1 with the retaining arm in a retaining position.
Figure 5:
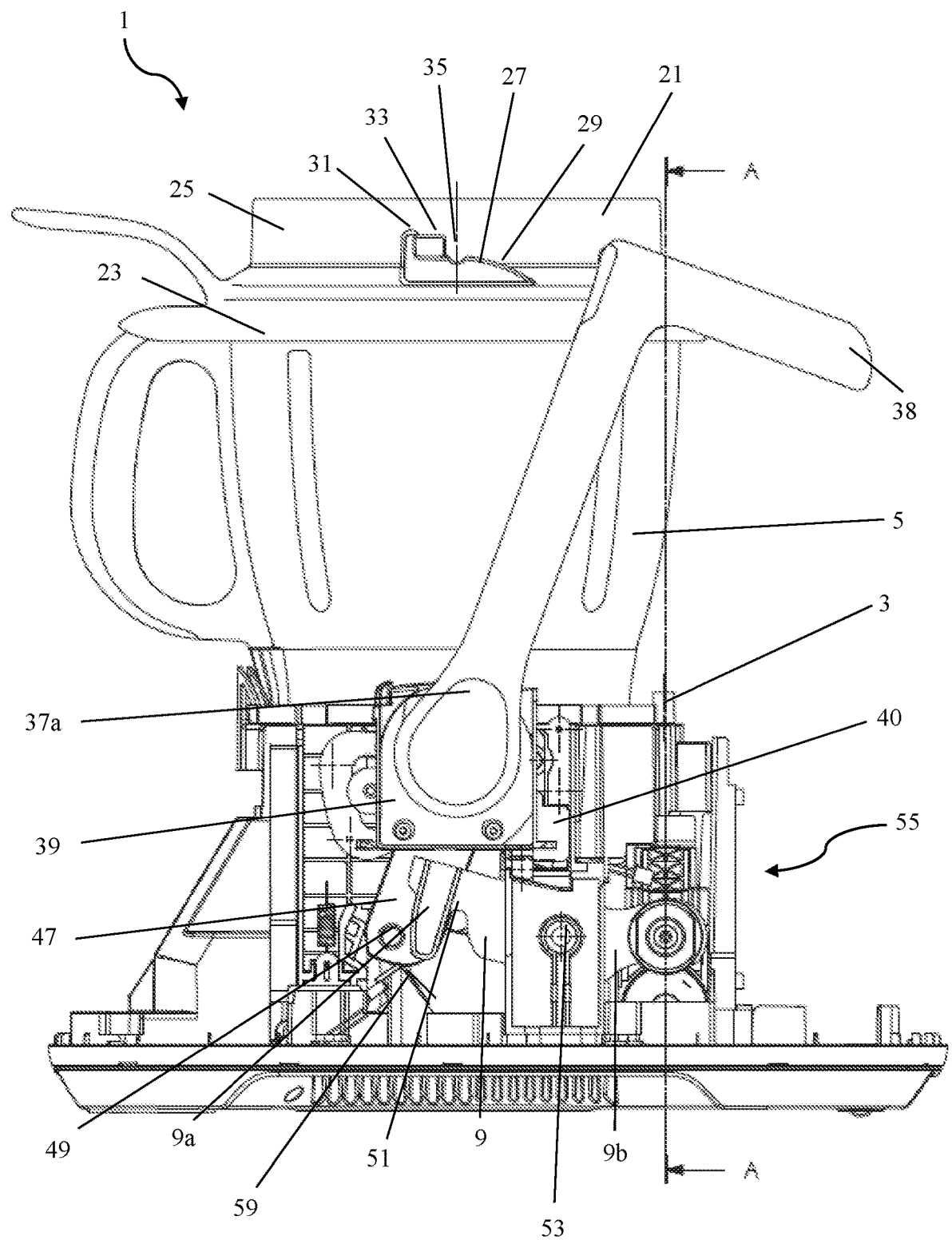
FIG. 5 is a right side cut-away view of the kitchen device of FIG. 1 with the retaining arm in the free position.

The retaining arm 7 pivots between a free position, as shown in FIG. 1, and a retaining position, as shown in FIG. 2. As best seen in FIG. 5, a retaining arm position switch 40 is located adjacent the longitudinally extending member 37 of the retaining arm 7, such that the retaining arm 7 actuates the retaining arm position switch 40 when the retaining arm 7 is in the retaining position.

Each longitudinally extending member 37 of the retaining arm 7 is attached to a side of the hinge 39 facing away from the body 3. As best seen in FIG. 5, on another side of the hinge 39 facing towards the body there is an extension arm 47. The extension arm 47 extends from the hinge 39 in a direction opposite the retaining arm 7. The extension arm 47 is linked to the pivoting of the retaining arm 7 and also pivots about the hinge axis 45, albeit at a phase angle of 180°.

Figure 6:
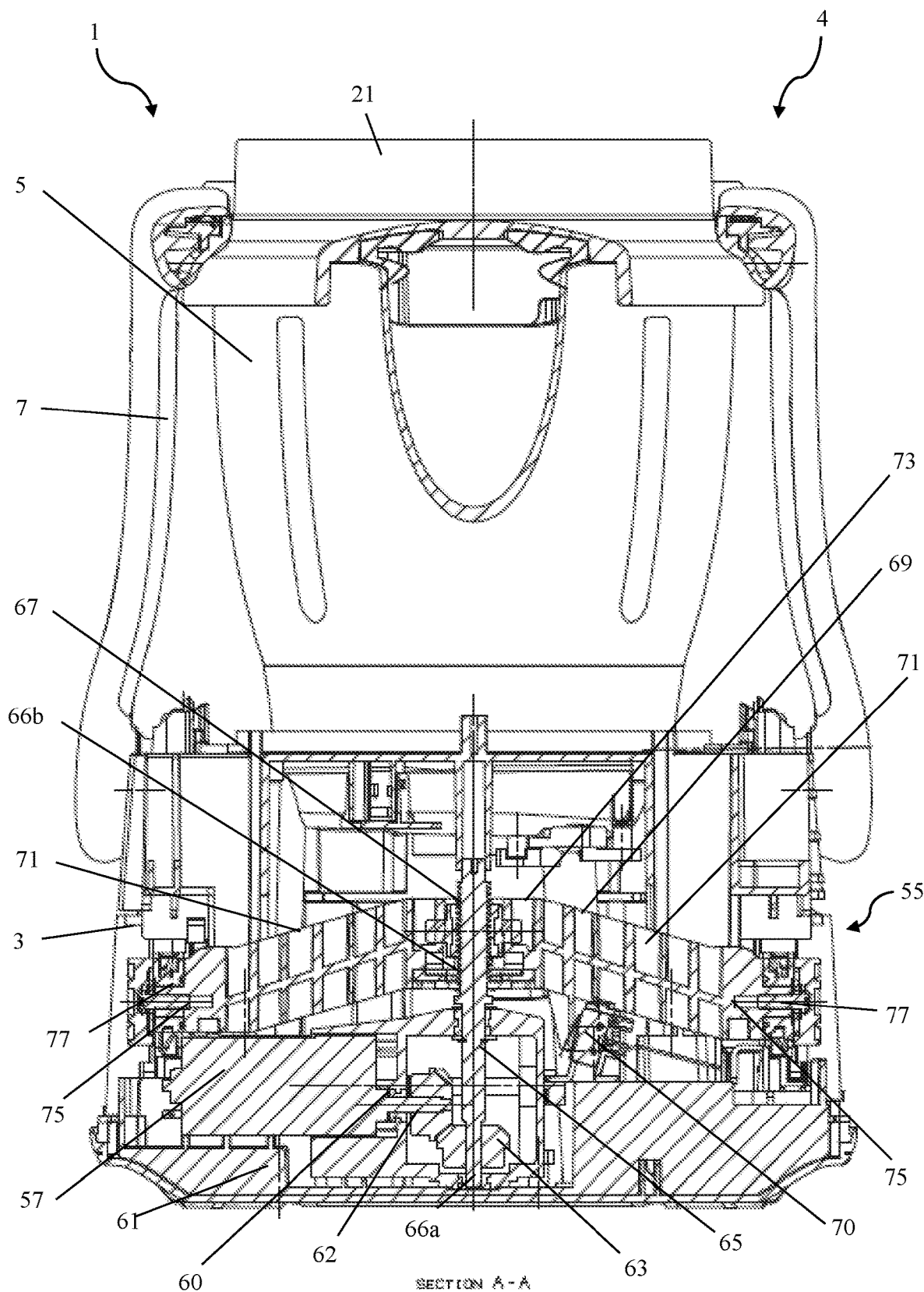
FIG. 6 is a section view of the kitchen device of FIG. 1 along axis A-A shown in FIG. 5.
Figure 7:
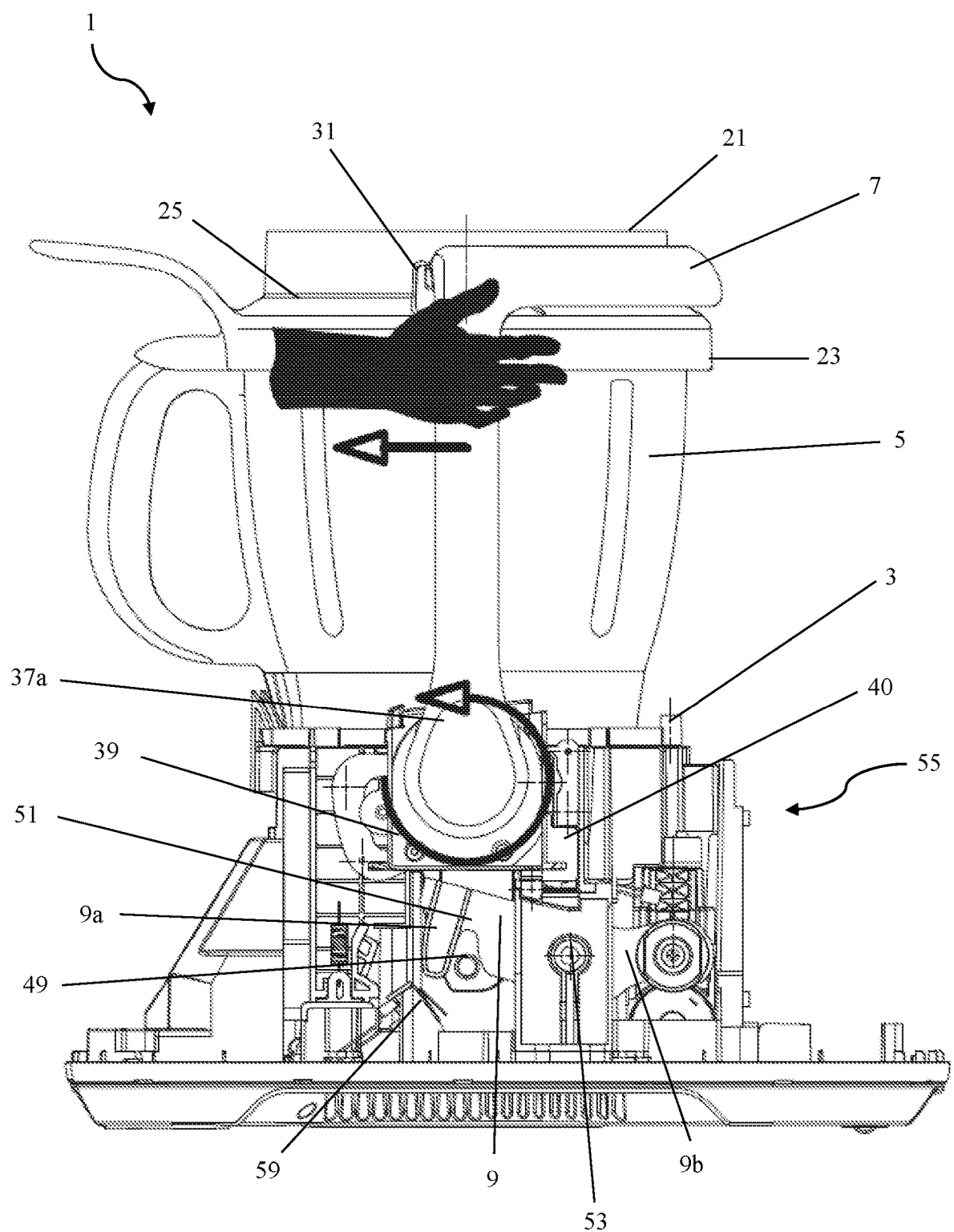
FIG. 7 is a right side cut-away view of the kitchen device of FIG. 1 with the retaining arm in the retaining position, and a securing hook in a free position.
Figure 8:
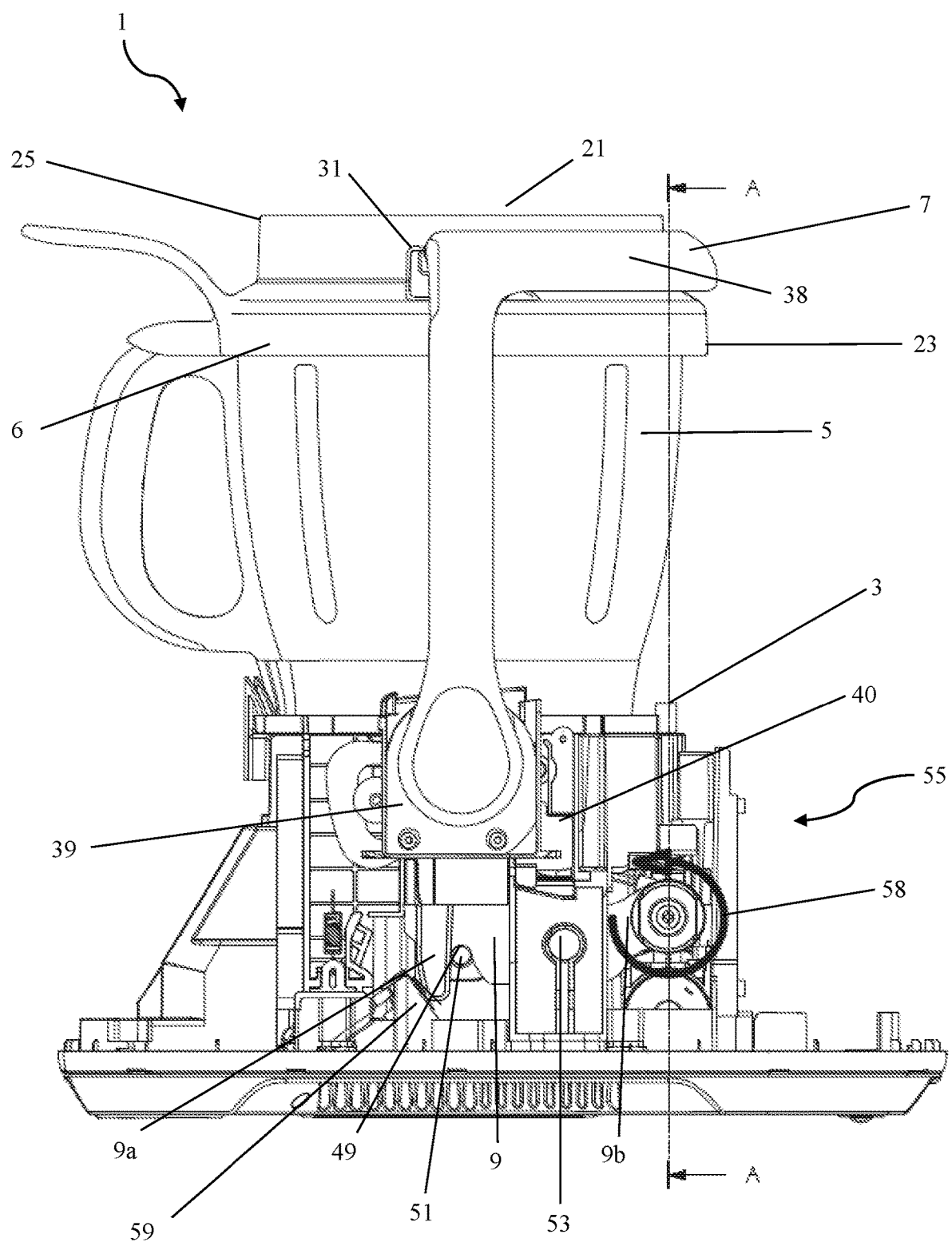
FIG. 8 is a right side cut-away view of the kitchen device of FIG. 1 with the retaining arm in the retaining position, and a securing hook in a securing position.

As shown in FIG. 5, a retaining arm pin 49 extends away from each extension arm 47 in a normal direction from the body 3. Each securing hook 9 has a recess 51 at a first end 9a. Each securing hook 9 pivots about a second hinge 53 between a free position, as shown in FIG. 7, and a securing position, as shown in FIG. 8. In the securing position, the securing hook 9 substantially prevents the retaining arm 7 from moving out of the retaining position. The retaining arm 7 is, therefore, in a secured retaining position. A second end 9b of each securing hook 9 extends beyond the second hinge 53. Each second end 9b is connected to a drive mechanism 55 driven by a securing motor 57, as shown in FIG. 6. As best seen in FIG. 8, a hook position switch 59 is located adjacent each first end 9a of the securing hook 9 such that the first end 9a of the securing hook 9 actuates the hook position switches 59 when in the securing position.

Figure 9:
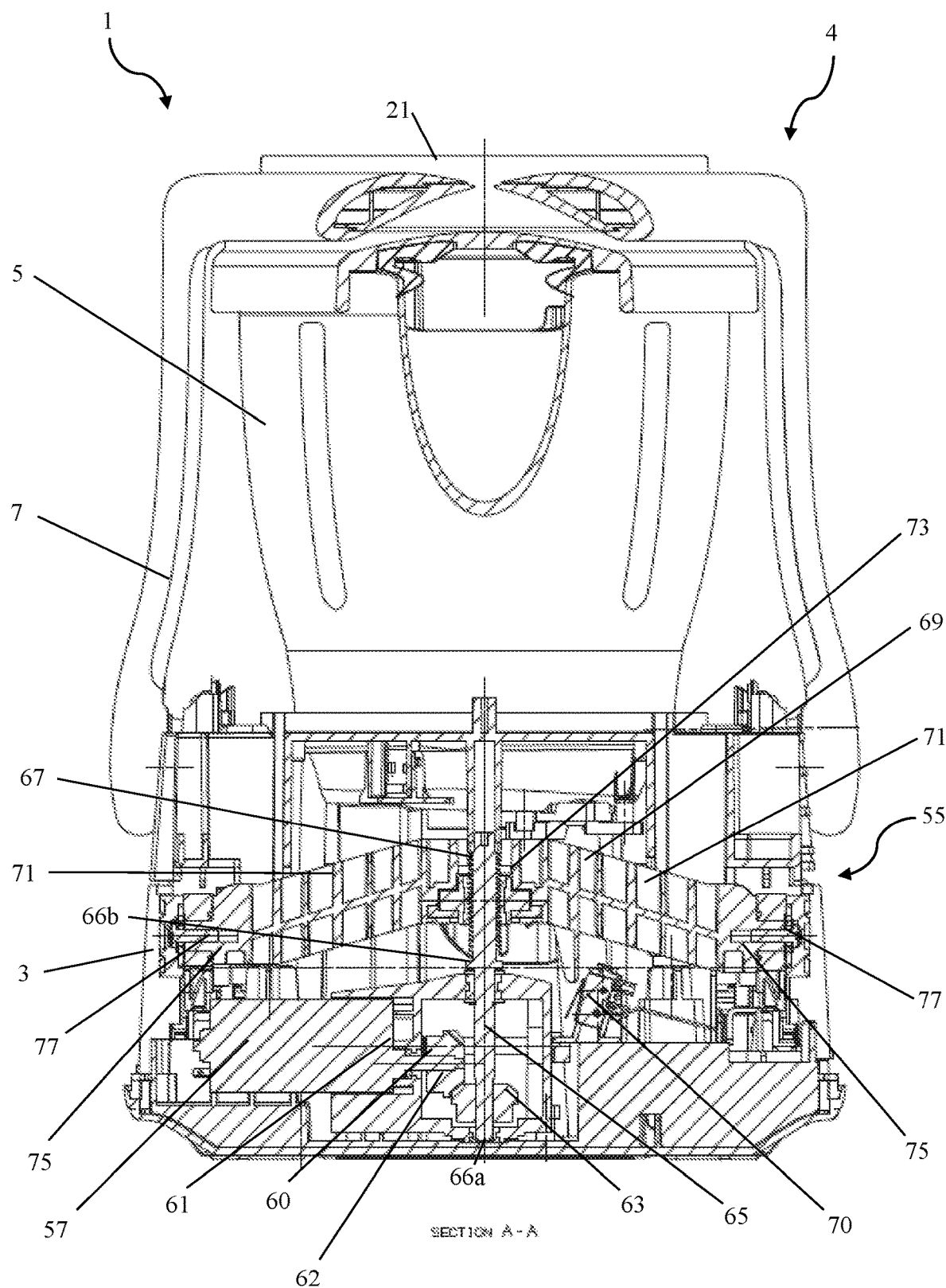
FIG. 9 is a section view of the kitchen device of FIG. 1 along axis A-A shown in FIG. 8.

As best seen in FIGS. 6 and 9, the drive mechanism 55 includes a reduction gear train 61 connected to the securing motor 57. A shaft 60 connects the reduction gear train 61 to a first bevel gear 62. The first bevel gear 62 is operatively connected to a second bevel gear 63. The second bevel gear 63 is connected to a linear screw 65. The bevel gears 62, 63 are operatively connected at an angle such that the rotation axes of the shaft 60 and the linear screw 65 are perpendicular. The linear screw 65 is axially constrained by a pair of retainers 66a, 66b. The linear screw 65 is also received in a threaded opening 67 of a bridge member 69. The bridge member 69 has two sloping arms 71 connected by a central portion 73. The threaded opening 67 is located in the central portion 73. The bridge member 69 is vertically movable between a low position shown in FIG. 6 and a high position shown in FIG. 9. The locking mechanism 4 further includes a bridge member position switch 70 located adjacent the bridge member 69, such that the bridge member 69 actuates the bridge member position switch 70 when in the low position, as seen in FIG. 9.

The two sloping arms 71 have respective end portions 75 that are connected to the second end 9b of each securing hook 9. The connection between the end portions 75 and the second ends 9b is a pivot joint 77.

The locking mechanism 4 also has a processor (not shown) that operates a securing motor controller (not shown) for driving the securing motor 57. The securing motor controller also sends a current signal to the processor, indicating a drawn motor current by the securing motor 57. The processor also communicates with the retaining arm position switch 40, the lid detection switch 43, and the hook position switch 59 to determine whether the switches 40, 43, 59 have been actuated.

Figure 11:
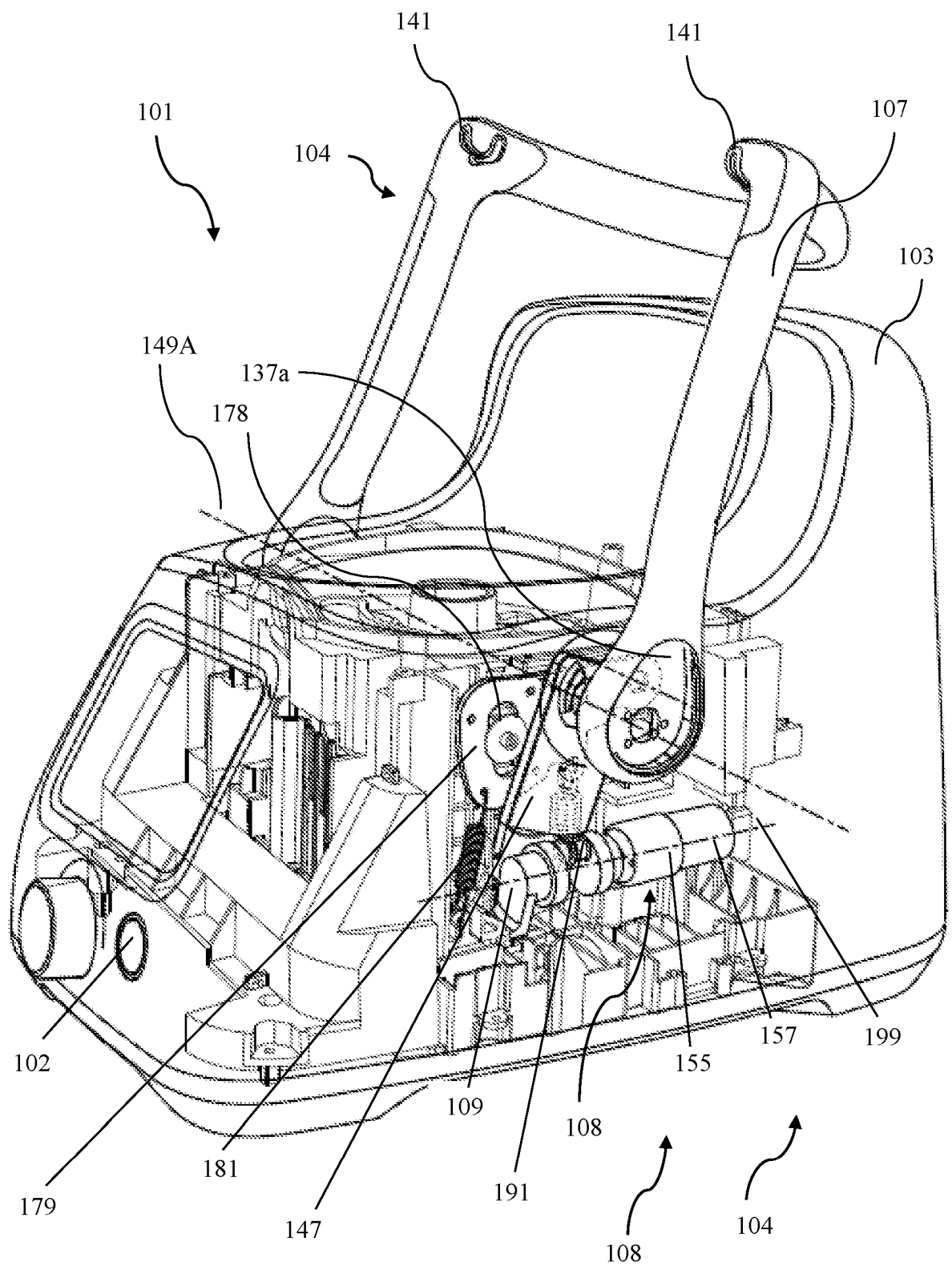
FIG. 11 is a perspective cut-away view of a kitchen device having a locking mechanism according to a second embodiment of the invention.
Figure 12:
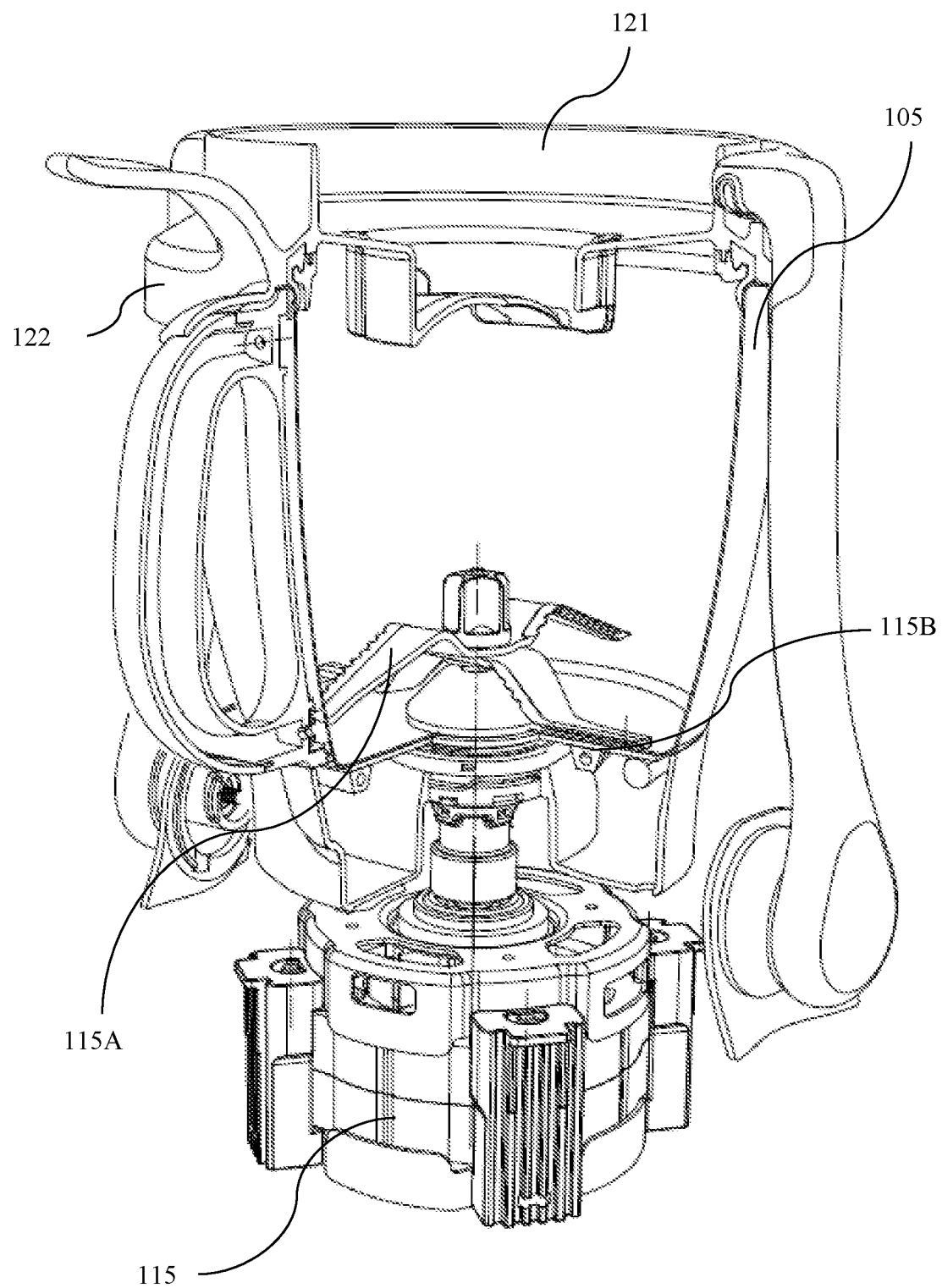
FIG. 12 is a detailed perspective cut-away view of the kitchen device of FIG. 11.

A second embodiment of the kitchen device 101 is shown in FIGS. 11-40. As shown in FIG. 11 the device 101 has a locking mechanism 104, the locking mechanism 104 comprising a retaining arm 107 attached to a body 103 of the kitchen device 101 and movable between a free position shown in FIG. 16 and a retaining position shown in FIG. 18. As shown in FIG. 12, the kitchen device 101 has a vessel 105 providing an interior space and having a vessel rim 106 surrounding an opening 105a of the space. The kitchen device 101 has a main motor 115 and an agitator 115a coupled to the main motor 115 to process ingredients in the vessel 105. In this embodiment, the kitchen device 101 also has a heating element 115b in thermal communication with the vessel 105 to heat ingredients in the vessel 105. The kitchen device 101 also has a lid 121 to engage the vessel rim 106 to close the opening 105a.

Figure 20:
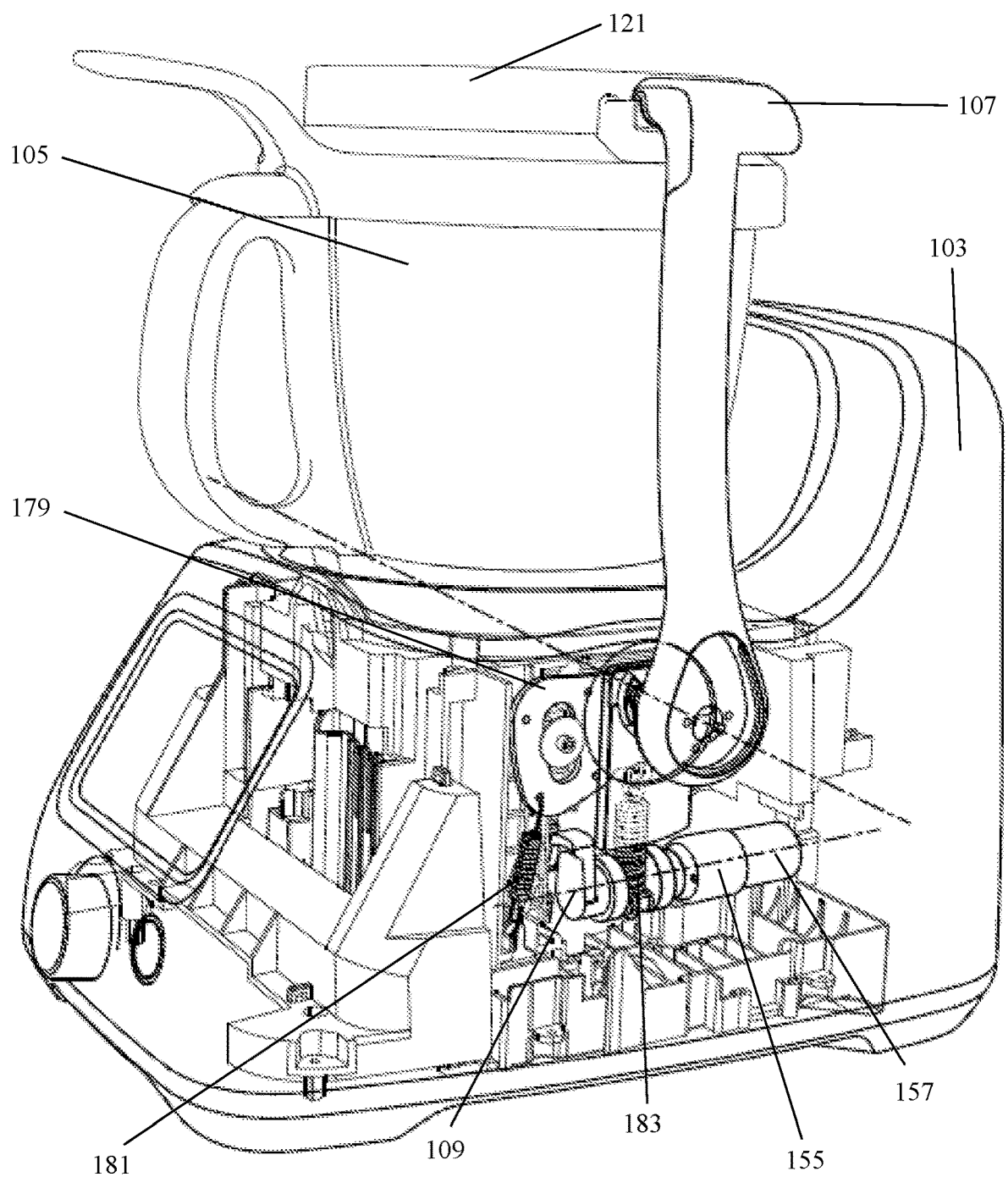
FIG. 20 is a detailed perspective cut-away view of the kitchen device of FIG. 11 in the configuration shown in FIG. 19.
Figure 21:
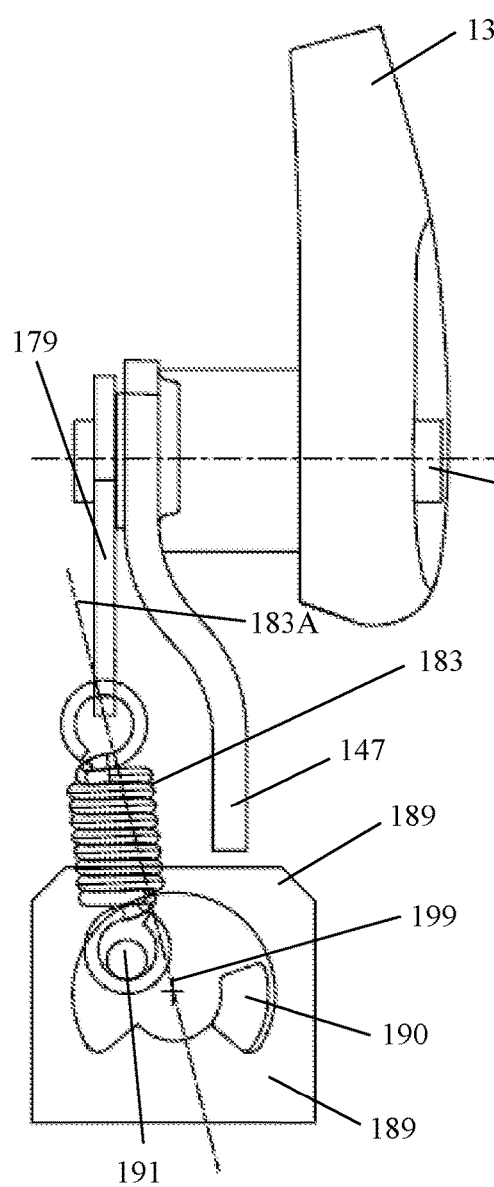
FIG. 21 is a detailed cut-away rear view of the kitchen device of FIG. 11 in the configuration shown in FIG. 17.

As seen in FIG. 11, the locking mechanism 104 also includes a securing assembly 108 comprising a securing member, preferably a crank 187. As shown in FIG. 21, the crank 187 is mounted in a crank case 189, the crank case 189 being attached to the body 103 of the kitchen device 101. The crank 187 is pivotable about a first axis 199 between a free position, shown in FIG. 18, and a securing position, shown in FIG. 20.

The locking mechanism 104 also includes a processor (not shown) and a securing motor 157. The securing motor 157 is attached to the body 103 and is operatively coupled to the crank 187 by a drive mechanism 155 to pivot the crank 187 about the first axis 199. The crank 187 has a crank stop 190, shown in FIG. 21, extending parallel to the first axis 199. Preferably, the first axis 199 is generally horizontal when the kitchen device 101 is resting on a horizontal surface. As shown in FIG. 11, the locking mechanism includes a power switch 102 that may be operated to provide, or deny, electric mains power to the locking mechanism 104.

Figures 28, 29:
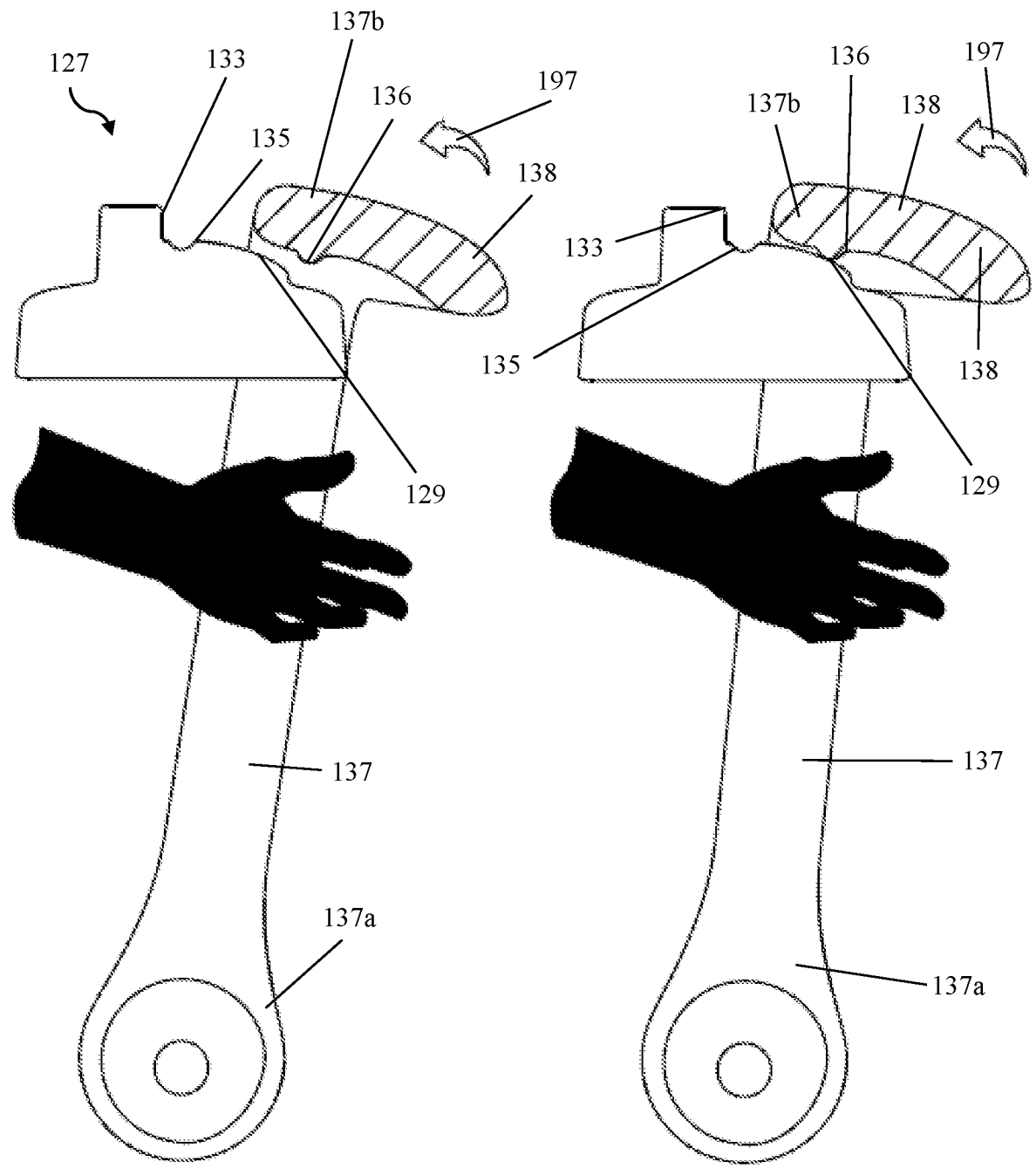
FIG. 28 is a detailed cut-away right side section view of the kitchen device of FIG. 11 between the configurations shown in FIGS. 16 and 18.
FIG. 29 is a detailed cut-away right side section view of the kitchen device of FIG. 11 between the configurations shown in FIGS. 16 and 18.

As shown in FIGS. 13 to 17, the retaining arm 107 includes two longitudinally extending members 137 that are connected at a first end 137a to the kitchen device by a retaining arm pin 149. The longitudinally extending members 137 are generally parallel. The retaining arm 107 is mounted on a retaining arm pin 149 and pivots about a retaining arm axis 149A between the free position and the retaining position. Preferably, the retaining arm axis 149A extends in the same direction as a major direction of the retaining arm pin 149 and is generally horizontal. More preferably, the retaining arm axis 149A is generally perpendicular to the first axis 199. The longitudinally extending members 137 are joined at a second end 137b by a rounded member 138. The rounded member 138 of the retaining arm 107 is shaped to engage the lid 121. The rounded member 138 includes a protrusion 136, as seen in FIG. 28, to engage the lid 121. The longitudinally extending member 137 is fixedly attached to an extension arm 147. As shown in more detail in FIG. 14, the connection of the longitudinally extending member 137 to the extension arm 147 includes keys 142 that cooperate with recesses 144 to transmit moment from the longitudinally extending member 137 to the extension arm 147 and vice versa. The connection also includes a ring-shaped boss 146a to locate the extension arm 147 within a corresponding hole 146b in the longitudinally extending member 137. Thus, the retaining arm 107 and the extension arm 147 are not pivotally movable in relation to each other but rotate, together, about the retaining arm axis 149A.

Figure 84:
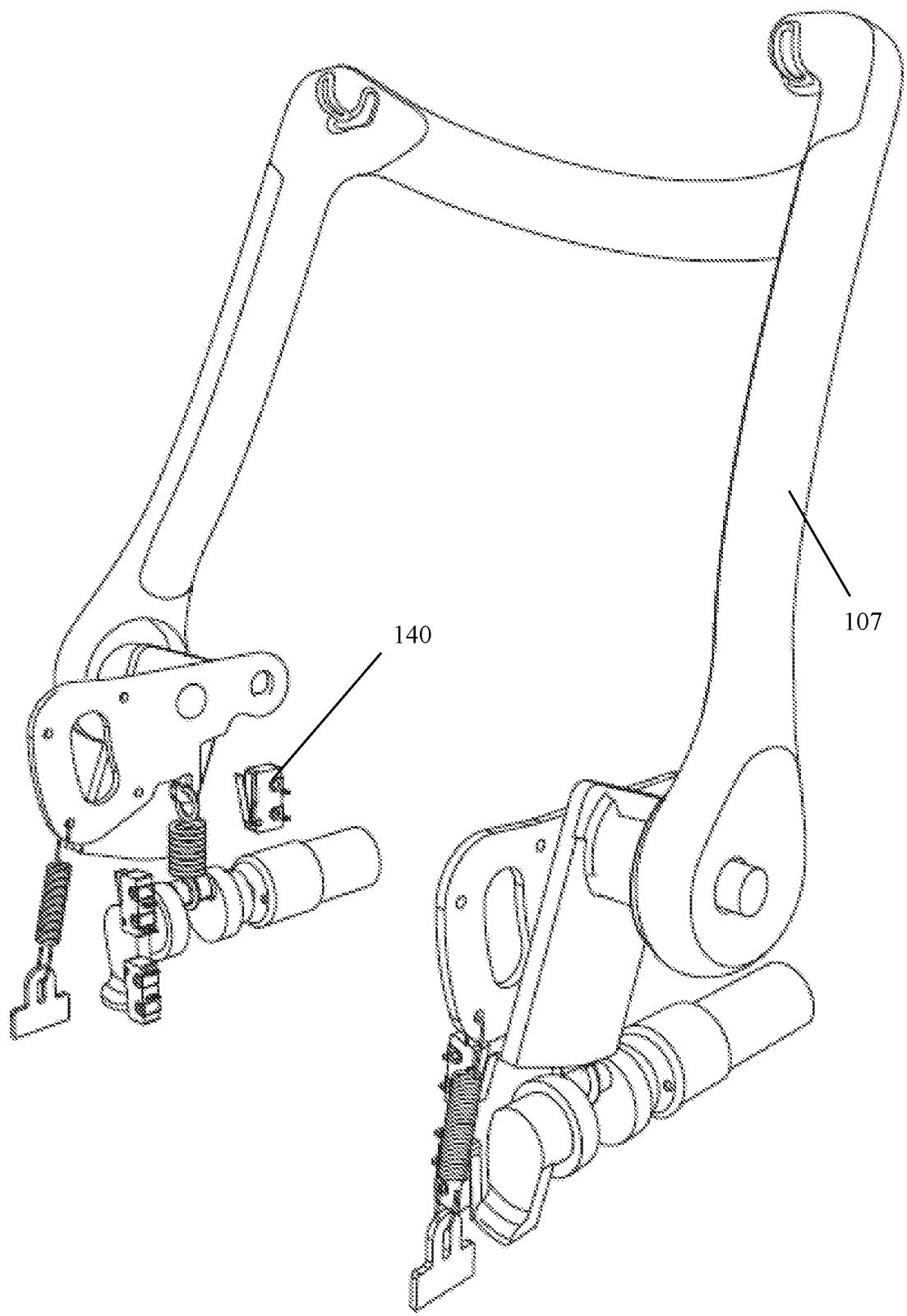
FIG. 84 is a schematic cut-away perspective view of the kitchen device of FIG. 11.

Briefly referring to FIG. 84, the locking mechanism 104 also includes a retaining arm sensor, preferably a retaining arm position switch 140, adapted to communicate with the processor to indicate that the retaining arm 107 is in the retaining position. The retaining arm position switch 140 is located such that it is activated by the extension arm 147 when the retaining arm 107 is in the retaining position.

Figure 15:
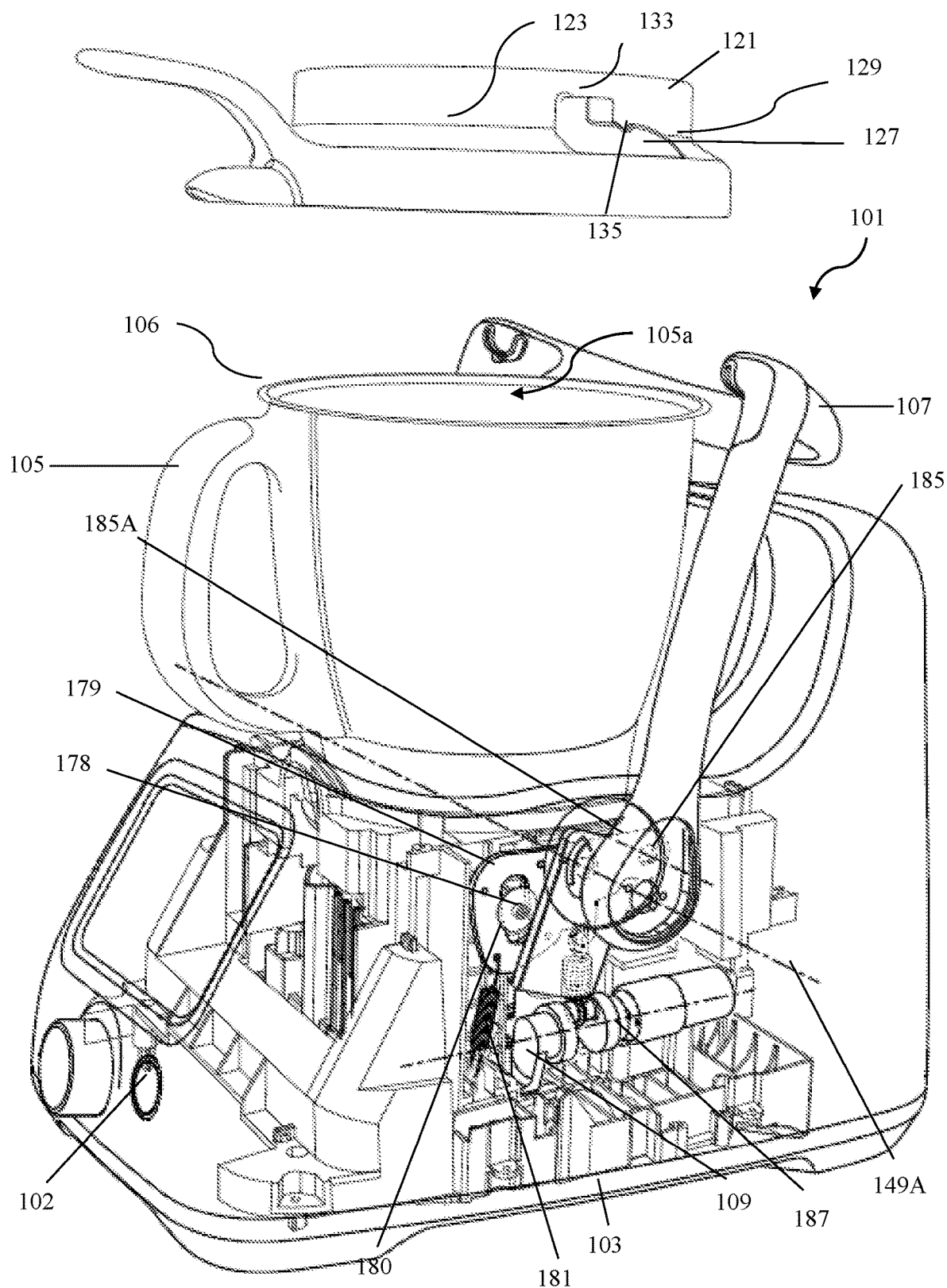
FIG. 15 is a perspective cut-away view of the kitchen device of FIG. 11.

Returning to FIG. 13, the retaining arm 107 is pivotally mounted on the retaining arm pin 149. The retaining arm pin 149 is attached to a bias plate 179. The bias plate 179, in turn, is pivotally mounted on a bias plate pin 185 that is connected to the body 103. The pivotal motion of the bias plate 179 about the bias plate axis 185A is guided and restricted by the bias plate guide pin 178, as seen in FIG. 15, which is mounted through a bias plate guide recess 180 in the body 103. Preferably, the bias plate axis 185A is generally horizontal when the kitchen device 101 is resting on a horizontal surface. More preferably, the bias plate axis 185A is parallel to the retaining arm axis 149A.

As seen in FIG. 15, a first elastic member is mounted to the body 103 and the bias plate 179. Preferably, the first elastic member is a locking spring 181. The bias plate 179 is thereby biased to pivot about the bias plate pin 185 in a first bias plate direction (not shown). The locking spring 181 is in a predetermined state of a low-tension position, or free position, when the retaining arm 107 is in the free position. The locking spring 181 is in a tensioning state (or tensioning position), relative to the predetermined state, when the retaining arm 107 is in the retaining position.

Figure 17:
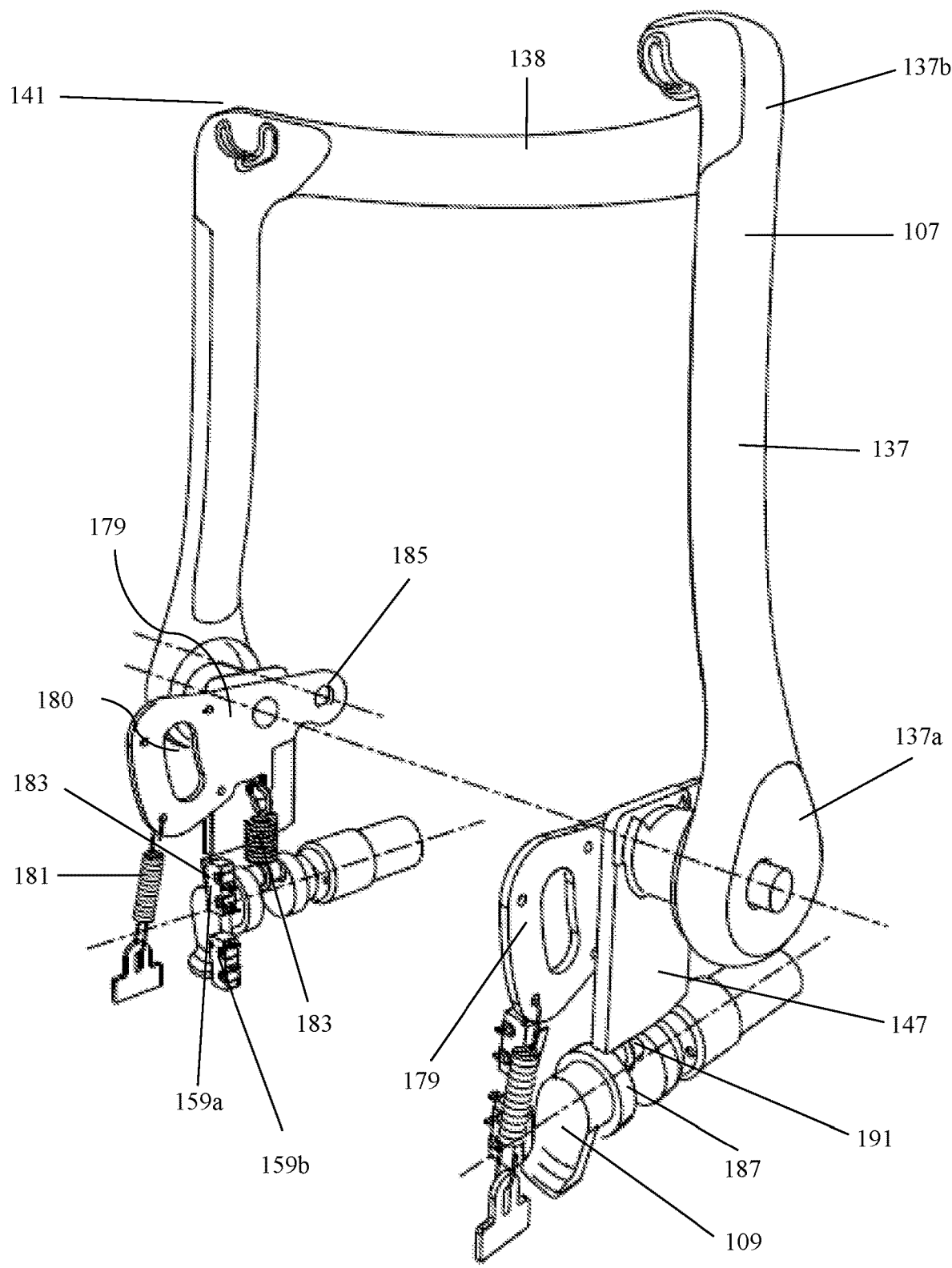
FIG. 17 is a detailed perspective cut-away view of the kitchen device of FIG. 11.

As also shown in FIG. 17, the securing assembly 108 includes a second elastic member mounted to a restraining spring pin 191 on the crank 187 and the bias plate 179. Preferably, the second elastic member is a restraining spring 183. More preferably, the second elastic member has a higher spring constant than the first elastic member. Yet more preferably, the restraining spring 183 extends substantially perpendicularly to the first axis 199. As seen in FIG. 21, the restraining spring pin 191 is located at a distance from the first axis 199 on the crank 187. Thus, pivoting of the crank 187 causes elongation and contraction of restraining spring 183. In the position shown in FIG. 13 the restraining spring 183 is in a low-tension predetermined state, or a relaxed position, as also shown in FIG. 21.

Figures 13, 14:
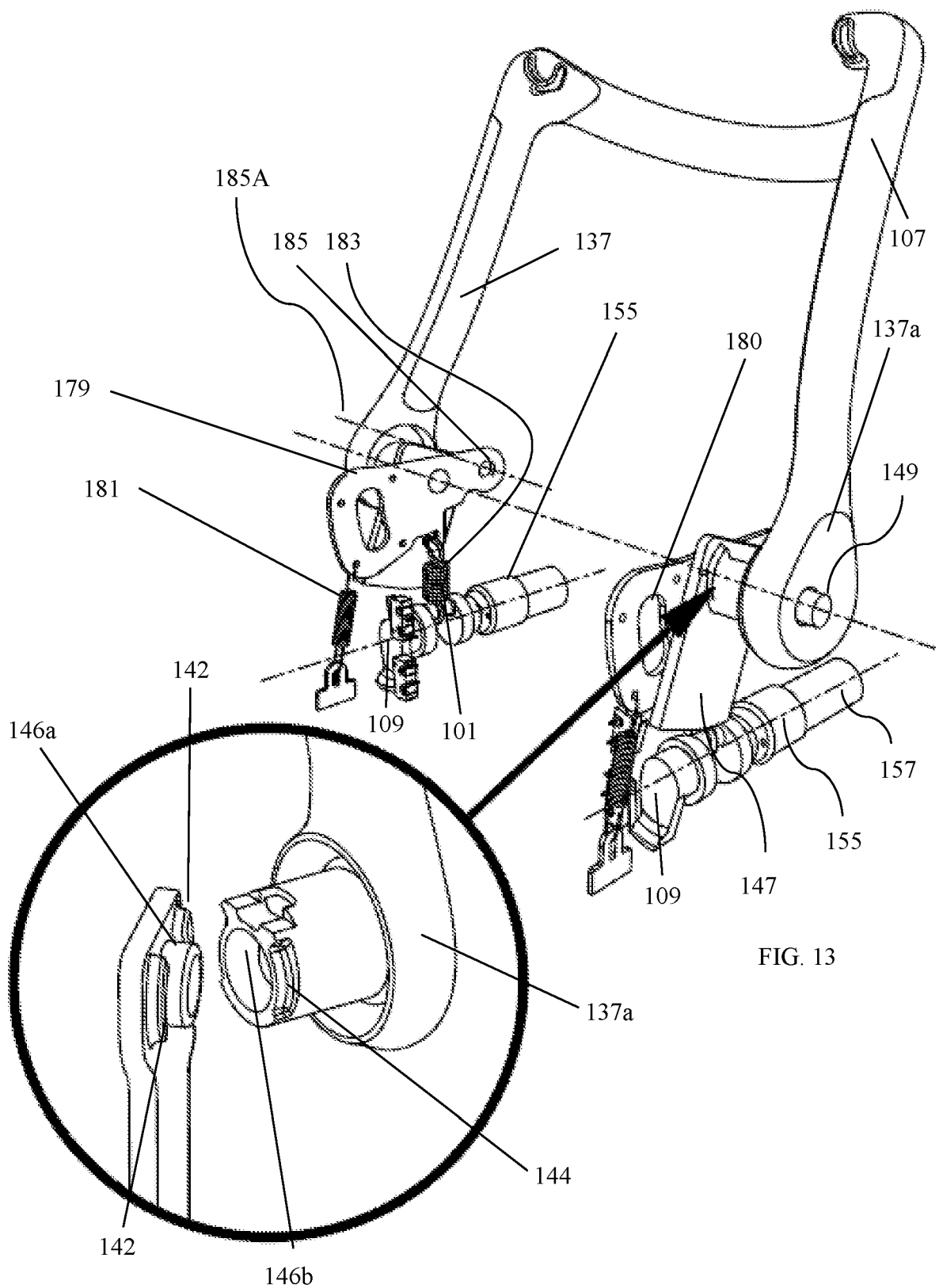
FIG. 13 is a detailed perspective cut-away view of the kitchen device of FIG. 11.
FIG. 14 is a detailed exploded perspective view of the retaining arm of the kitchen device of FIG. 11.

As seen in FIG. 13, the crank 187 also includes a restraint, preferably a blocking extrusion 109, generally extending in a plane normal to the first axis 199. The blocking extrusion 109 extends away from the first axis 199 in a direction generally opposite to the location of the restraining spring pin 191.

Figure 19:
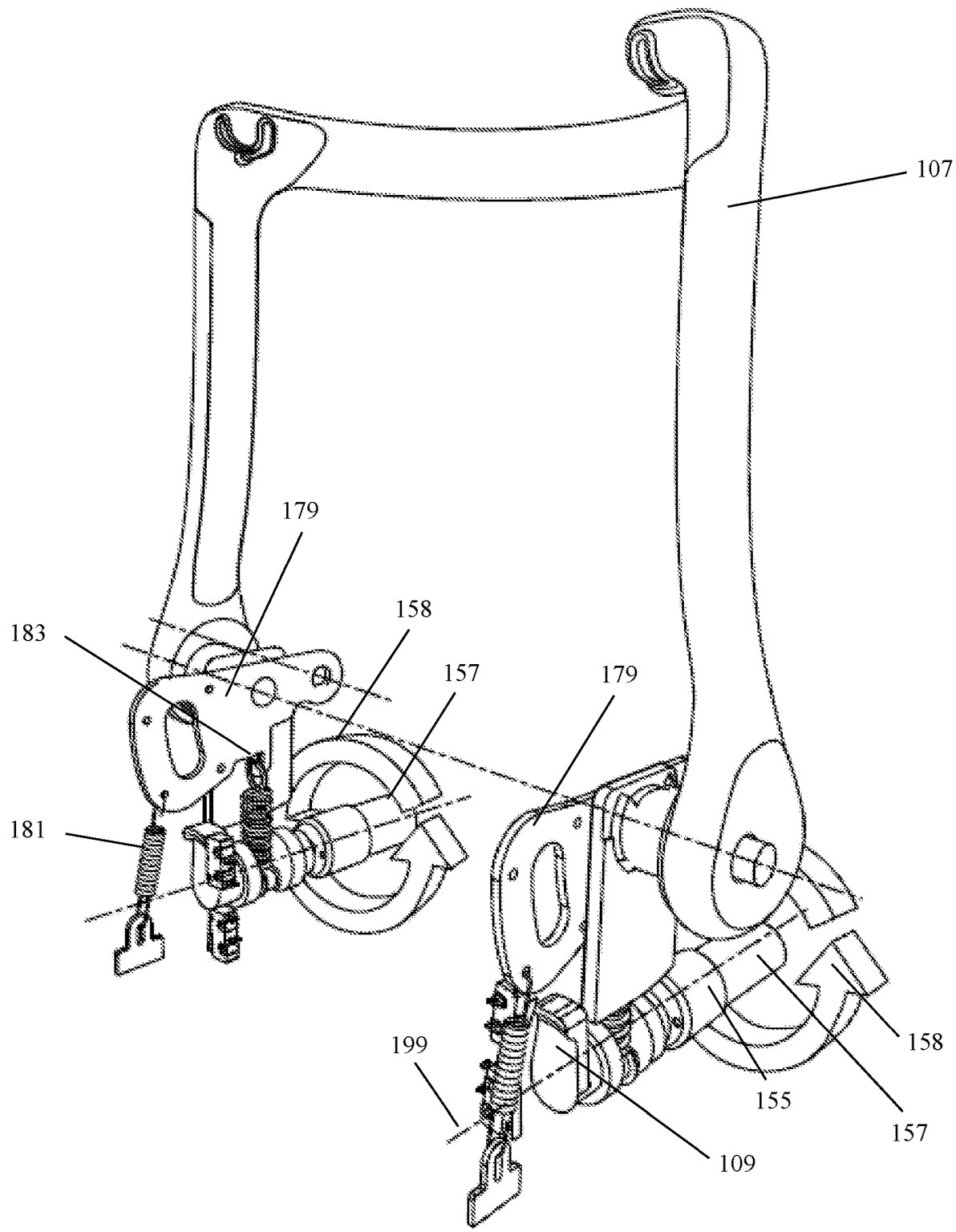
FIG. 19 is a perspective cut-away view of the kitchen device of FIG. 11.
Figure 22:
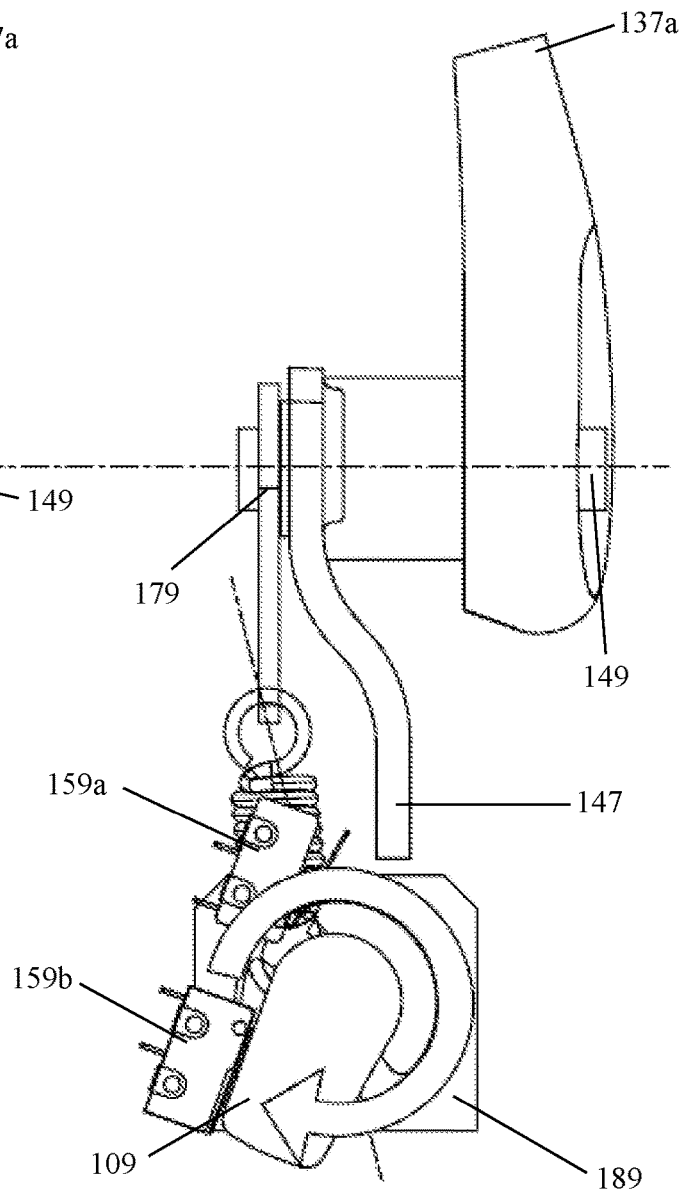
FIG. 22 is a detailed cut-away front view of the kitchen device of FIG. 11 in the configuration shown in FIG. 17.
Figures 23, 24:
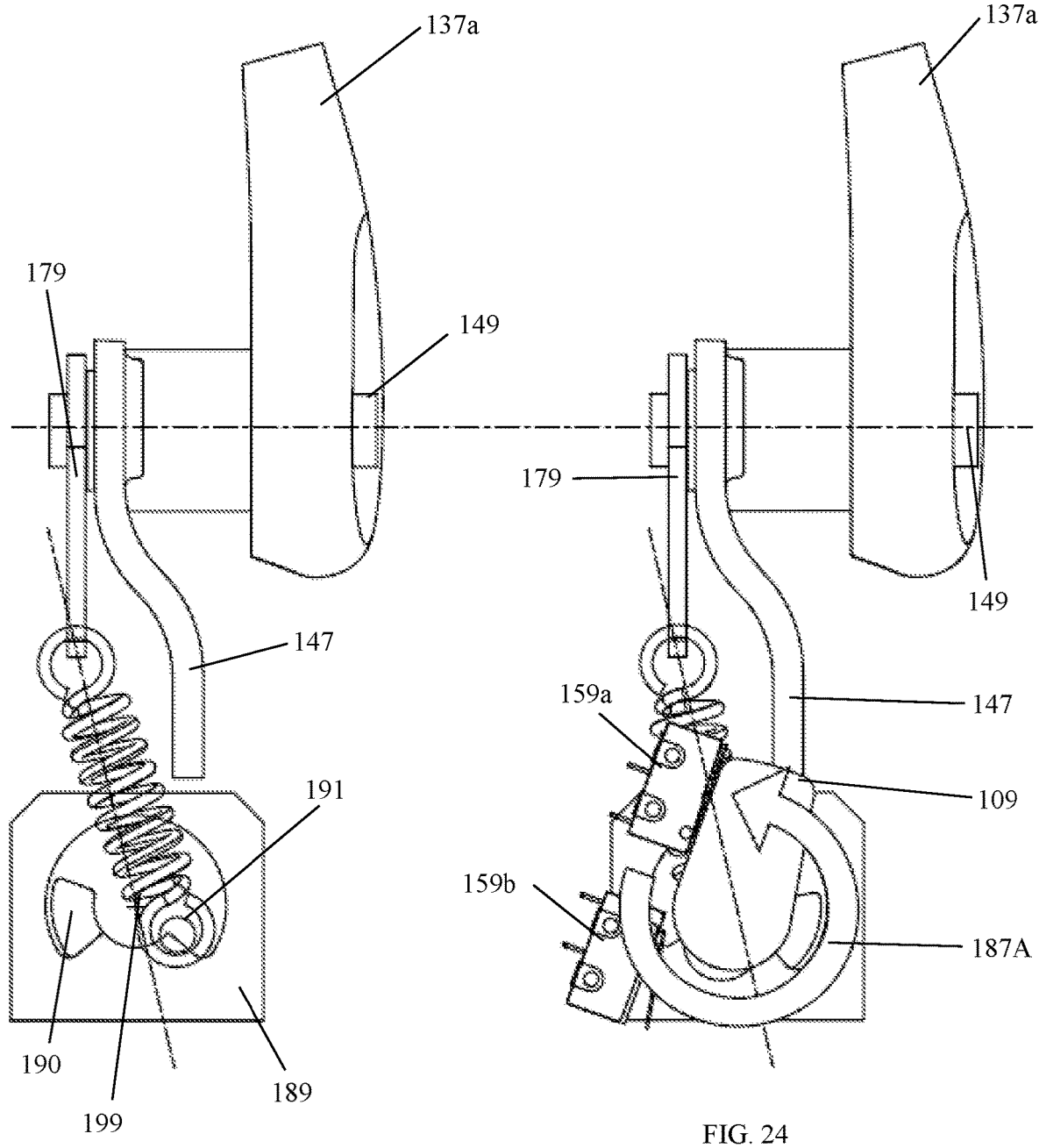
FIG. 23 is a detailed cut-away rear view of the kitchen device of FIG. 11 in the configuration shown in FIG. 19.
FIG. 24 is a detailed cut-away front view of the kitchen device of FIG. 11 in the configuration shown in FIG. 19.

Referring now to FIG. 19, wherein the securing motor 157 has been driven in a first motor direction 158 such that the crank 187 has pivoted about the first axis 199 to a securing position. In the securing position, the restraining spring 183 is in a tensioning state relative to the predetermined state, as also shown in FIG. 23. The tension of the restraining spring 183 imparts a strong pivotal bias in the first bias plate direction on the bias plate 179. When the crank 187 is in the securing position, the crank stop 190 is engaged with the crank case 189, as best seen in FIGS. 21 and 22, to prevent further pivoting of the crank 187 beyond the secured position. The tension of the restraining spring 185 causes a moment in the crank 187 about the first axis 199 that causes the crank stop 190 to bear against the crank case 189. As shown in FIGS. 21 to 24, the crank 187 is pivoted between the free position and the securing position such that the restraining spring pin 191 travels through a moment arm centre 183A, connecting the first axis 199 and a connection point of the restraining spring 183 with the bias plate 183. This motion from the free position to the securing position, shown as pivoting direction 187A in FIG. 24, allows the restraining spring 183 to cause the moment in the crank 187 that causes the crank stop 190 to bear against the crank case 189, thereby securely retaining the crank 187 and the restraining spring 183 in the securing position.

In a preferred embodiment, the tension on the restraining spring 183 is between 100 N to 400 N in the tensioning state. The bias plate 179 thus causes a tension force in the retaining arm 107, substantially parallel to the longitudinally extending members 137. The retaining arm 107 thus bears against the lid 121, and thereby compresses the lid 121 against the vessel 105, and thereby the vessel 105 against the body 103.

Figure 25:
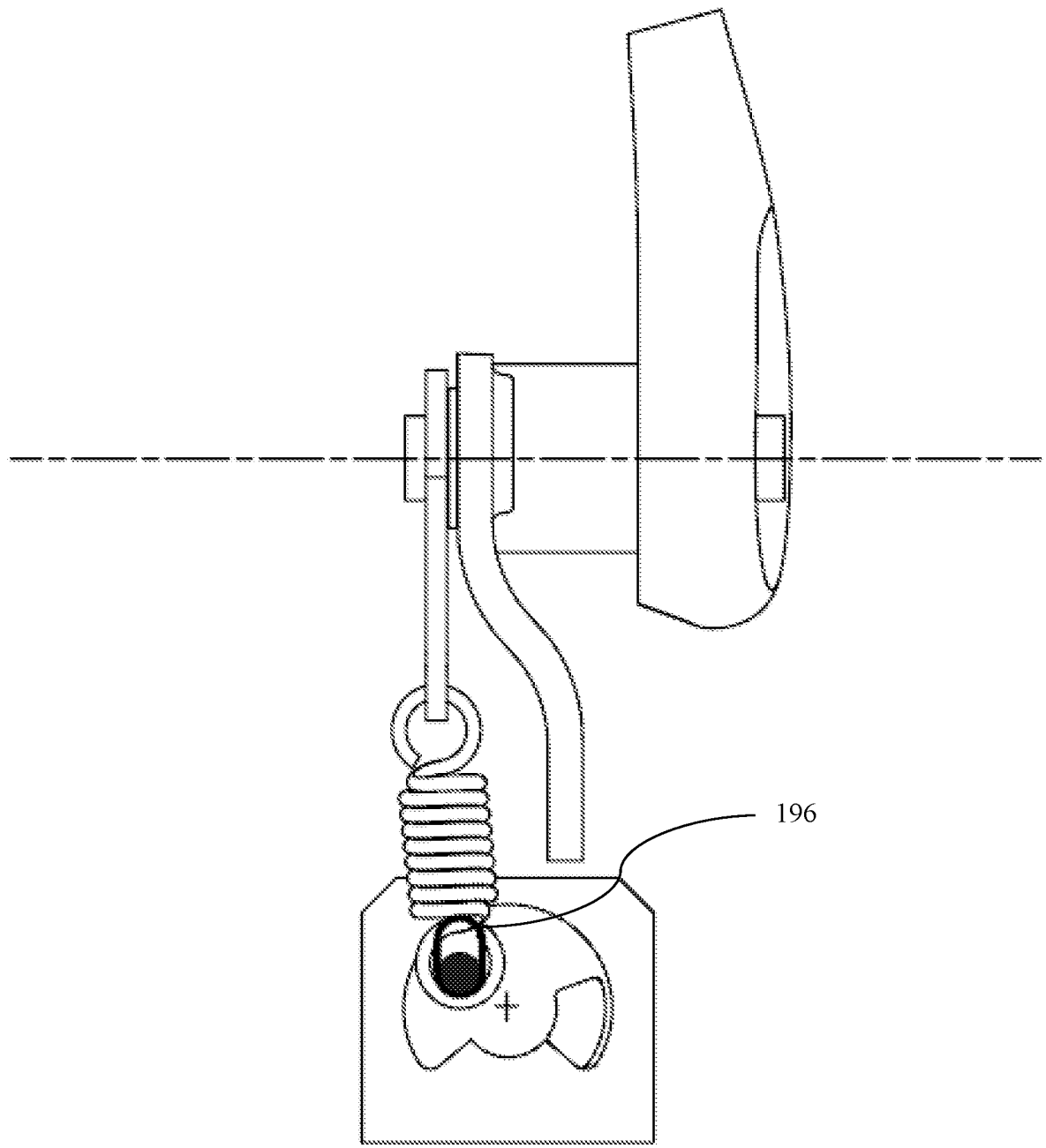
FIG. 25 is a detailed cut-away rear view of an alternate construction of the kitchen device of FIG. 11 in the configuration shown in FIG. 17.
Figures 26, 27:
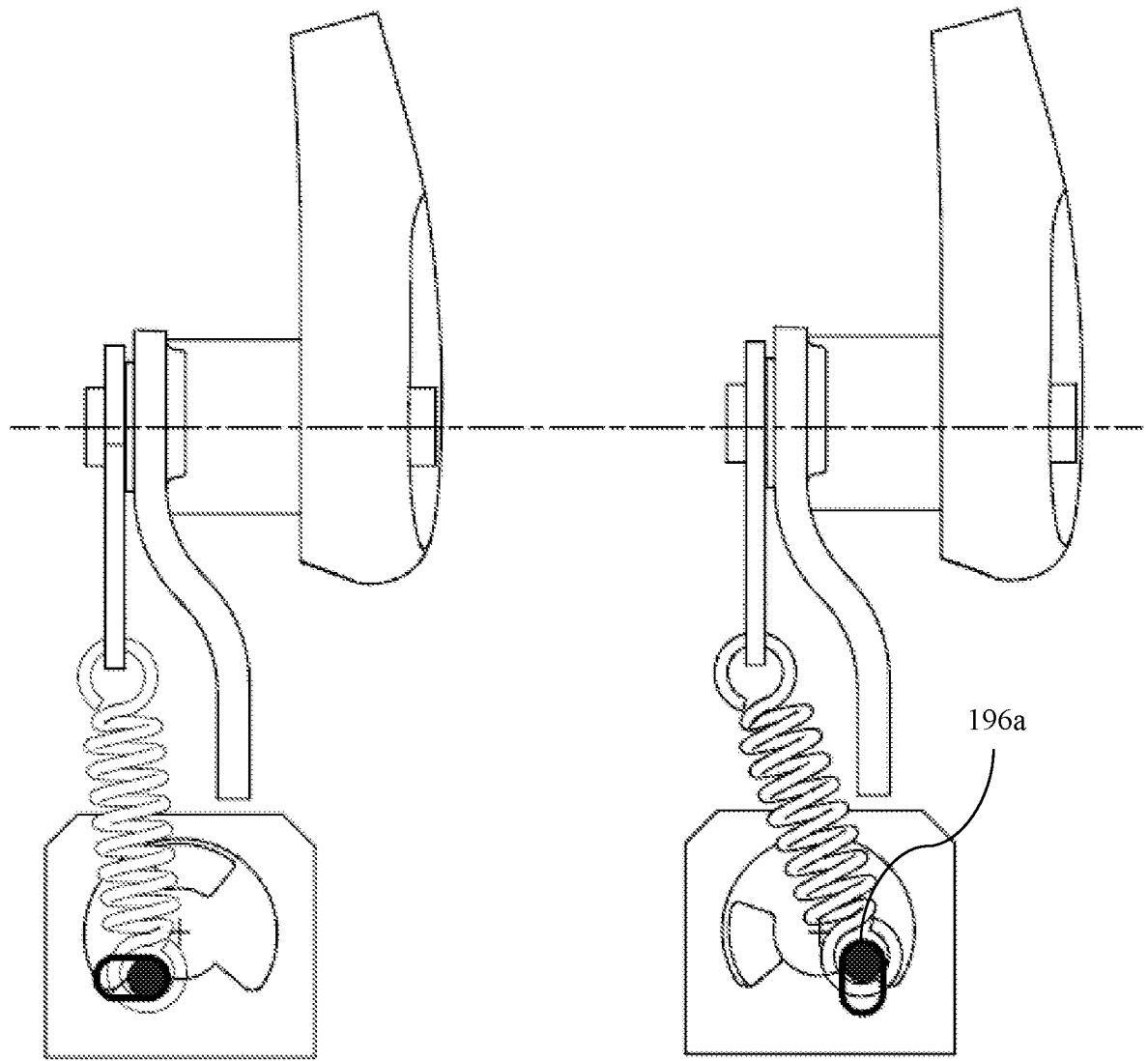
FIG. 26 is a detailed cut-away rear view of an alternate construction of the kitchen device of FIG. 11 between the configurations shown in FIGS. 17 and 19.
FIG. 27 is a detailed cut-away rear view of an alternate construction of the kitchen device of FIG. 11 in the configuration shown in FIG. 19.

As shown in FIGS. 25 to 27, in a contemplated alteration to the second embodiment, the restraining string pin 191 may be mounted in a pin slot 196 such that the restraining string in 191 floats in the pin slot 196. This allows the restraining spring pin 191 to float in response to tension applied by the restraining spring 183, which, in the free position of the crank 187, ensures that the predetermined state of the restraining spring 183 has no substantial tension. The lack of tension on the restraining spring 183 ensures that movement of the retaining arm 107 may be performed by a user without resistance imparted by the restraining spring 183. Additionally, an upper end 196a of the pin slot 196 defines a known position that the restraining spring pin 191 will be moved to when the crank 187 is moved from the free position to the securing position, thus tensioning the restraining spring 183 to the tensioning state. A distance between the upper end 196a and the restraining spring 183, together with a spring coefficient of the restraining spring 183, may be used to predetermine a desired tension on the restraining spring 183 in the tensioning state.

As shown in FIGS. 22 and 24, the locking mechanism 104 also comprises a first and second securing member sensors, preferably first and second blocking extrusion sensors 159a, 159b, adapted to communicate with the processor to indicate a position of the blocking extrusion 109. The first blocking extrusion sensor 159a is located such that it is activated when the blocking extrusion 109 is in a securing position shown in FIG. 24. When the blocking extrusion 109 is in the securing position, the blocking extrusion 109 blocks movement of the extension arm 147 when the retaining arm 107 is in the retaining position, thereby securing the retaining arm 107 in a secured retaining position, as shown in FIG. 20.

Figure 18:
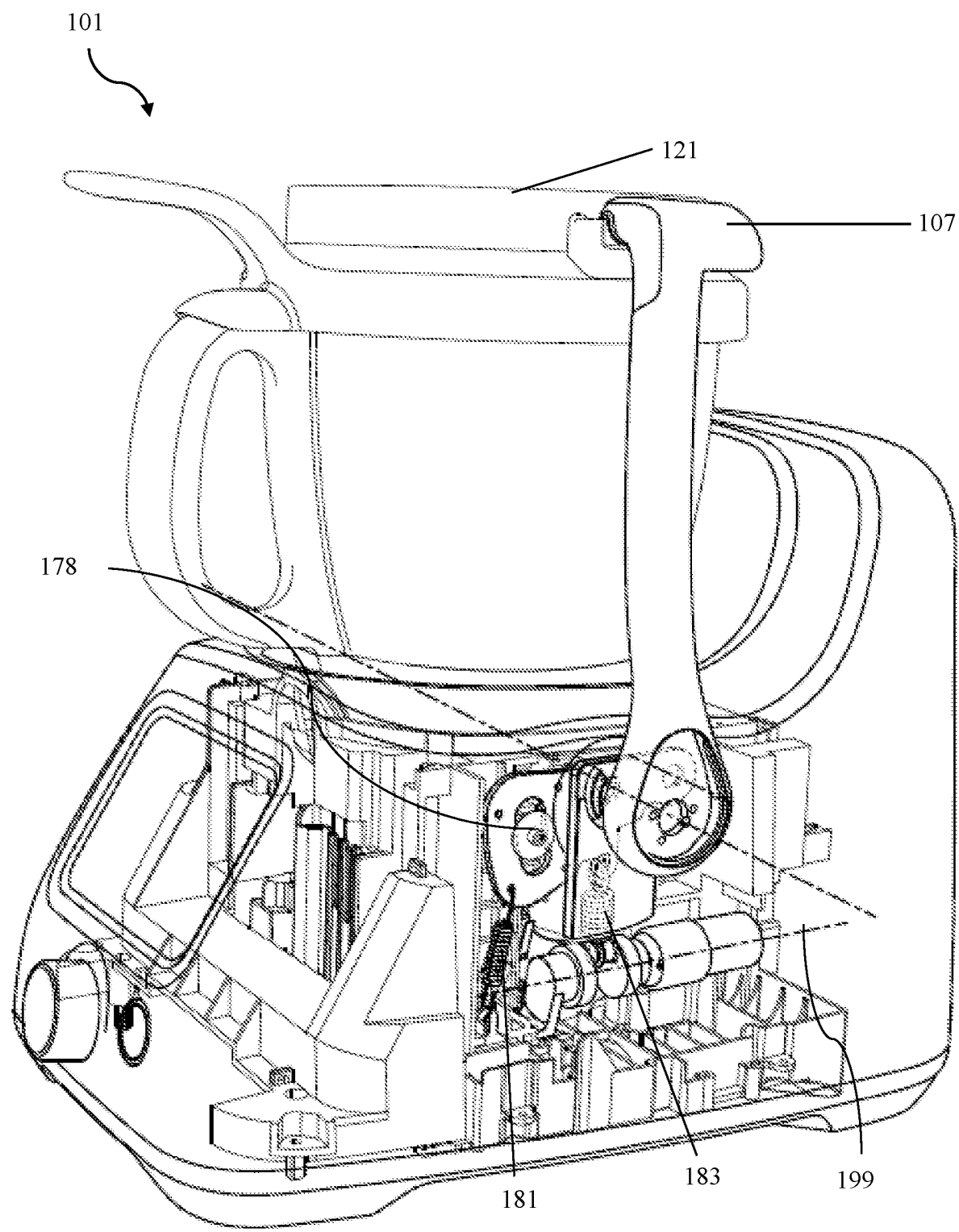
FIG. 18 is a detailed perspective cut-away view of the kitchen device of FIG. 11 in the configuration shown in FIG. 17.

The second blocking extrusion sensor 159b is located such that it is activated when the blocking extrusion 109 is in a free position shown in FIG. 22. When the blocking extrusion 109 is in the free position, the blocking extrusion 109 does not block movement of the extension arm 147, as shown in FIG. 18.

Referring now to FIGS. 28 and 29, the retaining arm 107 includes a protrusion 136 on each respective side of the rounded member 138 adjoining the second end 137b of the longitudinally extending member 137. The protrusion 136 is adapted to engage a notch 135 in the lid 121 when the retaining arm 107 is moved in an arm direction 197 from the free position to the retaining position. The recess 125 is formed in a projection 127 on two sides of the lid 121, corresponding to the sides of the rounded member 138 on which the protrusions 136 are located. Preferably, the protrusions 136 and projections 127 are symmetrically located. The projection 127 also includes a contact edge 133 that cooperates with a lid sensor (not shown) in a channel 141, best seen in FIG. 37. The projection 127 also has a leading edge, or ramp, 129 that slopes downwardly and opposite the arm direction 197.

Figures 30, 31:
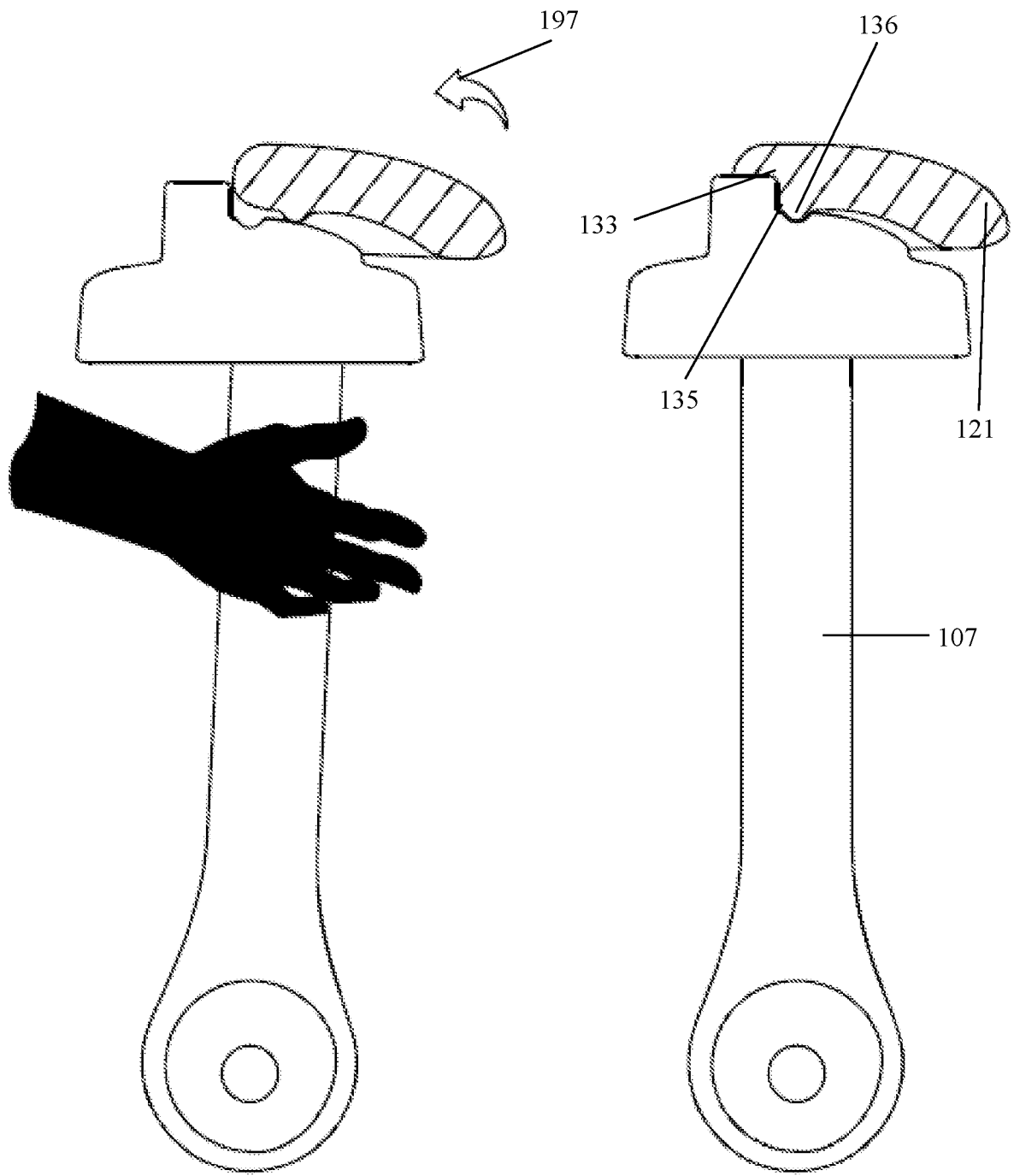
FIG. 30 is a detailed cut-away right side section view of the kitchen device of FIG. 11 between the configurations shown in FIGS. 16 and 18.
FIG. 31 is a detailed cut-away right side section view of the kitchen device of FIG. 11 in the configurations shown in FIG. 18.
Figures 32, 33, 34:
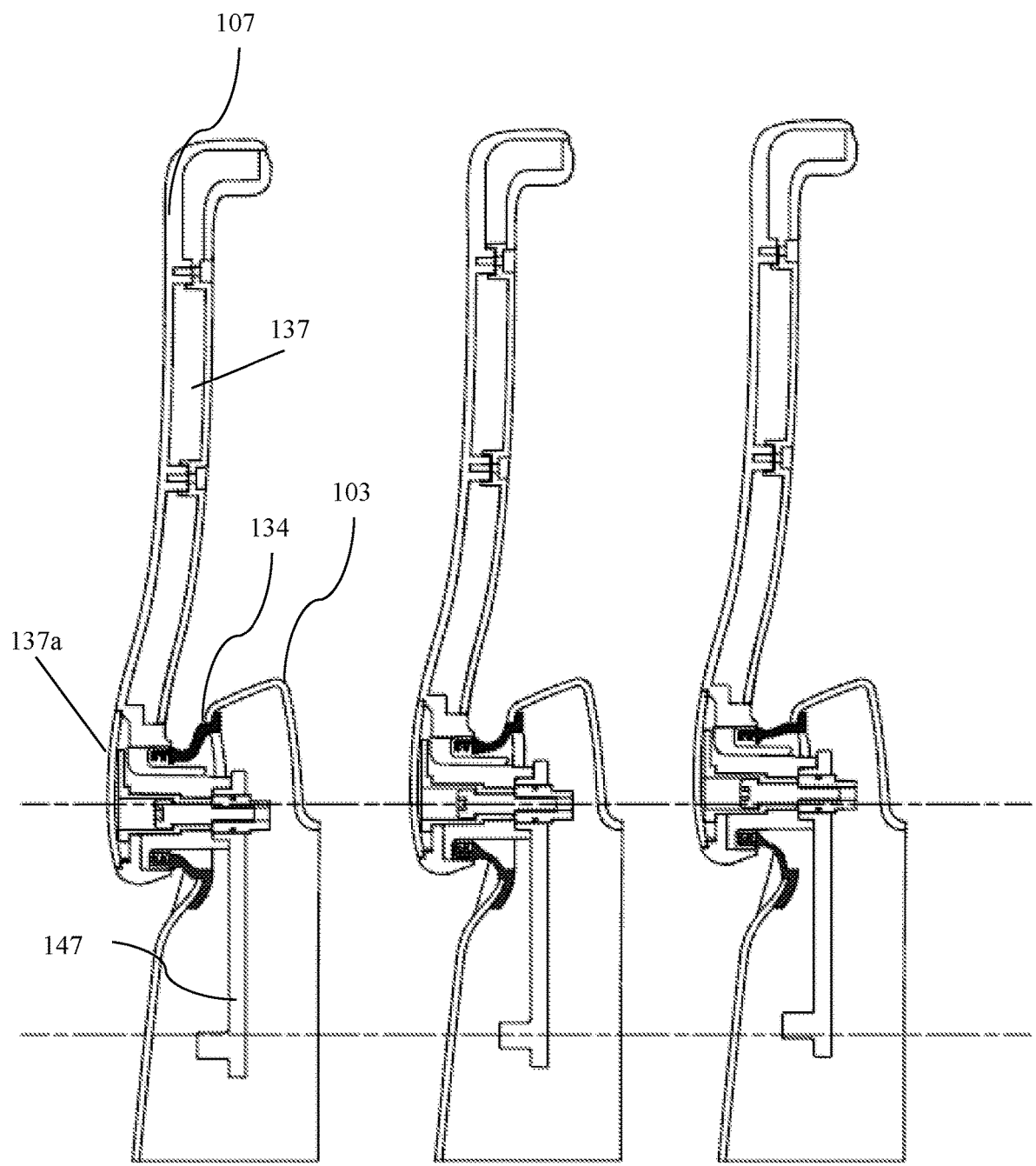
FIG. 32 is a detailed cut-away section view along the major axis of the retaining member of the kitchen device of FIG. 11 in the configuration shown in FIG. 16.
FIG. 33 is a detailed cut-away section view along the major axis of the retaining member of the kitchen device of FIG. 11 between the configurations shown in FIGS. 16 and 18.
FIG. 34 is a detailed cut-away section view along the major axis of the retaining member of the kitchen device of FIG. 11 in the configuration shown in FIG. 18.

As shown in FIGS. 30 and 31, the notch 135 is engaged by the protrusion 136 when the retaining arm 107 is in the retaining position. The engagement of the notch 135 with the protrusion 136 resists movement of the retaining arm 107 against the arm direction 197. As shown in FIGS. 32 to 34, the locking mechanism 104 further comprises a retaining arm seal 134, or grommet seal 134, seated between the first end 137a of the longitudinally extending member 137 and the body 103. The retaining arm seal 134 is compliant such that upwards movement of the retaining arm 109 when the protrusion 136 engages the ramp 129 (both shown in FIG. 30) is subtly resisted. Thereby movement of the retaining arm 107 has haptic feedback, but the retaining arm 107 remains easily movable by the user.

Figure 34A:
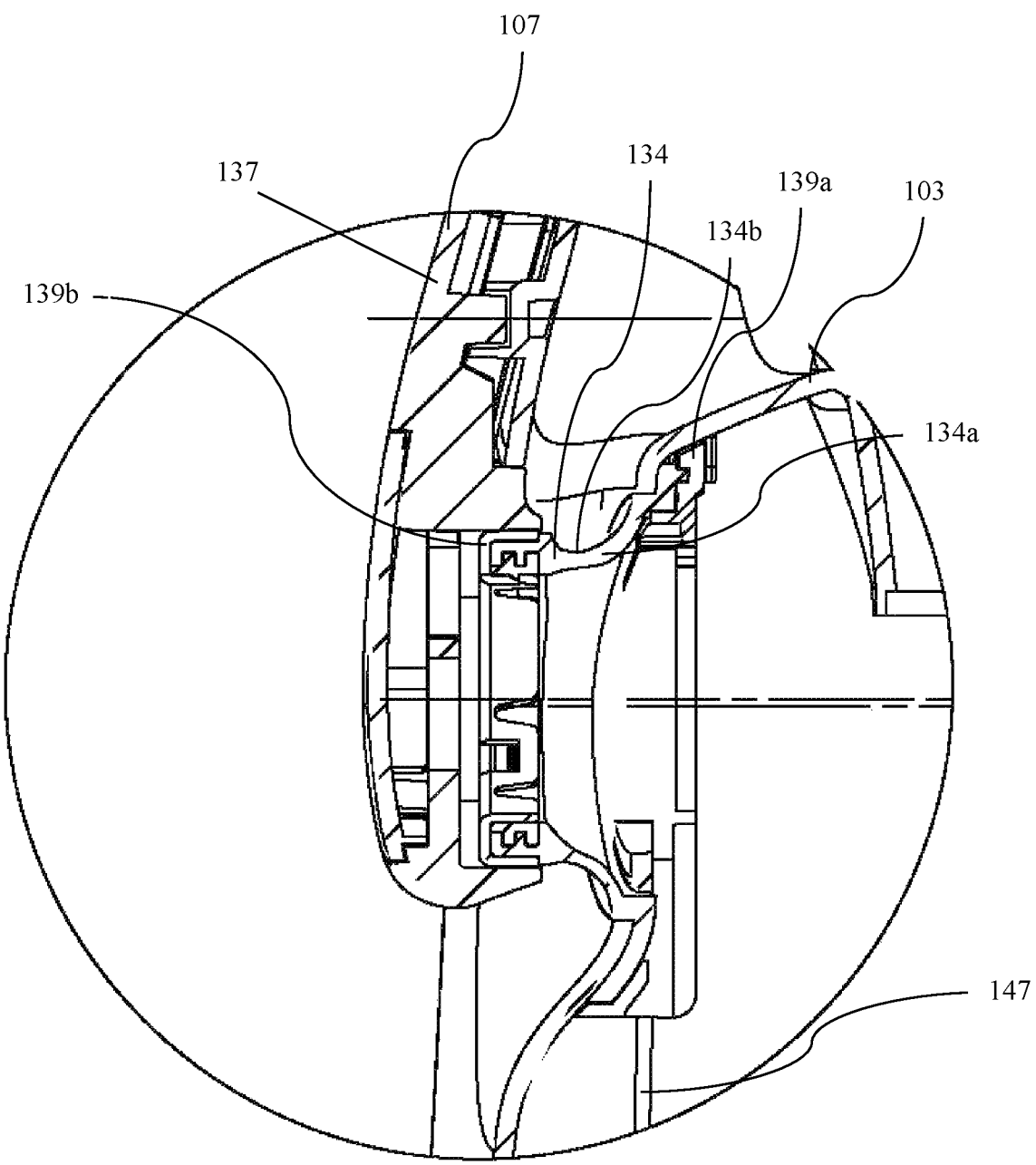
FIG. 34A is a detailed cut-away section view along the major axis of the retaining seal of the kitchen device of FIG. 11 in the configuration shown in FIG. 18.

Referring now to FIG. 34A, wherein the retaining arm seal 134 is shown in more detail, and in section. As shown in FIG. 34A, the retaining arm seal 134 includes a concave portion 134a with a lowest point 134b located between the body 103 and the retaining arm 107. Preferably the radius of curvature of the concave portion 134a is between 5 mm and 50 mm, in the preferred embodiment of FIG. 34A, the radius of curvature is 5 mm.

Figure 34B:
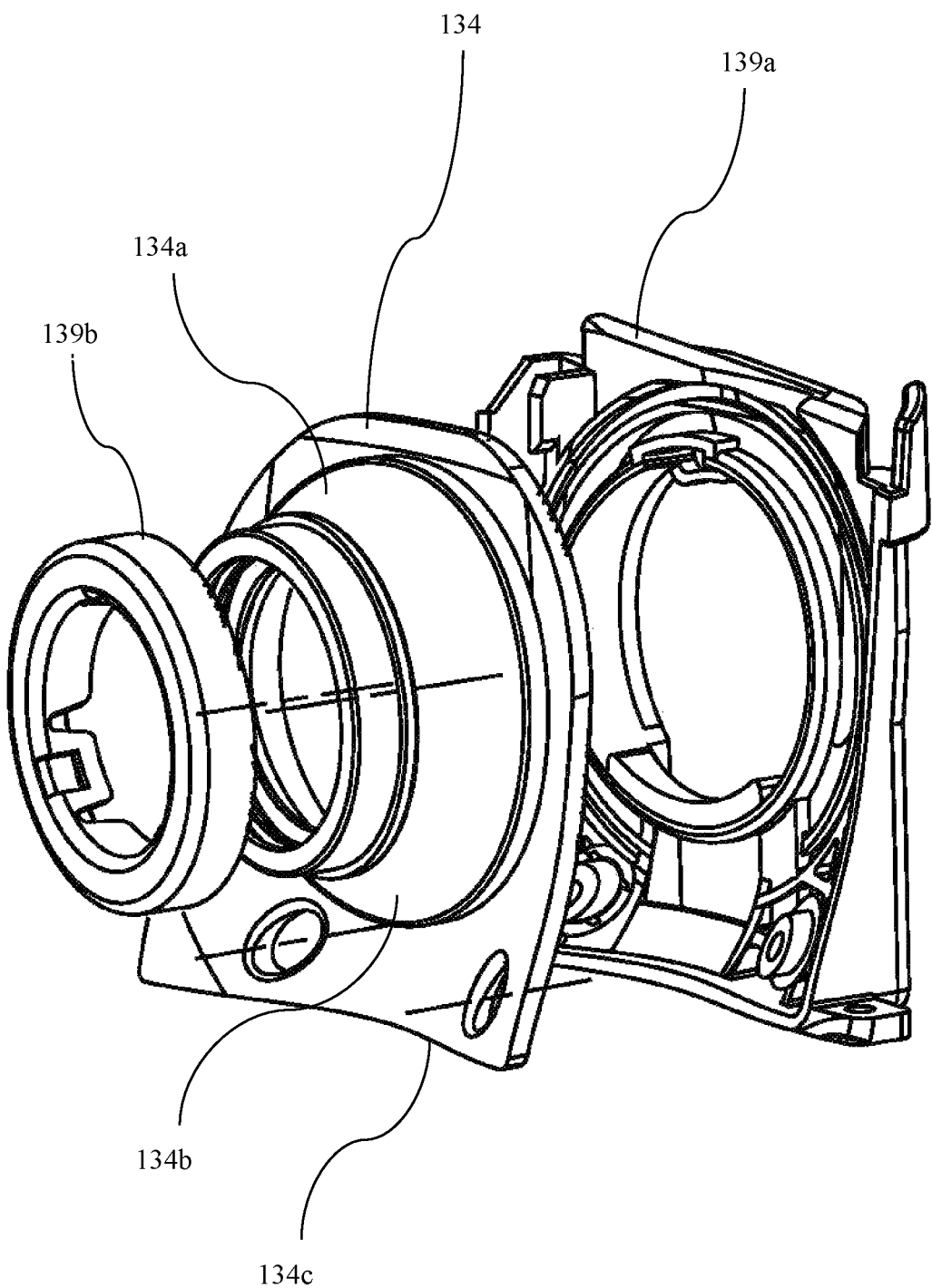
FIG. 34B is a detailed exploded view of the retaining seal of the kitchen device of FIG. 11.

As shown in FIG. 34A, the retaining arm seal 134 is fastened to the body 103 by a body snap piece 139a to resist rotational movement of the retaining arm seal 134 relative to the body 103. As shown in FIG. 34B, the retaining arm seal 134 has a flat portion 134c that abuts the body snap piece 139a to allow for rotational movement of the retaining arm seal 134 relative to the body 103 to be resisted. The retaining arm seal 134 is able to deform vertically, as the body snap piece 139a has a gap at an upper end allowing deformation of the retaining arm seal 134, thereby providing the subtle resistance that provides haptic feedback.

Similarly, the retaining arm seal 134 is fastened to the retaining arm 107 by an arm snap piece 139b to resist rotational movement of the retaining arm seal 134 relative to the retaining arm 107, and to, at least, reduce contact between the retaining arm 107 and the retaining arm seal 134. Preferably, one or both of the body snap piece 139a and the arm snap piece 139b are made of plastic material.

Figure 35:
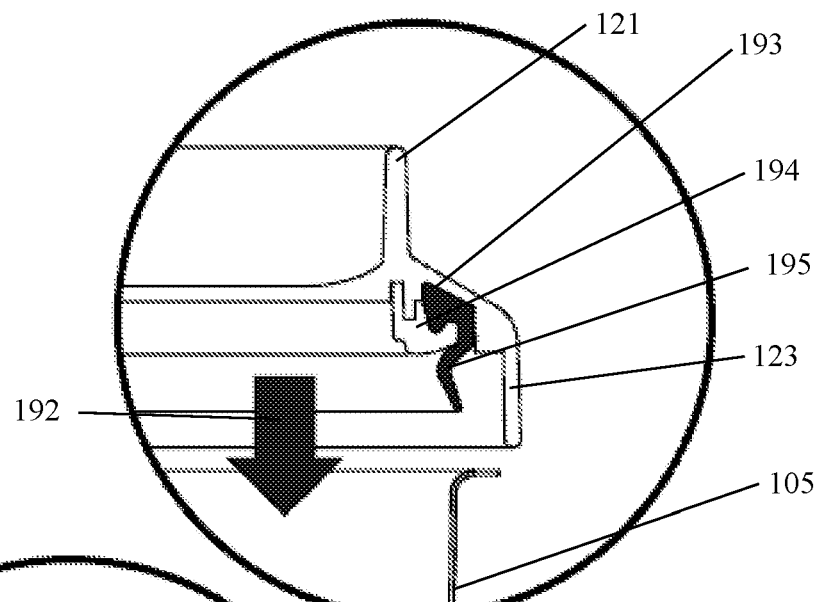
FIG. 35 is a detailed section view of a lid, seal and vessel of the kitchen device of FIG. 11 in the configuration shown in FIG. 15.
Figure 36:
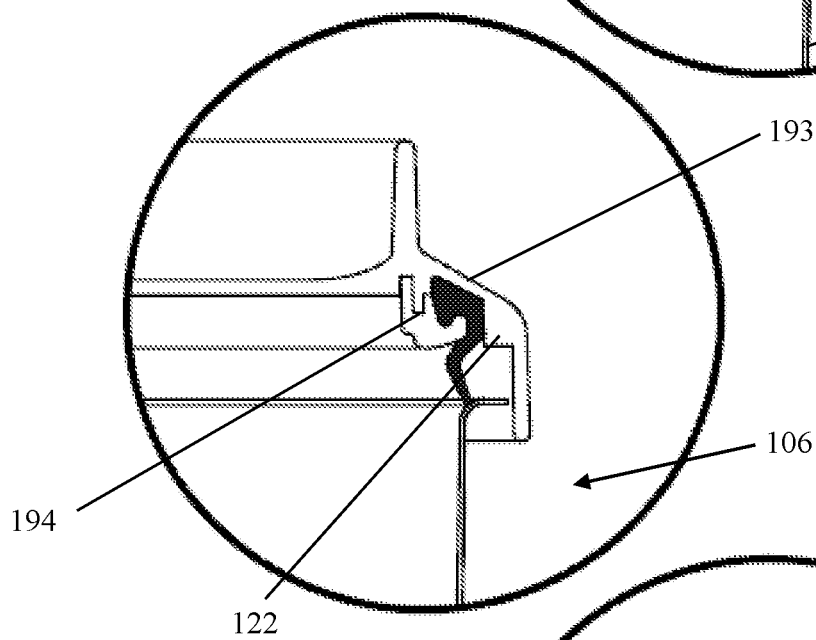
FIG. 36 is a detailed section view of a lid, seal and vessel of the kitchen device of FIG. 11 in the configuration shown in FIG. 16.
Figure 37:
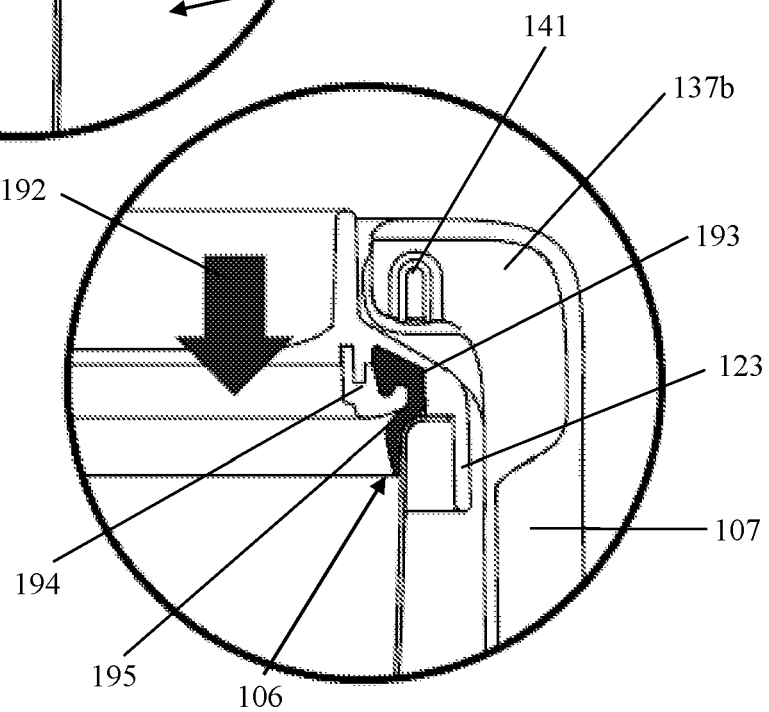
FIG. 37 is a detailed section view of a lid, seal and vessel of the kitchen device of FIG. 11 in the configuration shown in FIG. 18.

Referring now to FIGS. 35 to 37, the lid 121 has a seal 193 adapted to engage the vessel 105 when the retaining arm 107 is in the retaining position. The engagement of the seal 193 with the vessel 105 assists in retaining the lid 121 against the vessel 105.

As shown in FIG. 35, the seal 193 is held in its position relative to the lid 121 by a seal retaining member 194. As can also be seen in FIG. 35, the lid has a rim 123 that, when the lid 121 is placed on the vessel 105, extends below a rim 106 of the vessel 105. The term rim 106 refers to the portions of the vessel 105 proximate to the opening 105a, as indicated in FIG. 35. The seal 193 has a sealing lip 195 that engages with a portion of the rim 106.

Figure 38:
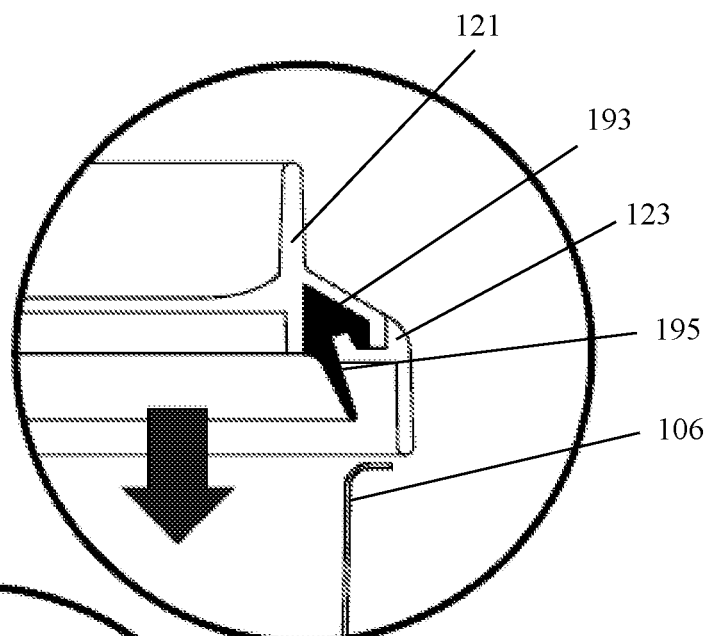
FIG. 38 is a detailed section view of a lid, seal and vessel of the kitchen device of FIG. 11 in the configuration shown in FIG. 15.
Figure 39:
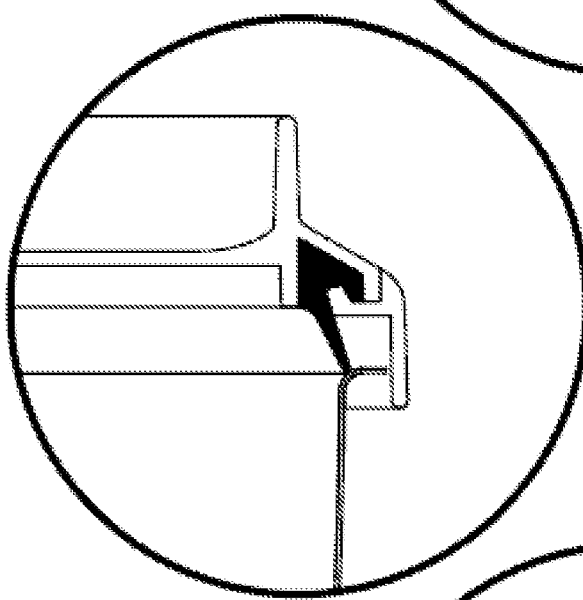
FIG. 39 is a detailed section view of a lid, seal and vessel of the kitchen device of FIG. 11 in the configuration shown in FIG. 16.
Figure 40:
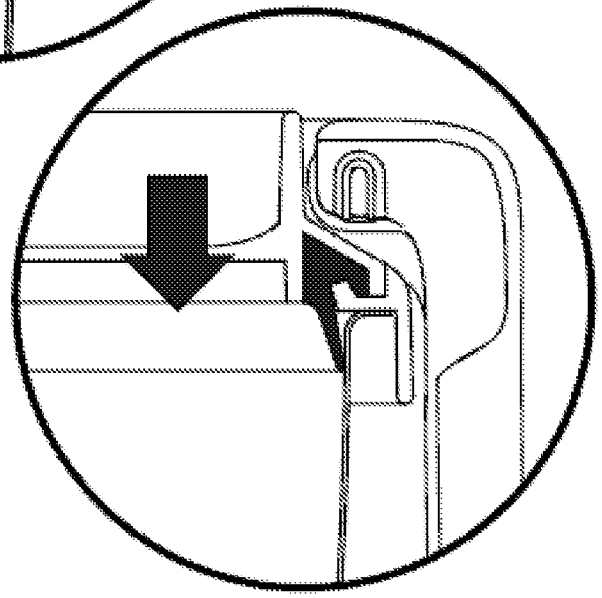
FIG. 40 is a detailed section view of a lid, seal and vessel of the kitchen device of FIG. 11 in the configuration shown in FIG. 18.

FIGS. 38 to 40 show an alternative embodiment of the seal 193. In this embodiment, the rim 123 of the lid 121 retains the seal 193, and thus no seal retaining member is necessary. The seal 193 also has a sealing lip 195 that is substantially linear, compared to the curved design of the sealing lip 195 of FIGS. 35 to 37.

Figures 45, 46:
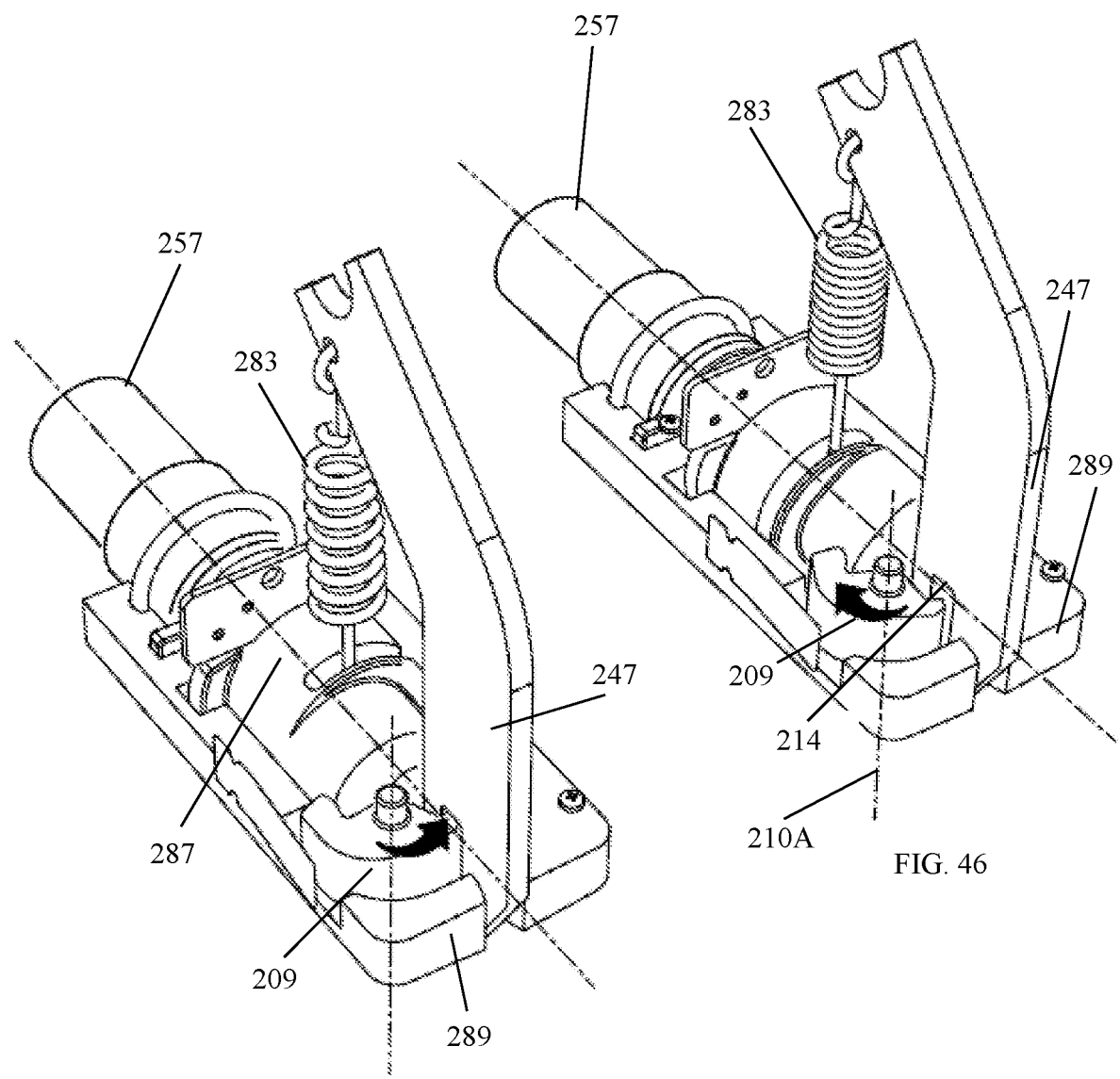
FIG. 45 is a detailed cut-away perspective view of the kitchen device of FIG. 41 in the configuration of FIG. 41.
FIG. 46 is a detailed cut-away perspective view of the kitchen device of FIG. 41 in the configuration of FIG. 43.

A third embodiment of the kitchen device 201 is shown in FIGS. 41-46. The kitchen device 201 is similar to the kitchen device 101. However, the locking mechanism 204 of the kitchen device 201 includes a securing member, preferably a latch 209, mounted on a latch pin 210. The latch pin 210 defines a second axis 210A, as shown in FIG. 46. The latch 209 is pivotable about the second axis 210A between a securing position, shown in FIGS. 42 and 45, and a free position, shown in FIGS. 44 and 46. When the latch 209 is in the securing position a key 216 of the latch 209 engages a slot 214 in an extension arm 247 of a retaining arm (not shown). The engagement of the key 216 with the slot 214 prevents movement of the retaining arm thereby securing the retaining arm in a secured retaining position.

The latch 209 is biased towards the free position by a latch spring 211. In other contemplated embodiments, the latch spring 211 may be a leaf spring or a torsion spring, which may provide space savings. The latch spring 211 is compressed between the latch 209 and a crank case 289, within which a crank 287 is mounted. The crank 287 is pivotable about a first axis 299 between a securing position, shown in FIG. 41, and a free position, shown in FIG. 43. Preferably, the first axis 299 is generally perpendicular to the second axis 210a. The locking mechanism 204 further includes a securing motor 257 which moves the crank 287 between the free position and the securing position.

The crank 287 further includes a restraining spring pin 291 to which a second elastic member is mounted. Preferably, the second elastic member is a restraining spring 283. As seen in FIGS. 41 and 43, the restraining spring 283 is in a predetermined state, or a free position, when the crank 287 is in the free position, and the restraining spring 283 is in a tensioning state relative to the predetermined state, when the crank 287 is in the securing position. The restraining spring 283, when in the tensioning state, applies tension to the extension arm 247, the tension applied to the extension arm 247 prevents movement of the retaining arm 207.

As seen in FIG. 45, the crank 287 also includes a ledge 212. When the crank 287 is moved from the free position to the securing position, the ledge 212 engages the latch 209 and moves the latch 209 from the free position to the securing position. When the crank 287 is moved from the securing position to the free position, the ledge 212 disengages the latch 209 and the latch 209 moves from the securing position to the free position due to the bias applied by the latch spring 211.

Figure 47:
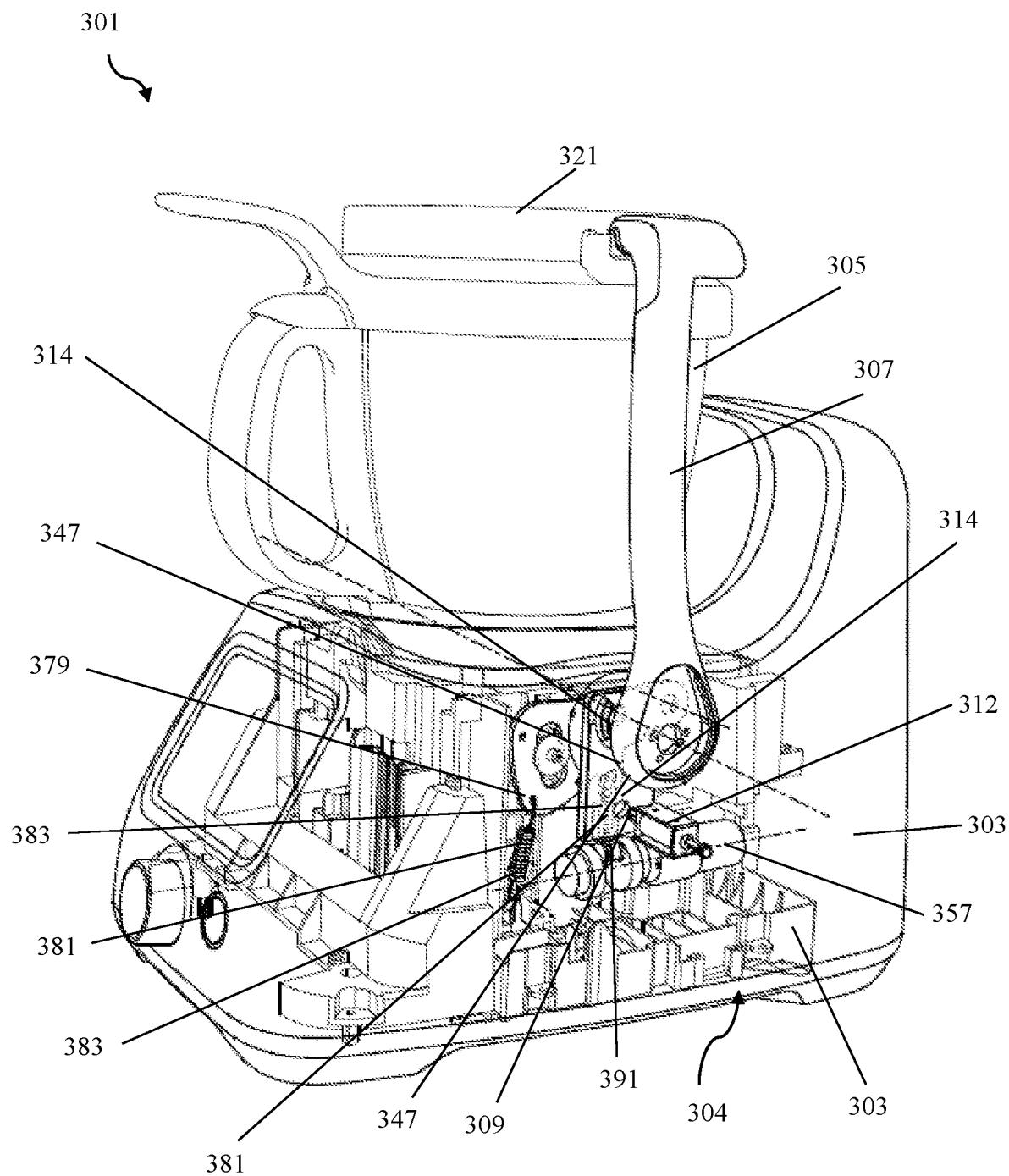
FIG. 47 is a cut-away perspective view of a kitchen device having a locking mechanism according to a fourth embodiment of the invention.
Figure 48:
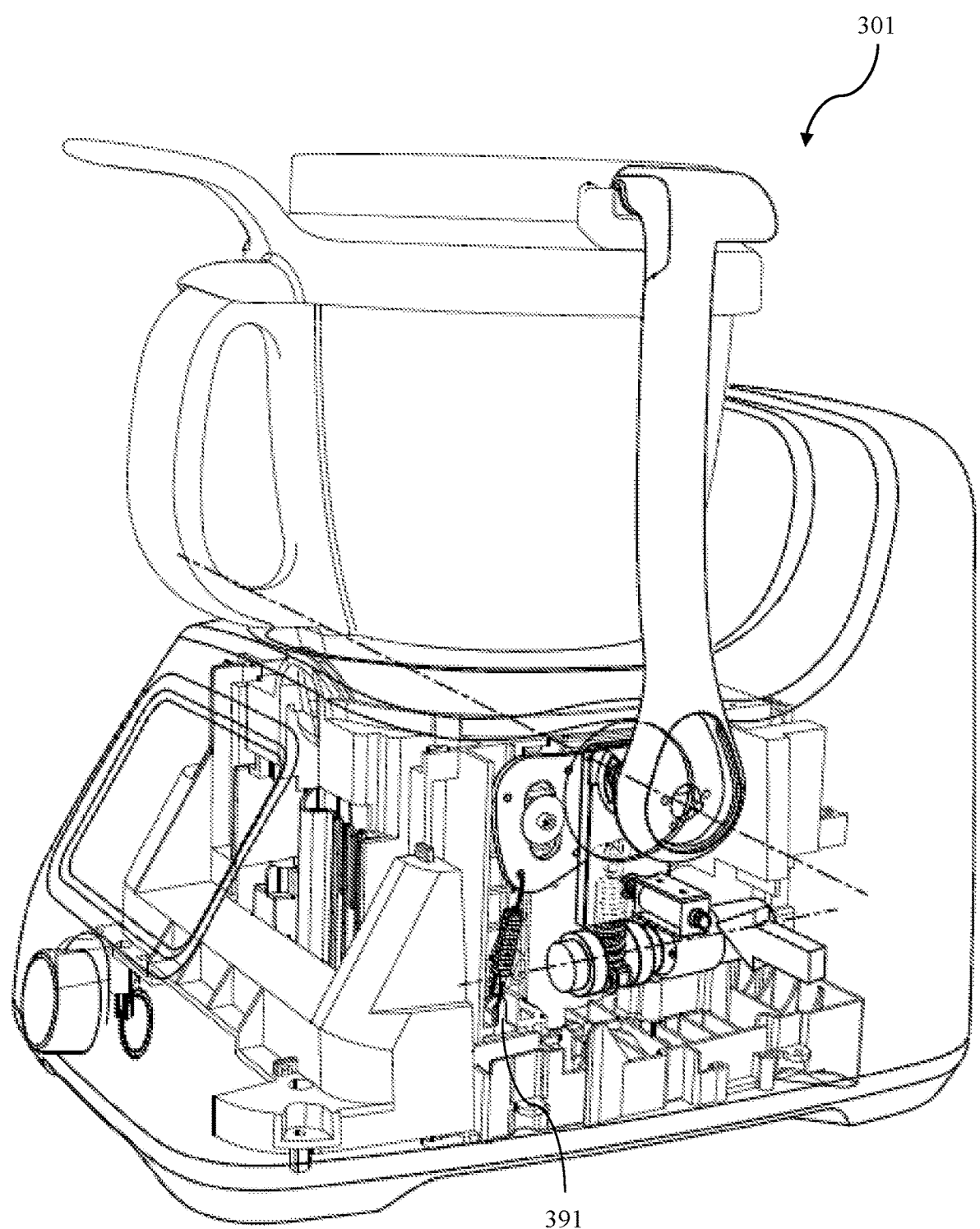
FIG. 48 is a cut-away perspective view of the kitchen device of FIG. 47 in a second configuration.

A fourth embodiment of the kitchen device 301 is shown in FIGS. 47 and 48. The kitchen device 301 is similar to the kitchen device 201. However, the locking mechanism 304 of the kitchen device 301 includes a solenoid 312. The solenoid 312 is adapted to apply force and move a pin 309 from a free position, shown in FIG. 47, to a securing position, shown in FIG. 48. In the securing position the pin 309 engages a slot 314 in an extension arm 347 of a retaining arm 307, when the retaining arm 307 is in a retaining position as shown in FIGS. 47 and 48. Preferably, the movement of the pin 309, and the direction of the slot 314, is parallel to an axis about which the retaining arm 307 pivots. The engagement of the pin 309 with the slot 314 prevents movement of the retaining arm 307 from the retaining position.

Figure 49:
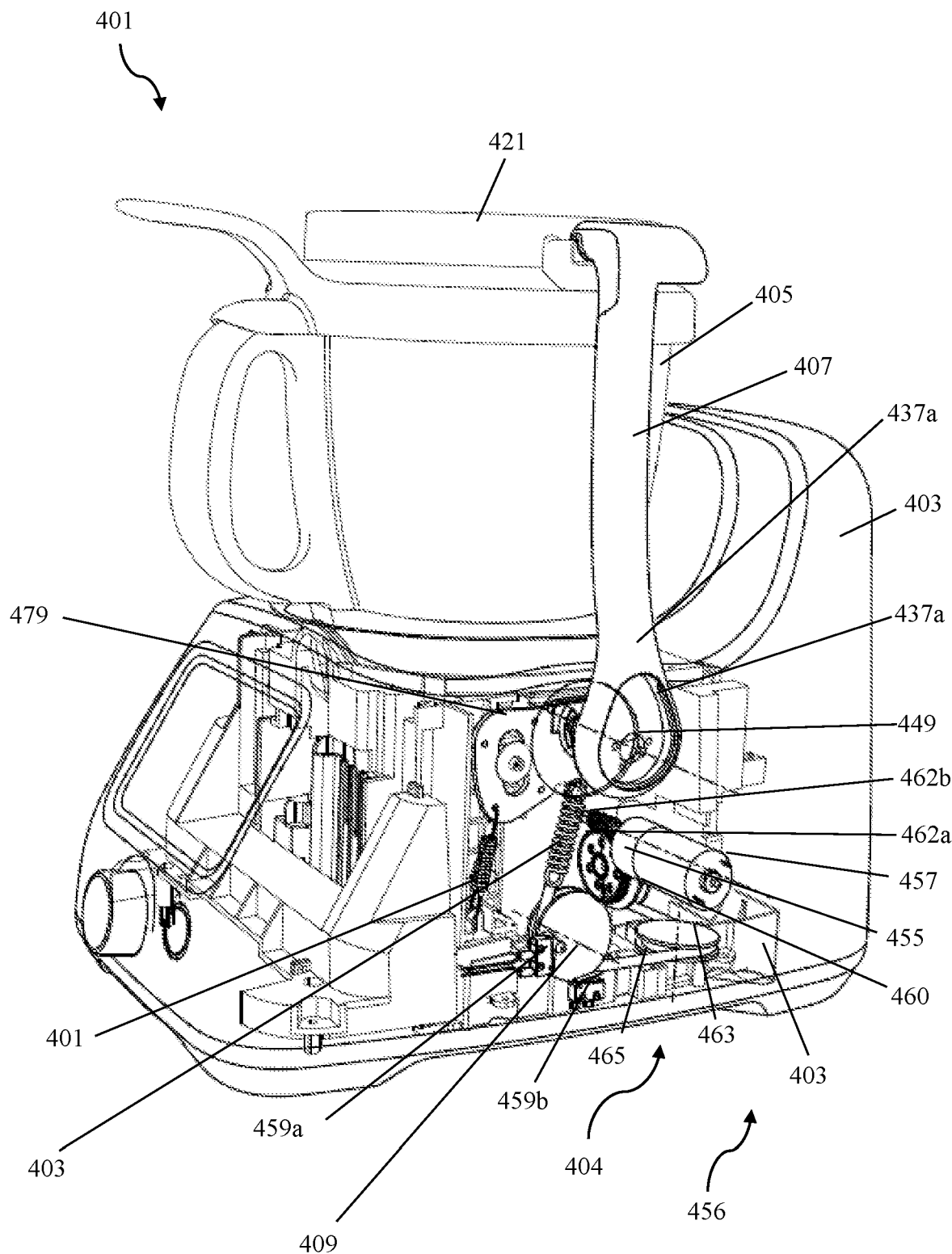
FIG. 49 is a cut-away perspective view of a kitchen device having a locking mechanism according to a fifth embodiment of the invention.
Figure 50:
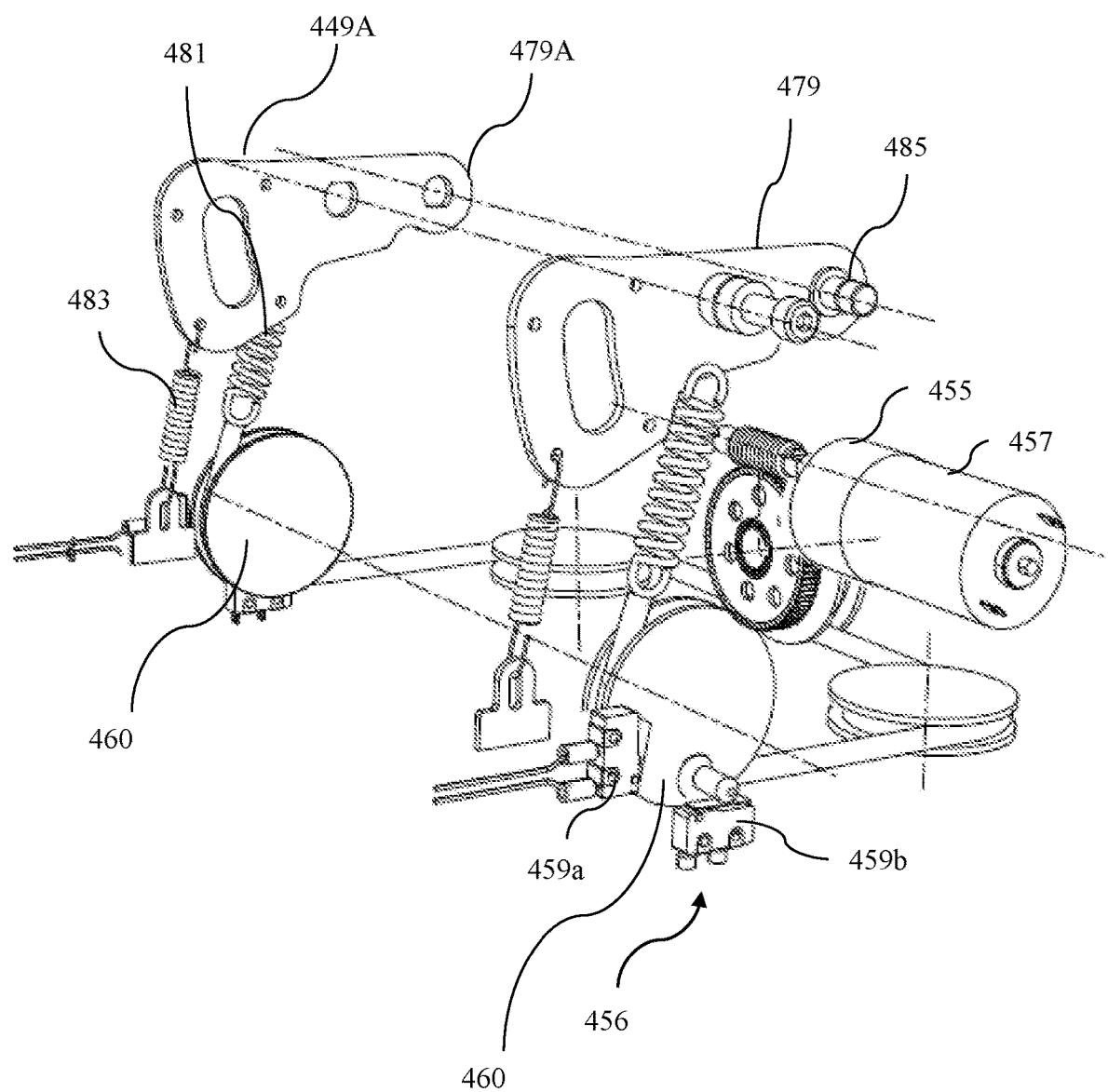
FIG. 50 is a detailed cut-away perspective view of the kitchen device of FIG. 49.
Figure 51:
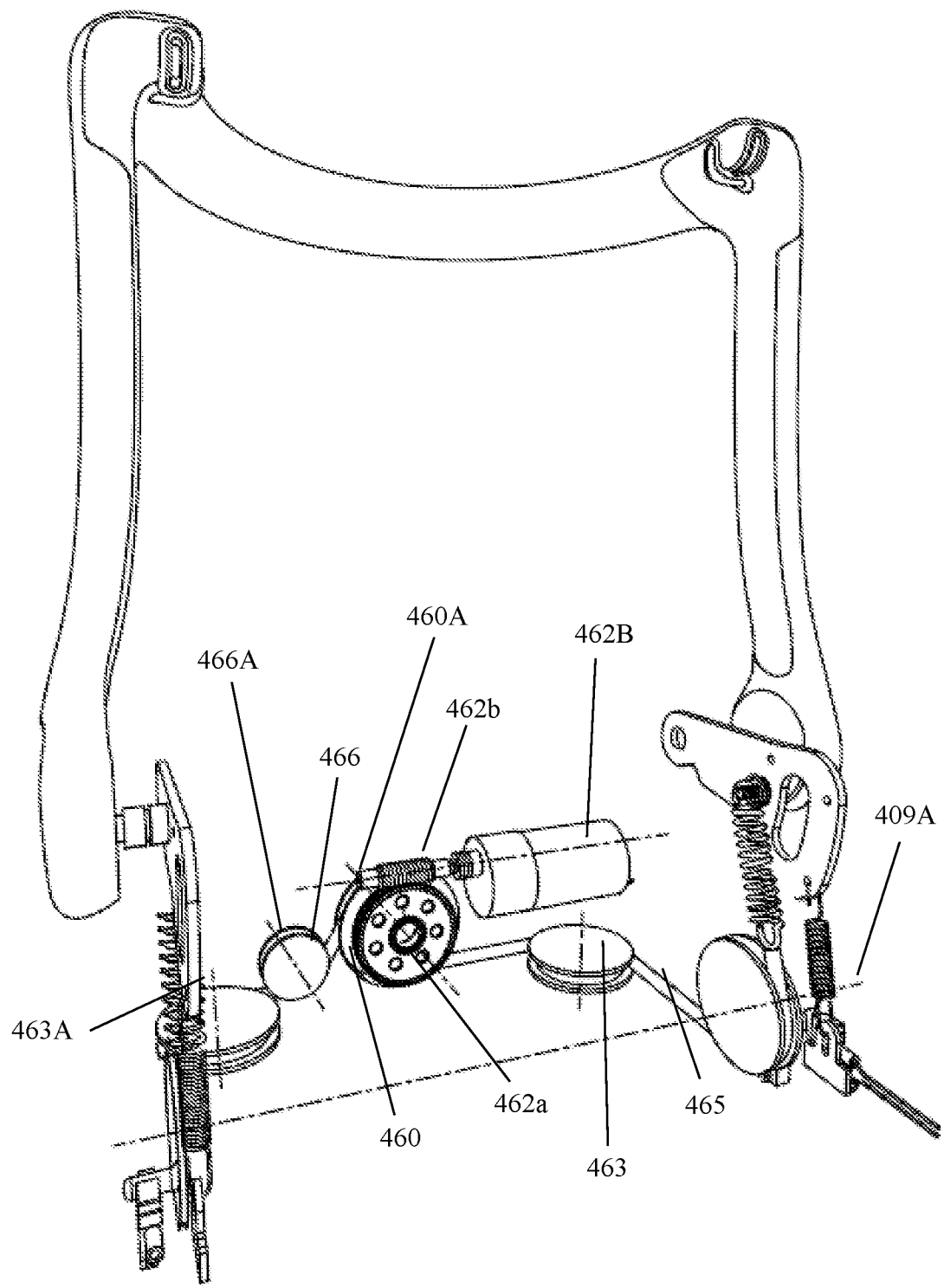
FIG. 51 is a further detailed cut-away perspective view of the kitchen device of FIG. 49.

A fifth embodiment of the kitchen device 401 is shown in FIGS. 49 to 51. The kitchen device 401 is similar to the kitchen device 101. However, the locking mechanism 404 of the kitchen device 401 includes a drive mechanism, preferably a cable or belt drive 456, to move a securing assembly 408 between a free position (not shown) and a securing position, shown in FIG. 50. The term belt is intended non-limitedly and also refers to cable drives and associated components. In relevant other contemplated embodiments the drive mechanism may be a chain drive and/or a cable drive. As best shown in FIGS. 50 and 51, the belt drive 456 includes a primary roller 460 having a primary roller axis 460A, and a distribution roller 463 having a distribution roller axis 463A, and a securing member, preferably a securing roller 409 having a securing roller axis 409A, on each side of the primary roller 460. The rollers 460, 463, 409 are connected by a belt 465. The belt drive 456 further includes a guide roller 466 having a guide roller axis 466A, best shown in FIG. 51. Preferably the guide roller axis 466A is generally parallel with the primary roller axis 460A. Preferably, the distribution roller axis 463A is generally perpendicular to one of, or both, the primary roller axis 460A and the guide roller axis 466A. Preferably, the securing roller axis 409A is generally perpendicular to both the primary roller axis 460A and the distribution roller axis 463A.

The guide roller 466 displaces a first portion of the belt 456 between the primary roller 460 and a level of the distribution rollers 463, thus allowing the first portion of the belt 456 to contact the primary roller 460 on an opposite side of the primary roller 460 compared to a second portion of the belt 456 between the primary roller 460 and a second distribution roller 463. This arrangement enables the primary roller 460 to retract or release the belt 456 to both distribution rollers 463 simultaneously when rotating in a first or second direction about the primary roller axis 460A, respectively. The securing roller 409 is movable between a free position (not shown) and a securing position as shown in FIG. 50. The movement of the securing roller 409 is caused by movement of the belt 465.

The distribution roller 463 is located to guide the belt 465 through a generally perpendicular angle from the primary roller 460 to the securing rollers 409.

The primary roller 460 is attached to a pinion gear 462a that is engaged by a worm gear 462b. The worm gear 462b is driven by a securing motor 457 about a worm gear axis 462B through a reduction drive mechanism 455. Preferably, the worm gear axis 462B is generally parallel with the securing roller axis 409A. The belt drive 456 may be referred to as a common drive mechanism, as two or more securing rollers 409 are driven by a single securing motor 457.

As shown in FIG. 50, the locking mechanism 404 further includes a restraint, preferably a second elastic member, connected to each end of the belt 456. Preferably, the second elastic member is a restraining spring 483. The restraining spring 483 is in a predetermined state, or a free position, when the securing roller 409 is in the free position, similarly the restraining spring 483 is in a tensioning state relative to the predetermined state when the securing roller 409 is in the securing position. When in the tensioning state, the restraining spring 483 imparts a tension of between 100 N to 400 N to a bias plate 479. The bias plate 479 is attached to a body 403 of the kitchen device 401 by a bias plate pin 485, allowing the bias plate 479 to pivot relative to the body 403 about a bias plate axis 479A passing through the bias plate pin 485. The locking mechanism 404 further includes a retaining arm 407 that is attached to the bias plate 479 by a retaining arm pin 449, allowing the retaining arm 407 to pivot about a retaining arm axis 449A passing through the retaining pin 449. Preferably, the retaining arm axis 449A is generally perpendicular to the restraining spring 183. Preferably, the retaining arm axis 449A is generally parallel to the bias plate axis 479A. Preferably the retaining arm axis 449A is generally perpendicular to the primary roller axis 460A.

The tension applied to the bias plate 479 by the restraining spring 483 in the tensioning state thus urges the retaining arm 407 towards a vessel 405, thereby securing a lid 421 between the retaining arm 407 and the vessel 405 and at least partly closing an opening (not shown) of the vessel 405, and further securing the lid 421, and vessel 405, between the retaining arm 407 and the body 403. The restraining spring 483 thus secures the retaining arm 407 in a secured retaining position.

As shown in FIG. 50, the locking mechanism 404 further includes a first securing roller sensor 459a and a second securing roller sensor 459b associated with each securing roller 409. The first securing roller sensor 459a is located such that it is activated when the respective securing roller 409 is in a securing position, as shown in FIG. 50. The second securing roller sensor 459b is located such that it is activated when the respective securing roller 409 is in the free position. When the securing roller 409 is in the free position, the securing roller 409 does not secure the retaining arm 407 in the secured retaining position and a main motor 115 of the kitchen device 401 is prevented from operating.

The securing roller 409 has a securing roller pin 467 that extends parallel to the securing roller axis 409A. The securing roller pin 467 is placed a radial distance away from the securing roller axis 409A. The securing roller pin 467 is adapted to actuate the first and second securing roller sensors 459a, 459b when the securing roller is in the securing position and the free position, respectively.

Figure 52:
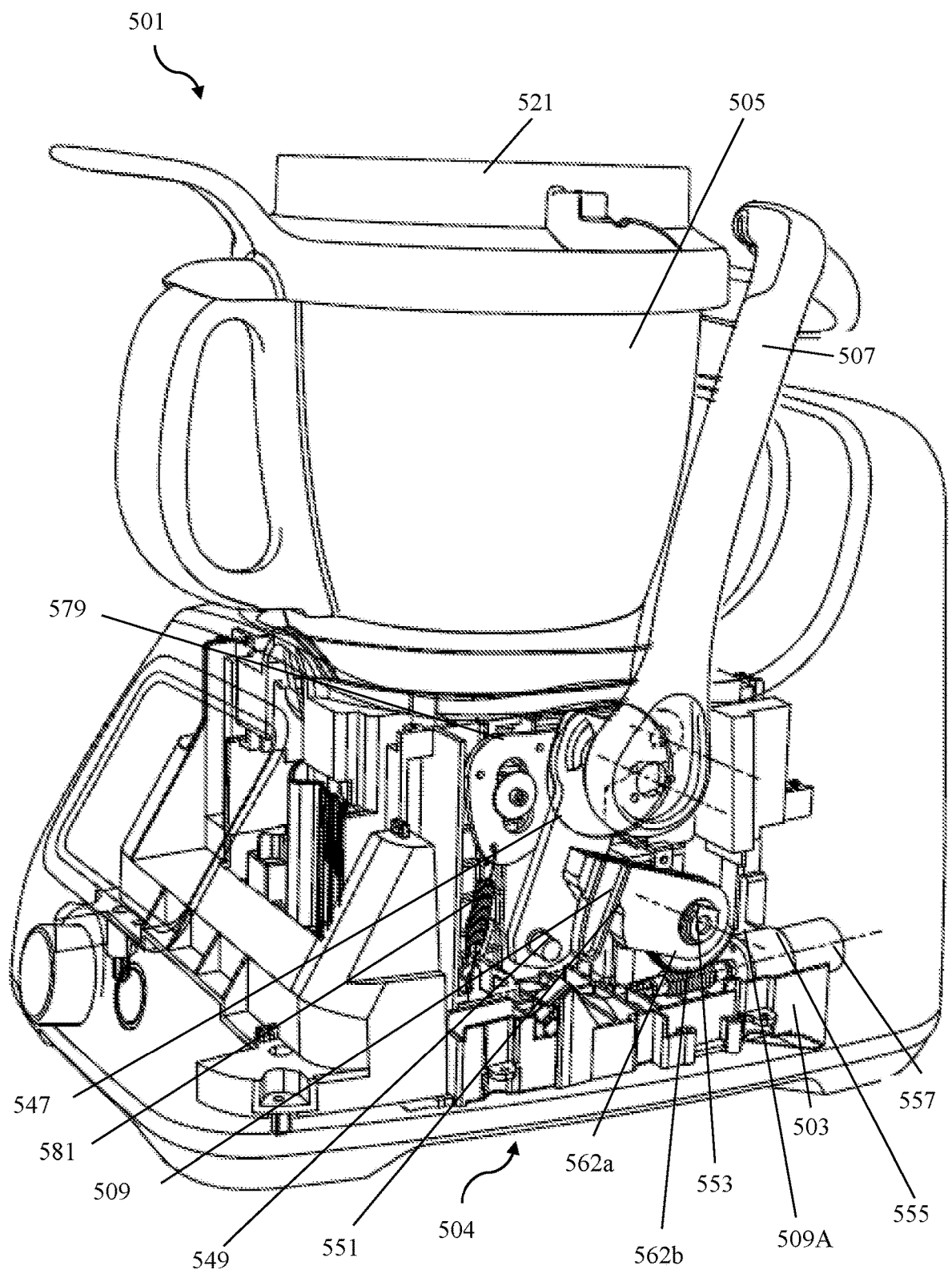
FIG. 52 is a cut-away perspective view of a kitchen device having a locking mechanism according to a sixth embodiment of the invention.
Figure 53:
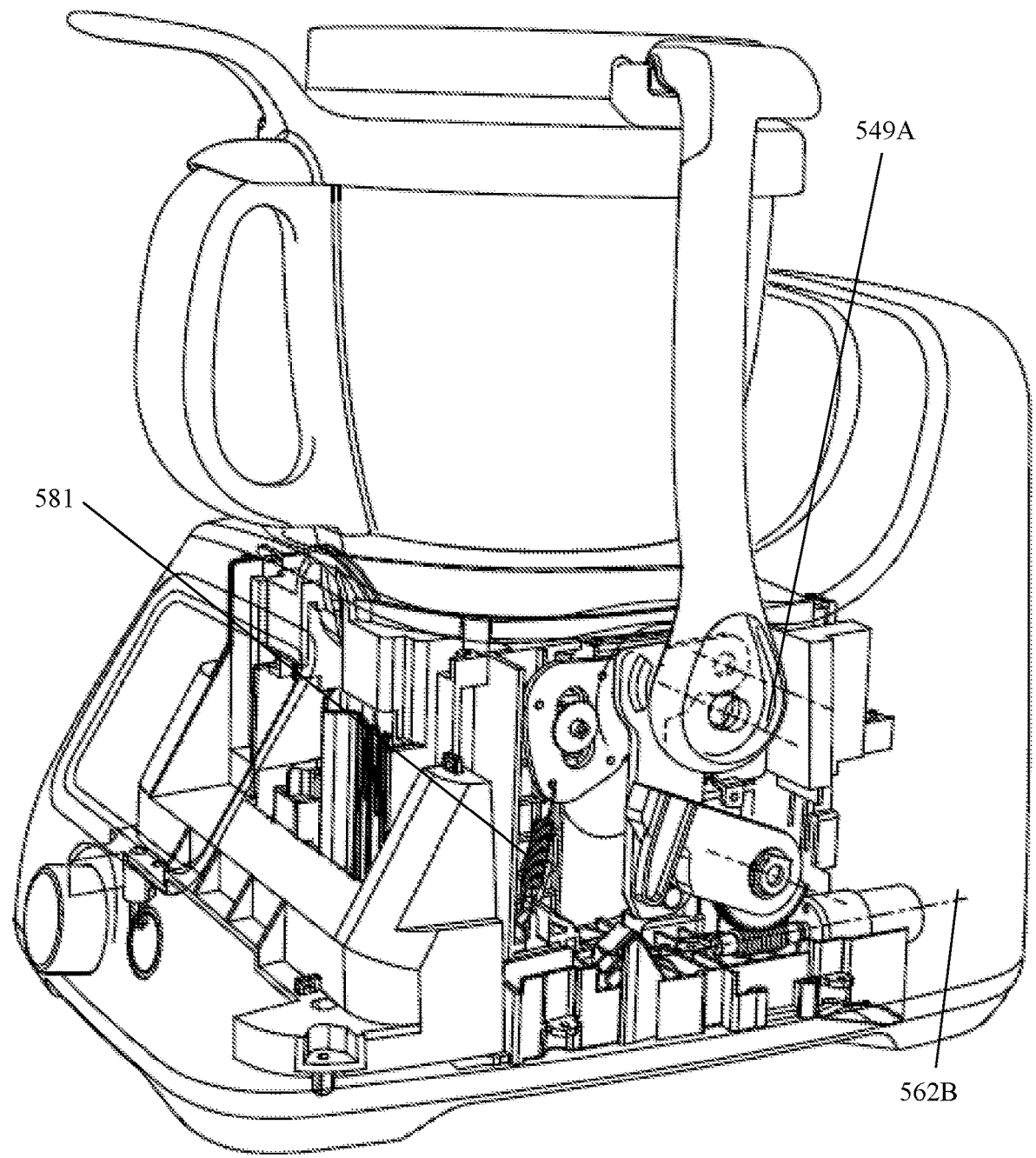
FIG. 53 is a cut-away perspective view of the kitchen device of FIG. 52 in a second configuration.
Figure 54:
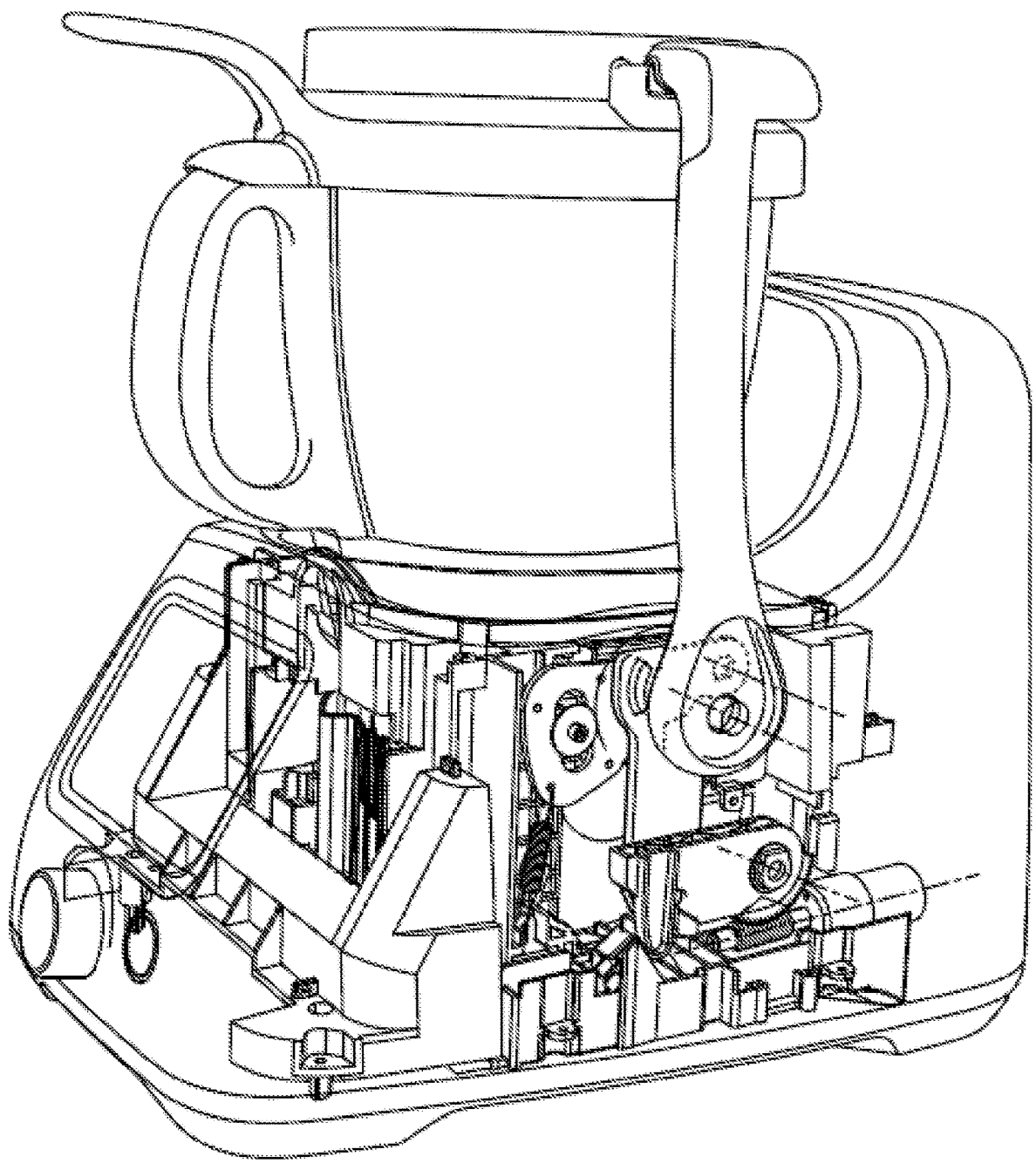
FIG. 54 is a cut-away perspective view of the kitchen device of FIG. 52 in a third configuration.

A sixth embodiment of the kitchen device 501 is shown in FIGS. 52 to 54. The kitchen device 501 is similar to the kitchen device 1. For example, a locking mechanism 504 includes a retaining arm 507 movable between a free position, shown in FIG. 52, and a retaining position, shown in FIG. 53. However, the locking mechanism 504 of the kitchen device 501 includes a drive mechanism, preferably a worm gear 562b coupled to a reduction drive mechanism 555, the reduction drive mechanism 555 being operated by a securing motor 557. The worm gear 562b pivots about a worm gear axis 562B and engages a pinion gear 562a to pivot a securing hook 509 about a securing hook axis 509A between a free position, shown in FIG. 53, and a securing position, shown in FIG. 54. Preferably, the securing hook axis 509A is generally perpendicular to the worm gear axis 562B.

When the securing hook 509 is in the securing position, a recess 551 in the securing hook 509 engages a retaining arm pin 549 located on an extension arm 547 that is connected to the retaining arm 507. In this way, the securing hook 509 secures the retaining arm 507 in a secured retaining position, as shown in FIG. 54. Conversely, when the securing hook 509 is in the free position the retaining arm 507 is movable about a retaining arm axis 549A between the free position and the retaining position.

In addition to the securing hook 509, the locking mechanism 504 of the kitchen device 501 also includes a locking spring 581 that functions substantially identically to the locking spring 181 of the locking mechanism 104 of the kitchen device 101.

A seventh embodiment of the kitchen device 601 is shown in FIGS. 55A to 61. The kitchen device 601 is similar to the kitchen device 1. For example, a locking mechanism 604 includes a retaining arm 607 movable between a free position, shown in FIG. 55A, and a retaining position, shown in FIG. 56A. However, the locking mechanism 604 also includes a toggle linkage, preferably a toggle mechanism 609.

Figures 55A, 55B:
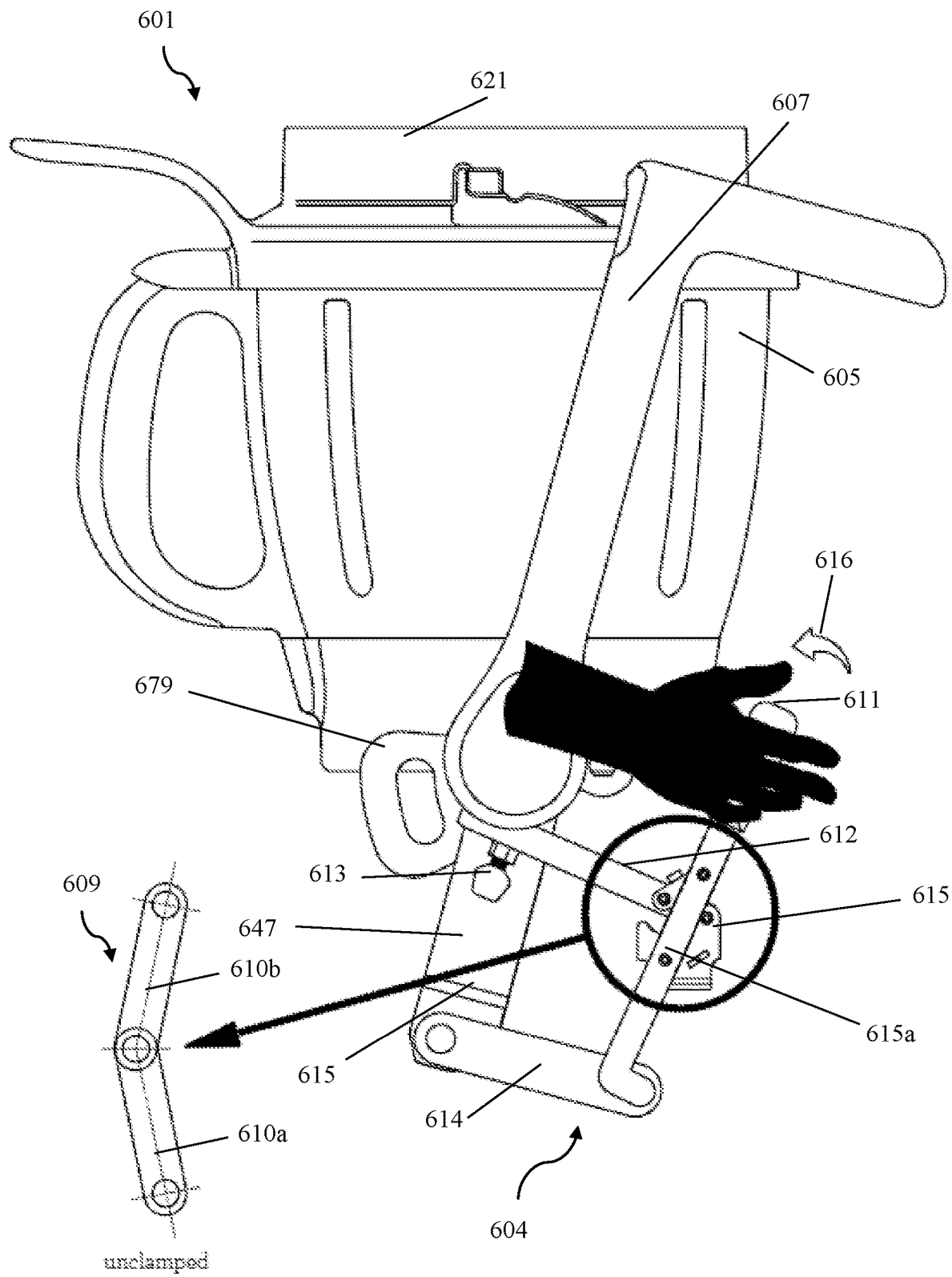
FIG. 55A is a cut-away right side view of a kitchen device having a locking mechanism according to a seventh embodiment of the invention.
FIG. 55B is a detailed cut-away right side view of a toggle mechanism of the kitchen device of FIG. 55A.

As shown in FIG. 55B, the toggle mechanism 609 includes a first rigid member 610a and a second rigid member 610b pivotally connected to each other at first ends thereof. The second end of the first rigid member 610a is connected to a toggle handle 611. The second end of the first rigid member 610a is also connected to the body (not shown) of the kitchen device 601 by a bracket 615. The bracket 615 also provides a pivot pin 615a for the toggle handle 611. The second end of the second rigid member 610b is also connected to the toggle handle 611, above the second end of the first rigid member 610a. As shown in FIG. 55A, the first ends of the first and second rigid members 610a, 610b are both connected to a first transverse member 612. The first transverse member 612 has an impact absorbing member 613 at one end, the impact absorbing member 613 being adapted to abut against an extrusion 615 extending from an extension arm 647 of the retaining arm 607, and at another end is hingedly connected to the body 603 of the kitchen device 601. The first ends of the first and second rigid members 610a, 610b are connected to the transverse member 612 at a point within an arc the toggle handle 611 travels between the free position and the retaining position about a toggle axis 611A that is coaxial with the pivot pin 615.

As best seen in FIG. 55A, the toggle handle 611 is connected, at a lower end, to a second transverse member 614. The second transverse member 614 is connected to the extension arm 647 such that a moment applied to the toggle handle 611 to move the handle between the free position and the retaining position applies a moment to the extension member 647 such that the retaining arm 607 is urged to move between the free position and the retaining position.

Figures 56A, 56B:
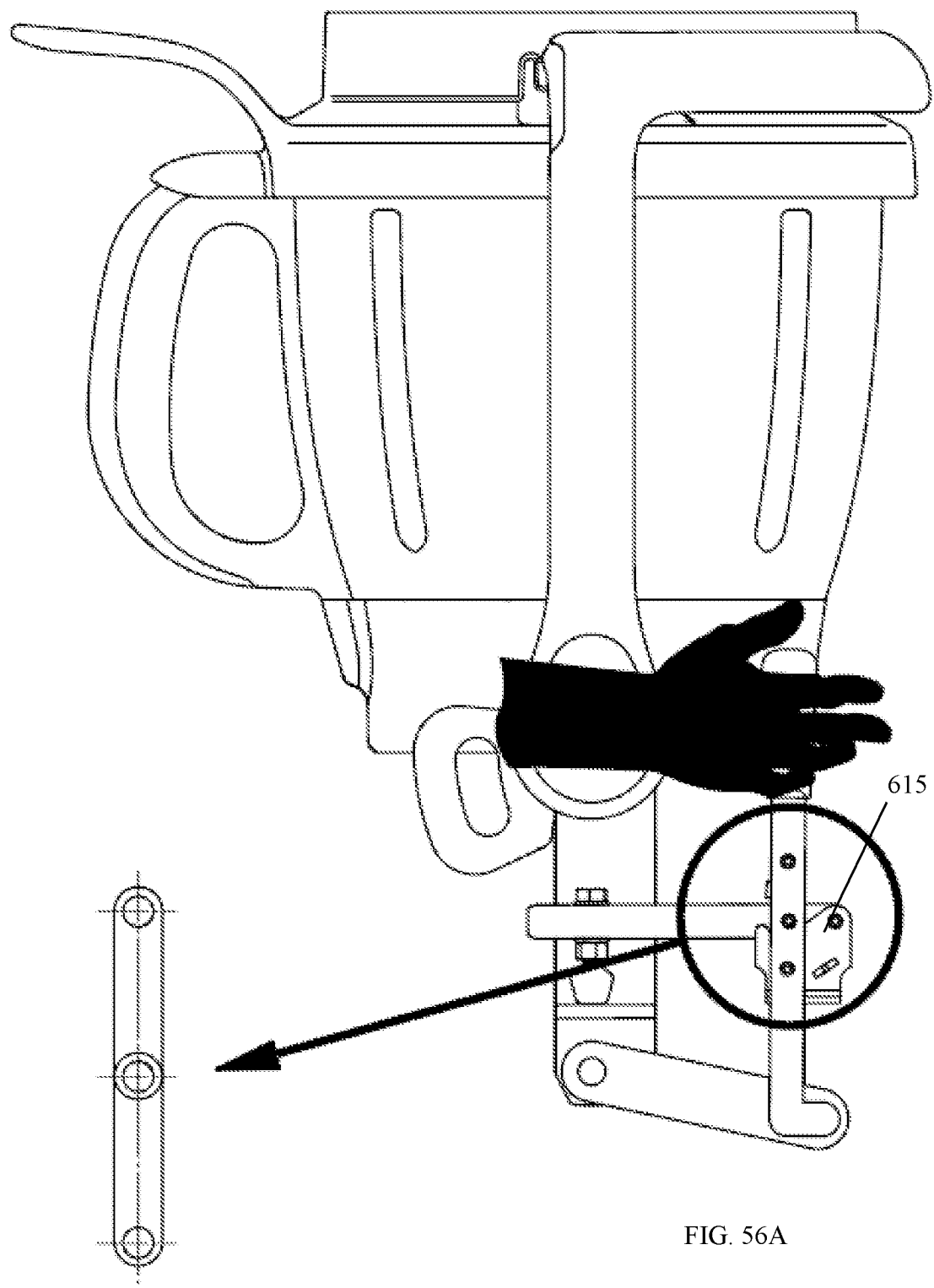
FIG. 56A is a cut-away right side view of the kitchen device of FIG. 55A in a second configuration.
FIG. 56B is a detailed cut-away right side view of the toggle mechanism of the kitchen device of FIG. 55A in the configuration of FIG. 56A.
Figures 57A, 57B:
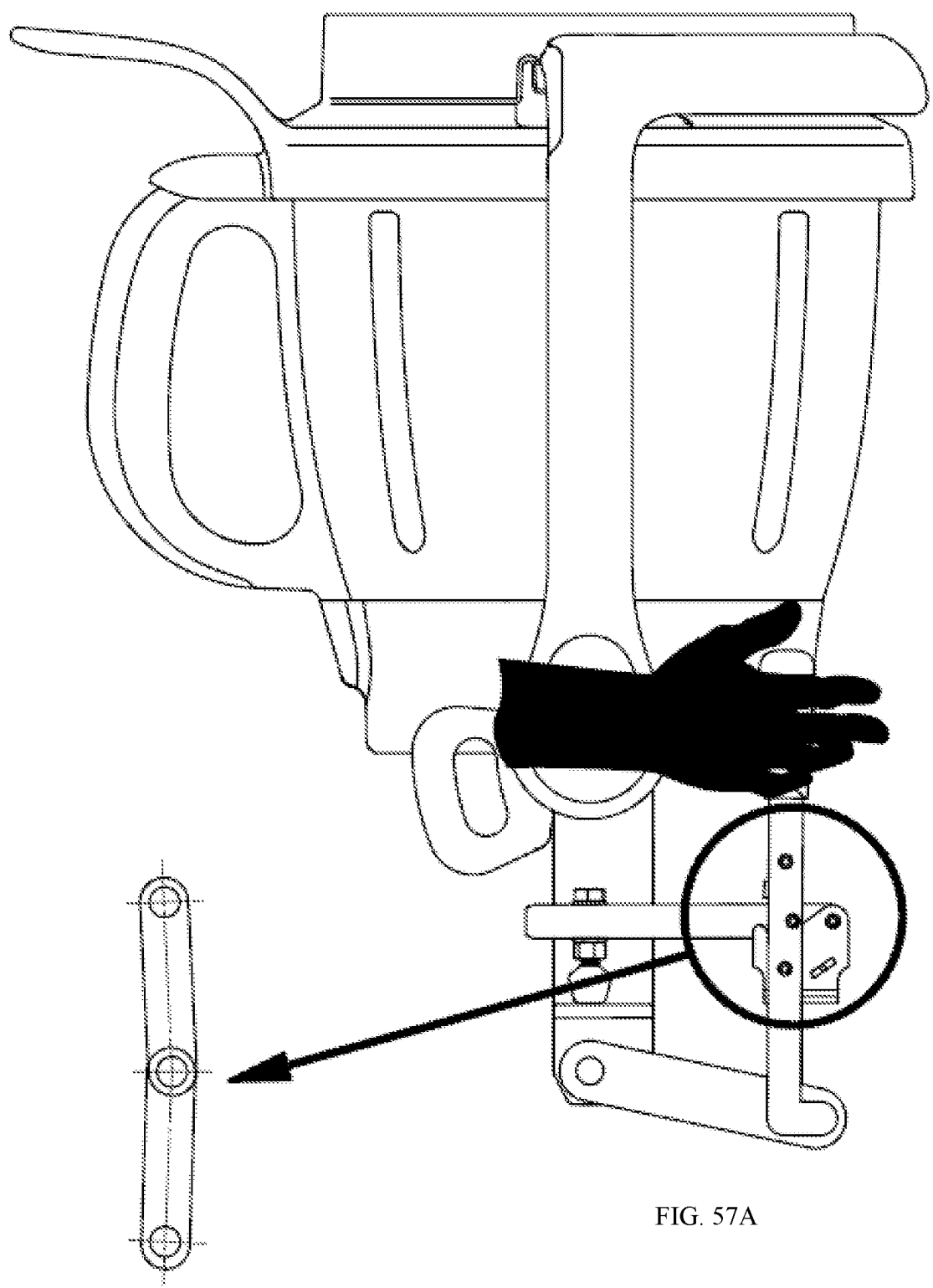
FIG. 57A is a cut-away right side view of the kitchen device of FIG. 55A in a third configuration.
FIG. 57B is a detailed cut-away right side view of the toggle mechanism of the kitchen device of FIG. 55A in the configuration of FIG. 57A.
Figure 58:
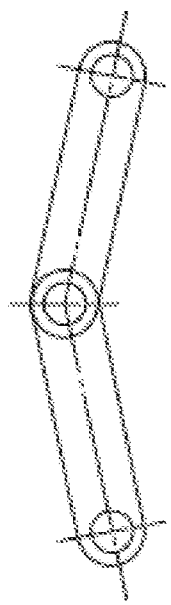
FIGS. 58 to 60 are detailed views of a toggle mechanism.
Figure 59:
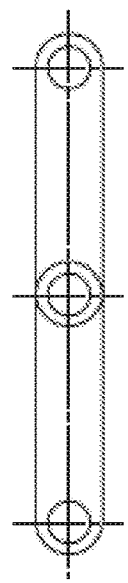
Figure 60:

The toggle mechanism 609 is movable between a free position, shown in FIG. 55A, a retaining position, shown in FIG. 56A, and a secured retaining position, shown in FIG. 57A. The movement of the toggle mechanism 609 between the free position and the retaining position substantially follows the movement of the retaining arm 607 between the free position and the retaining position until the first and second rigid members 610a, 610b are co-linear, as shown in FIG. 56B, indicating that the toggle mechanism 609 is in the retaining position. When the toggle handle 611 is in the retaining position, movement of the transverse member 612 is resisted by the impact absorbing member 613 abutting the extrusion 615, as shown in FIG. 56A. To move the toggle mechanism to the secured retaining position, further moment is applied to the toggle handle 611, as shown in FIG. 57A. As a result, the second ends of the first and second rigid members 610a, 610b have travelled a further angular distance than the first ends of the first and second rigid members 610a, 610b.

When the toggle mechanism 609 is moved to the secured retaining position, the retaining arm 607 remains in the retaining position, however the toggle mechanism 609 urges the retaining arm 607 downwards.

When the toggle mechanism 609 is in the secured retaining position, movement of the retaining arm 607 from the retaining position would require movement of the first transverse member 612 with the extension arm 647. This movement is blocked by the impact absorbing member 615, which is connected to the first transverse member 612 and thereby to the body 603. Thus, the retaining arm 607 is secured in the secured retaining position. Movement of the retaining arm 607 from the secured retaining position to the retaining position, and subsequently to the free position, is only possible once the transverse member 612 is able to pivot relative to the body 603. This is enabled by movement of the toggle handle 611 from the secured retaining position shown in FIG. 57A, to the retaining position shown in FIG. 56A. Preferably, the movement of the retaining arm 607 is entirely controlled by the toggle handle 611.

Figure 61:
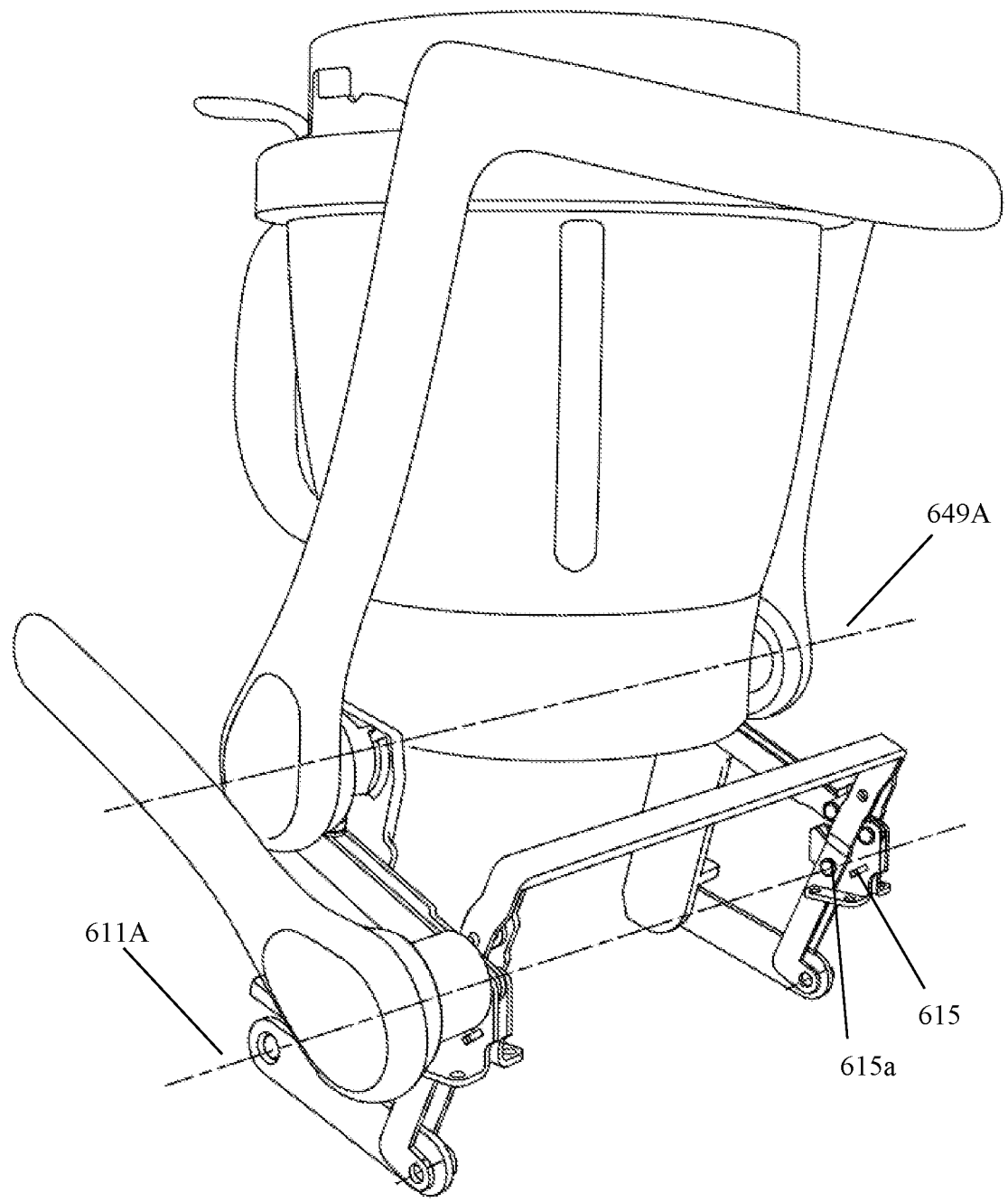
FIG. 61 is a detailed cutaway perspective view of the kitchen device of FIG. 55A.

FIG. 61 shows a perspective view of the locking mechanism 604. Showing the bracket 615 and the toggle handle axis 611A. As can be seen in FIG. 61, the toggle handle axis 611A is preferably parallel to a retaining arm axis 649A, both being preferably horizontal when the kitchen device 601 is resting on a horizontal surface.

An eighth embodiment of the kitchen device 701 is shown in FIGS. 62 to 70. The kitchen device 701 is similar to the kitchen device 1. For example, a locking mechanism 704 includes a retaining arm 707 movable about a retaining arm axis 749A between a free position and a retaining position, shown in FIG. 69. The locking mechanism 704 also has a bridge member 769 controlling the movement of a securing hook 709 between a securing position, shown in FIG. 65, and a free position, shown in FIG. 66.

Figure 63:
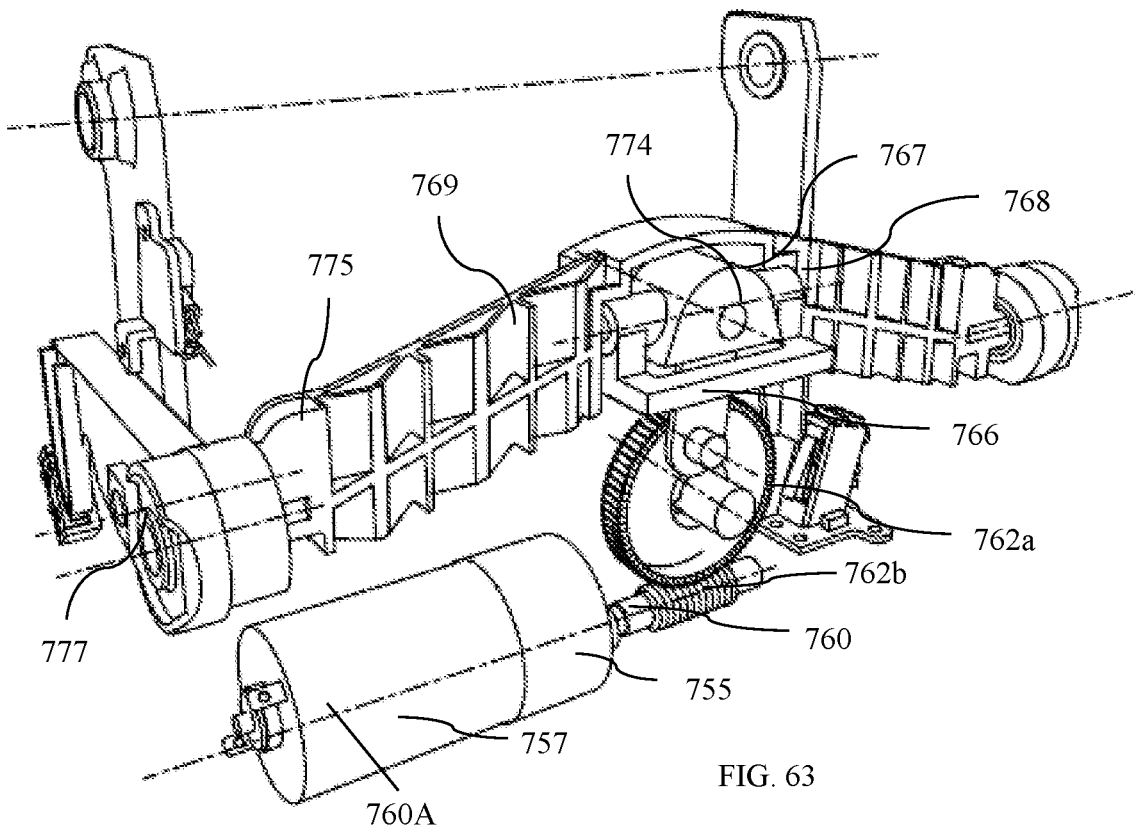
FIG. 63 is a further detailed cutaway perspective view of the kitchen device of FIG. 62.
Figure 64:
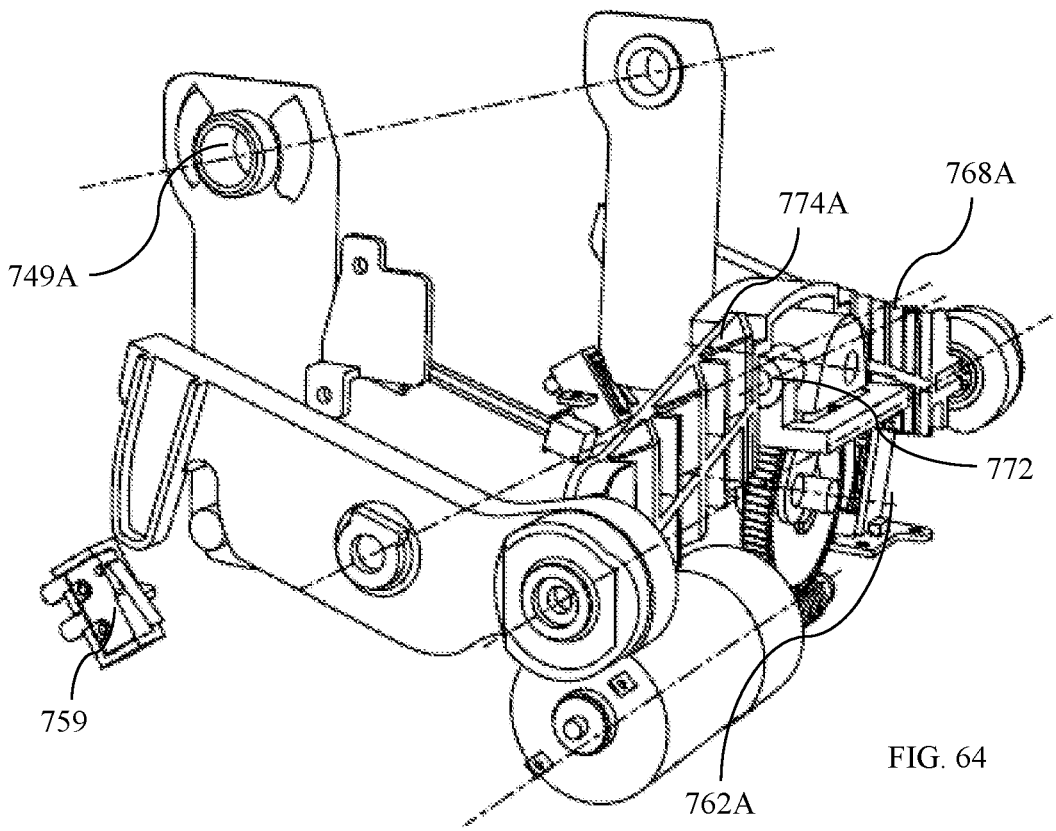
FIG. 64 is a detailed cutaway perspective view of the kitchen device of FIG. 62 in a second configuration.
Figure 65:
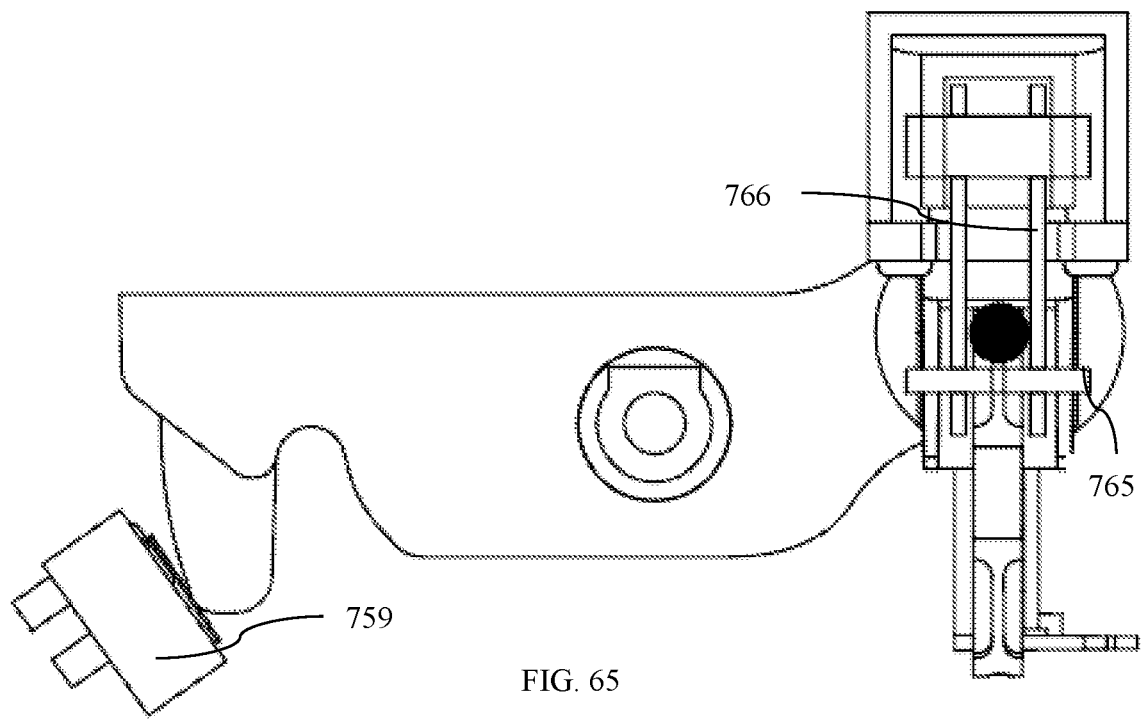
FIG. 65 is a detailed cutaway right side view of the kitchen device of FIG. 62 in the configuration of FIG. 62.
Figure 66:
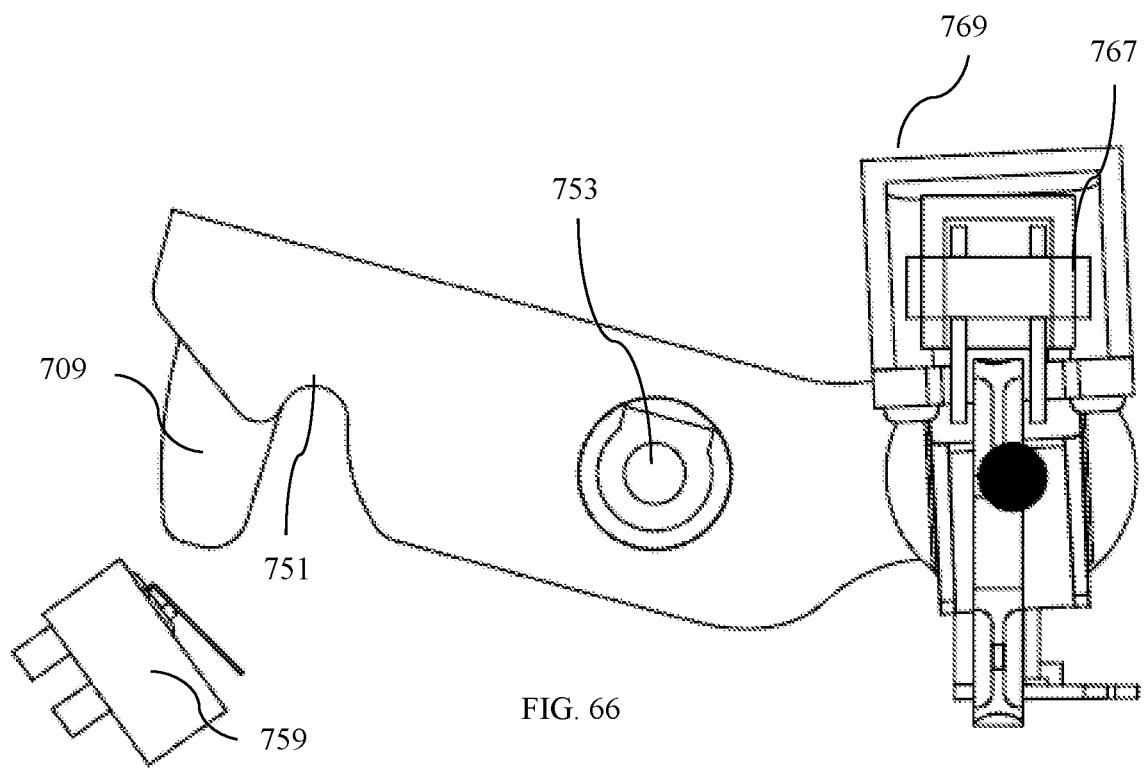
FIG. 66 is a detailed cutaway right side view of the kitchen device of FIG. 62 in the configuration of FIG. 64.
Figure 67:
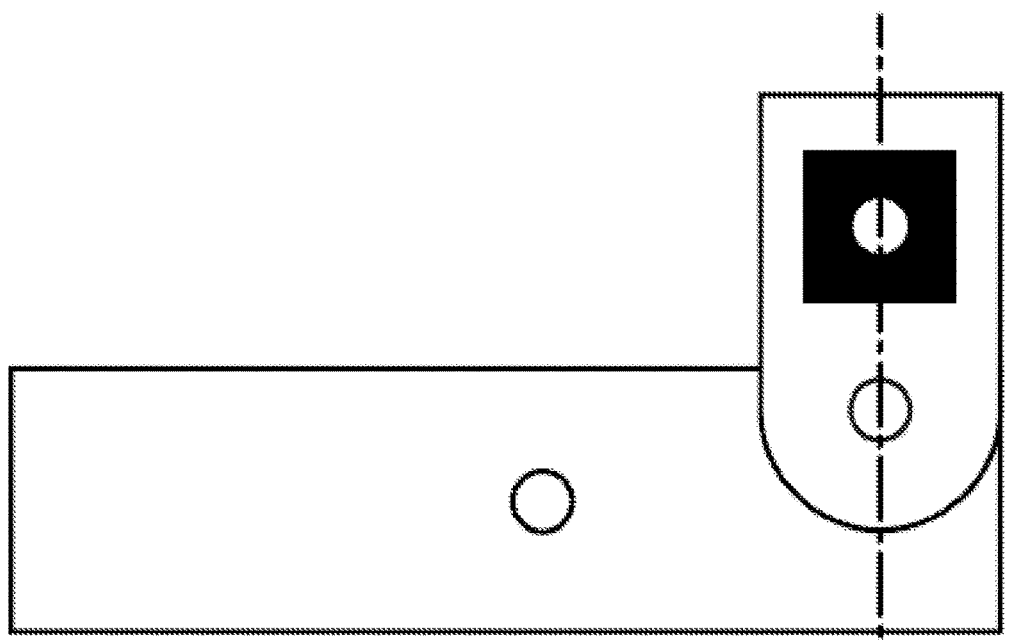
FIG. 67 is a detailed cutaway right side view of the kitchen device of FIG. 62 in the configuration of FIG. 62.
Figure 68:
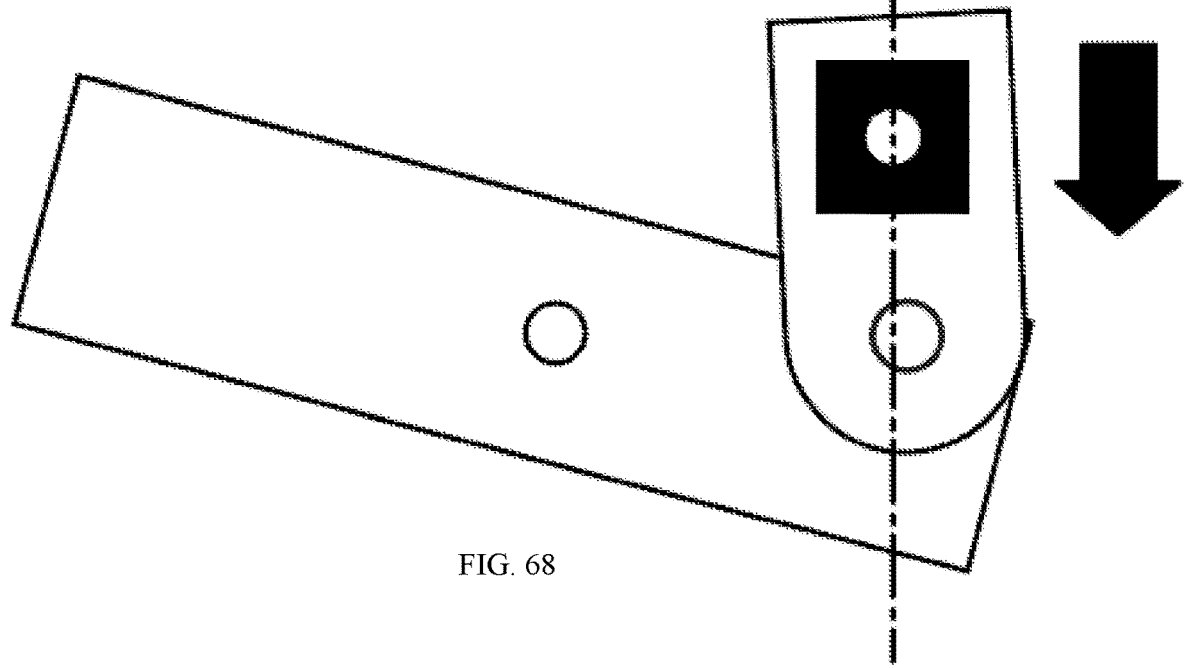
FIG. 68 is a detailed cutaway right side view of the kitchen device of FIG. 62 in the configuration of FIG. 64.
Figure 69:
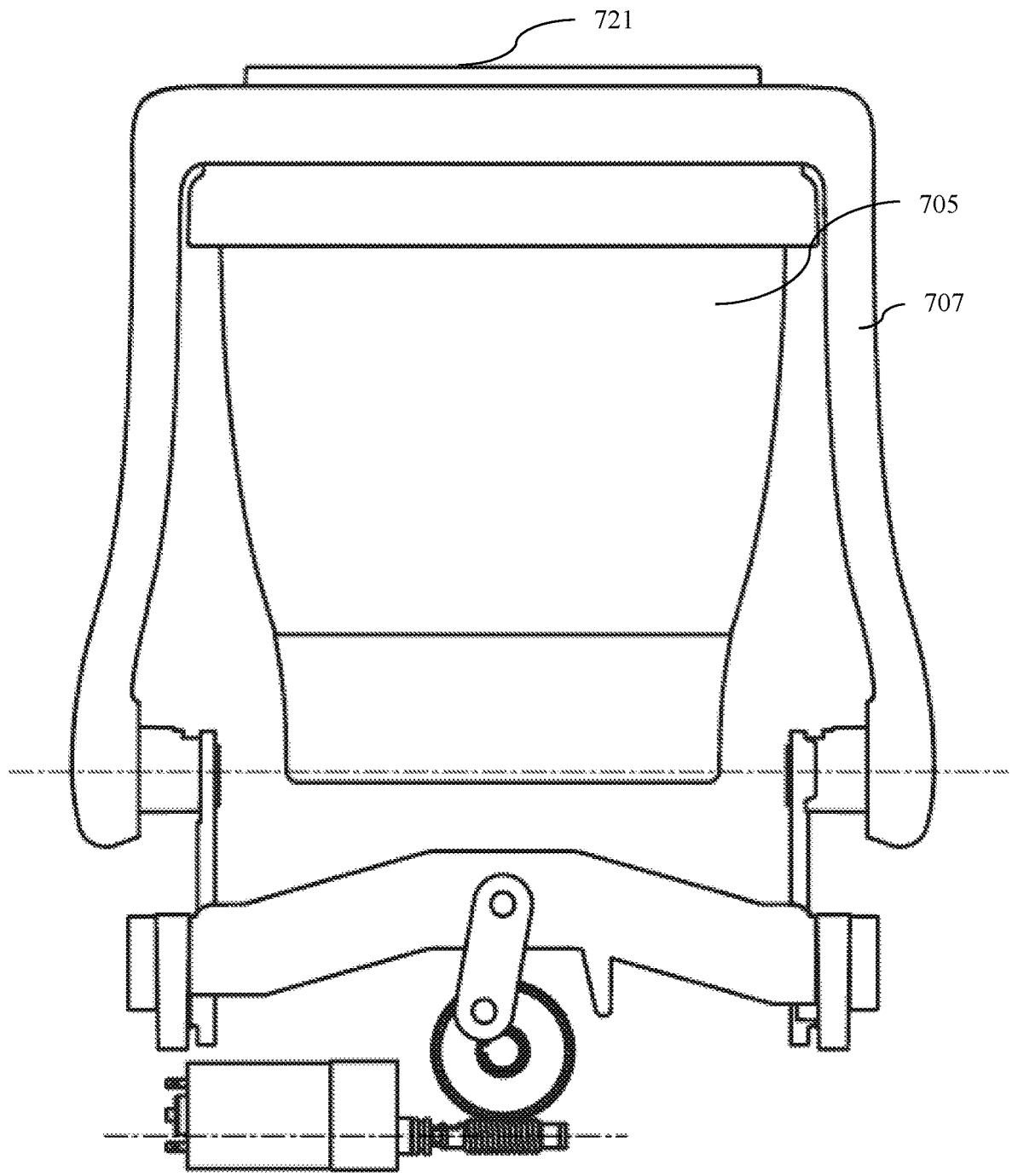
FIG. 69 is a detailed cutaway rear view of the kitchen device of FIG. 62.

Referring to FIG. 63, the locking mechanism 704 has a securing motor 757 with a shaft 760. The securing motor 757 rotates the shaft 760 about a shaft axis 760A. Attached to the shaft 760 is a worm gear 762b, such that the worm gear 762b rotates with the shaft about the shaft axis 760A. Rotation of the worm gear 762b about the shaft axis 760A pivots a pinion gear 762a about a pinion gear axis 762A, the pinion gear axis 762A being generally perpendicular to the shaft axis 760A.

Figure 62:
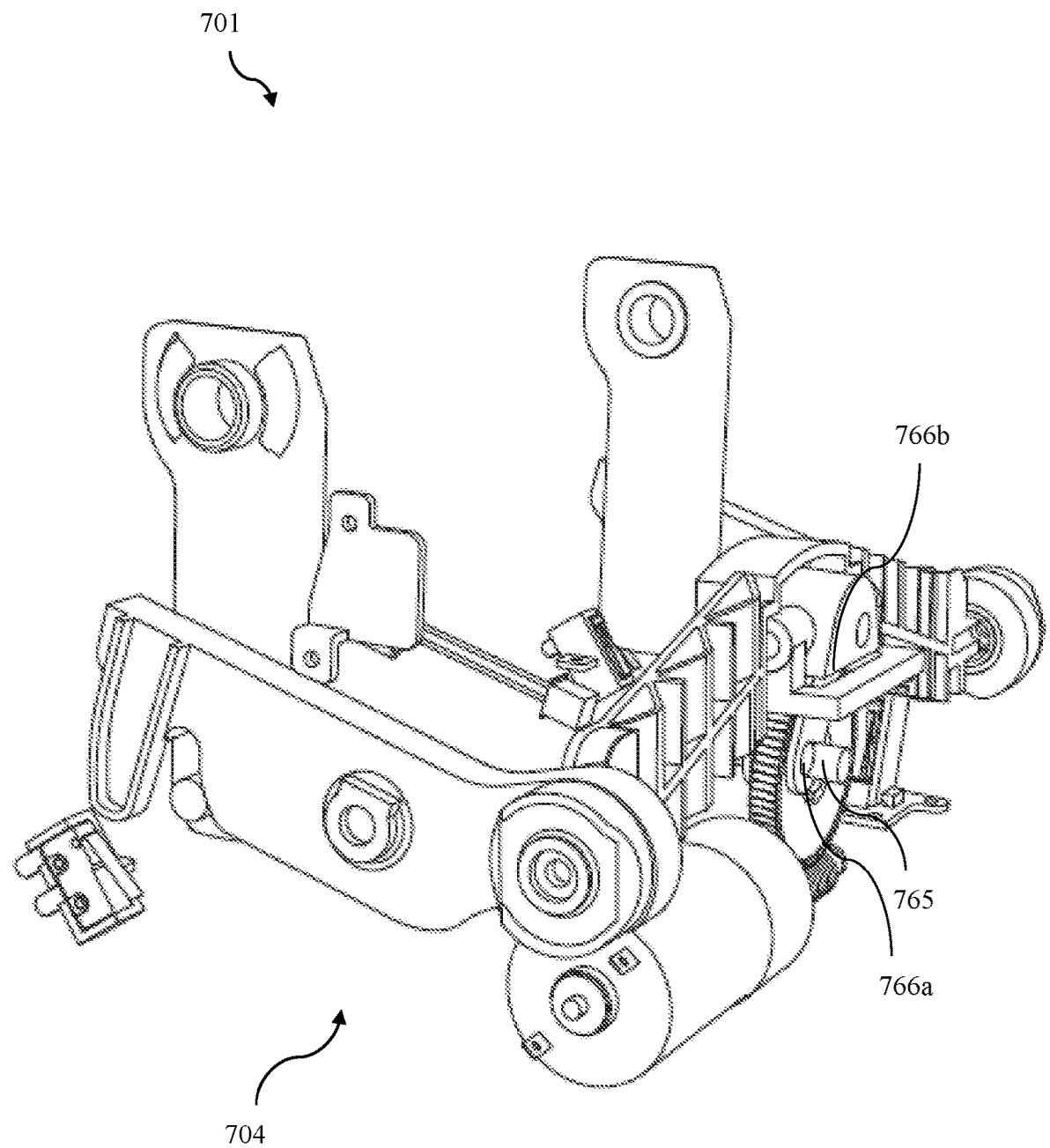
FIG. 62 is a detailed cutaway perspective view of a kitchen device having a locking mechanism according to an eighth embodiment of the invention.

As seen in FIG. 62, the pinion gear 762a has a pin 765 at a position radially outward from the center of the pinion gear 762a, such that pivoting of the pinion gear 762a results in circumferential, and thereby horizontal and/or vertical, displacement of the pin 765. The pin 765 is attached to a tab 766 at a first end 766a of the tab 766. A second end 766b of the tab 766 is attached to a central yoke 767. The central yoke 767 has two rounded projections 768 that are received by rounded recesses 772 in the bridge ember 769, allowing the central yoke 767 to pivot relative to the bridge member 769 about a first yoke axis 768A. The tab 766 is attached to the central yoke 767 at a yoke pin 774 allowing the tab 766 to pivot relative to the central yoke 767 about a second yoke axis 774A. In this embodiment, the first and second yoke axes 768A, 774A are perpendicular.

Figure 70:
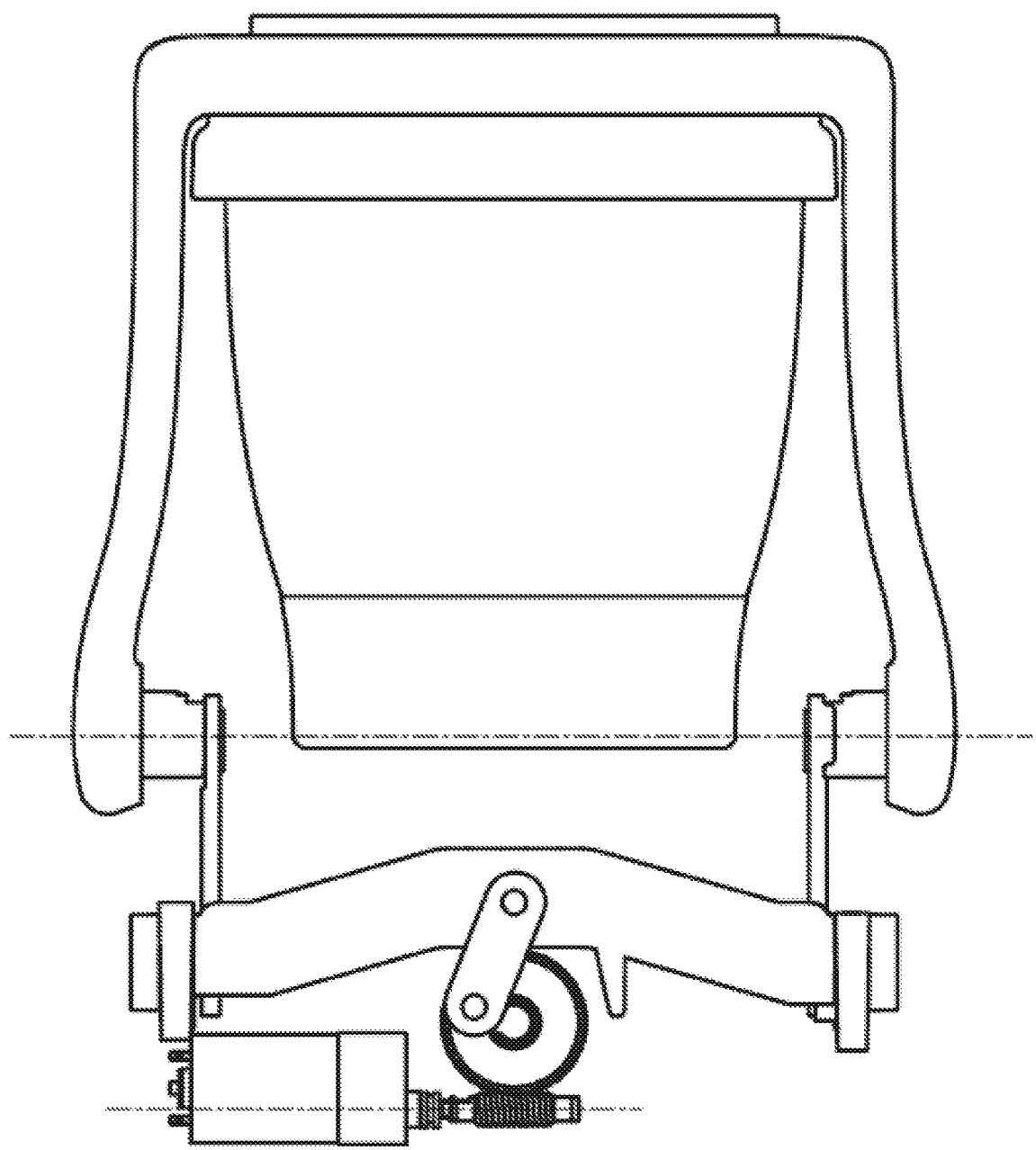
FIG. 70 is a detailed cutaway rear view of the kitchen device of FIG. 62 in the configuration of FIG. 64.
Figure 70A:
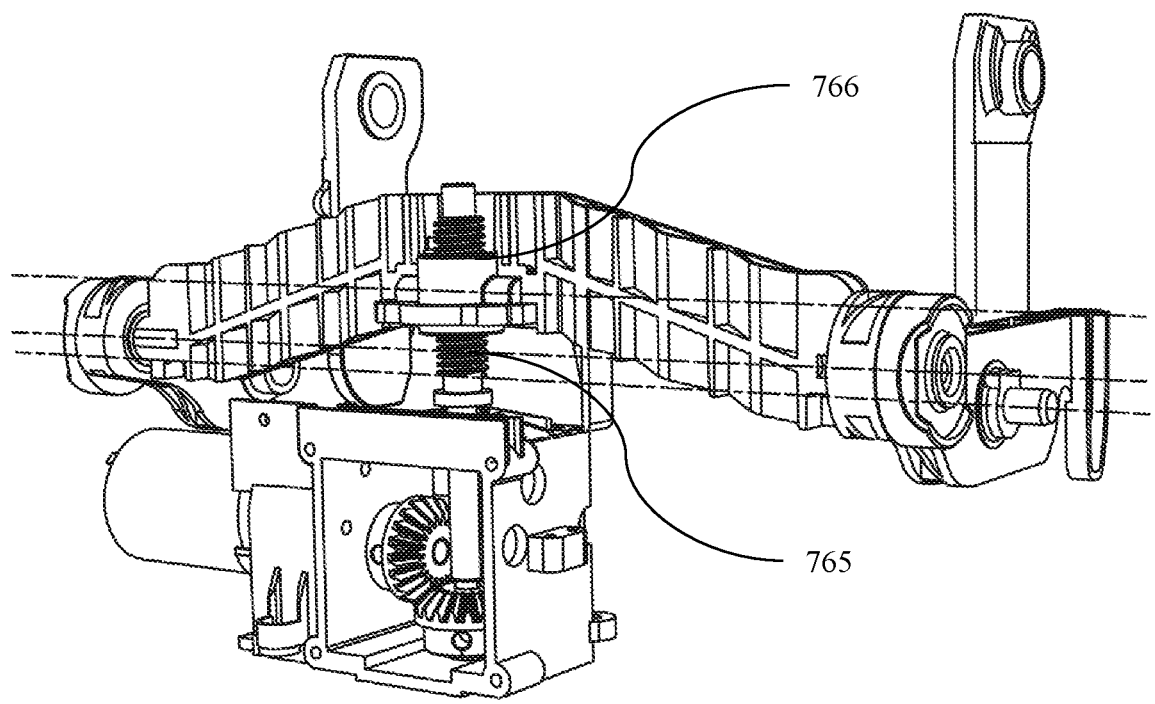
FIG. 70A is a detail cutaway perspective view of a kitchen device consistent with FIG. 62 having an alternative drive arrangement in connection with the central yoke.

In a contemplated alteration to this embodiment, shown in FIG. 70A, the central yoke 767 may be driven by a screw 765 received in a threaded opening 766 of the central yoke 767 instead of being moved by the tab 766 attached to the pin 765.

The bridge member 769 has a sloping arm 771 on either side of a central portion 773, the central yoke 767 being received in the central portion 773. Opposite the central portion 773, each sloping arm 771 has an end portion 775 that is received in a pivot joint 777 such that movement of the bridge member 769 between the free and the retaining position causes movement of the securing hook 709 between the free and the retaining position.

Figure 74:
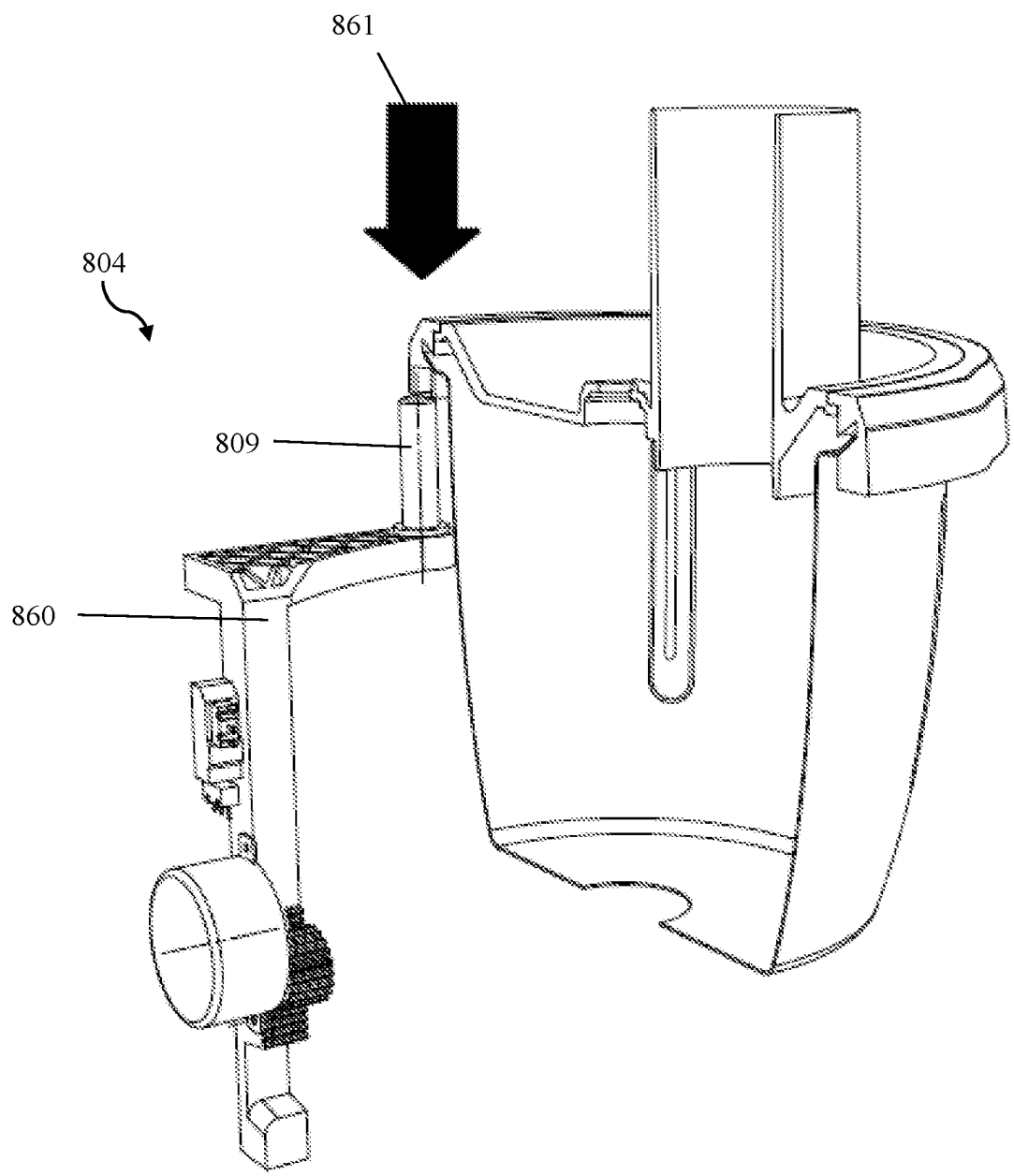
FIG. 74 is a detailed cutaway perspective view of the kitchen device of FIG. 71 in the configuration of FIG. 73.
Figure 75:
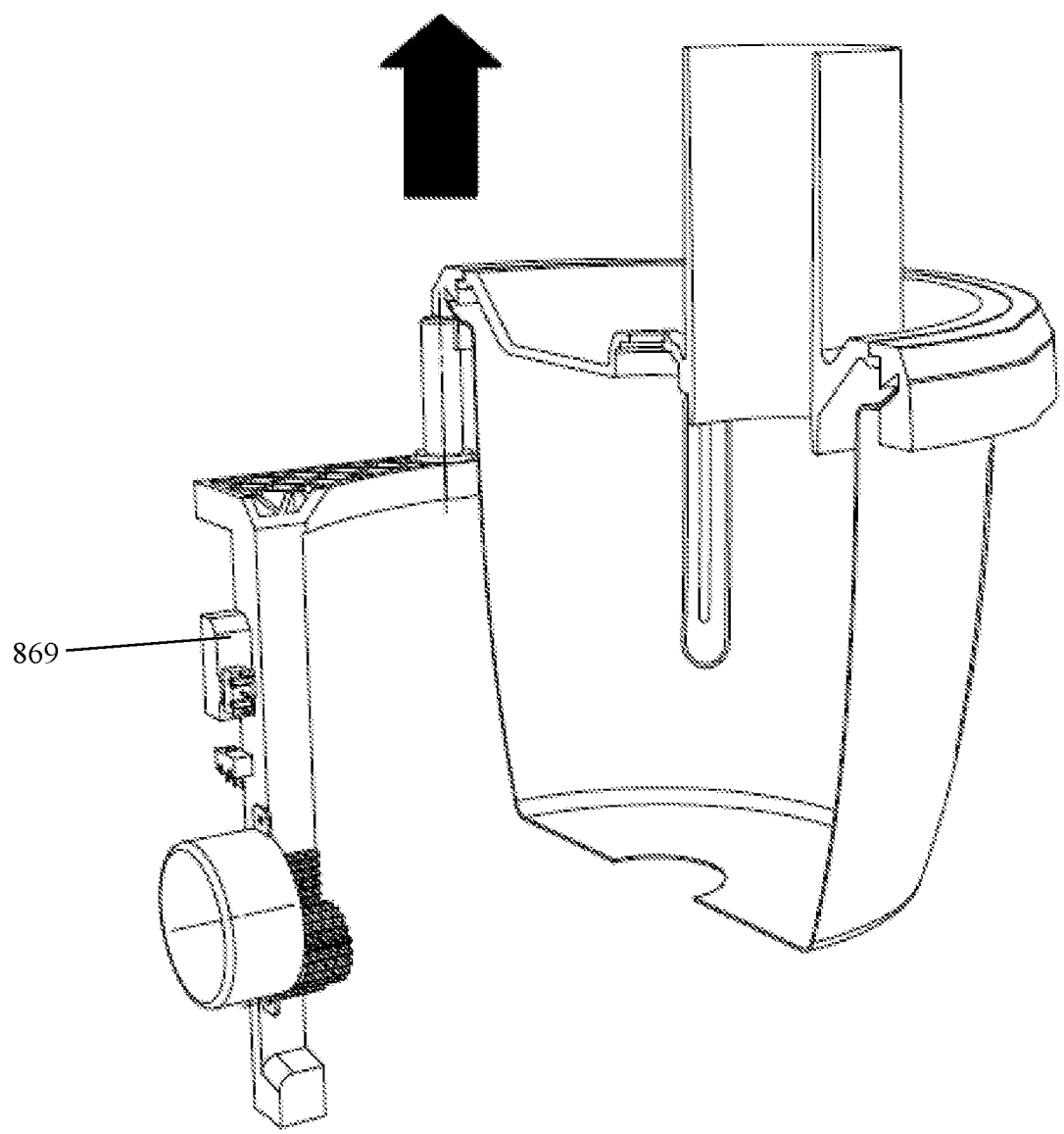
FIG. 75 is a detailed cutaway perspective view of the kitchen device of FIG. 71 in a third configuration.

A ninth embodiment of the kitchen device 801 is shown in FIGS. 71 to 83. The kitchen device 801 is similar to the kitchen device 1. For example, a locking mechanism 804 includes a securing member, the securing member preferably being a retaining pin 809, movable between a free position shown in FIG. 74, and a securing position, shown in FIG. 75 to secure a lid 821 on a vessel 805 of the kitchen device 801.

Figure 71:
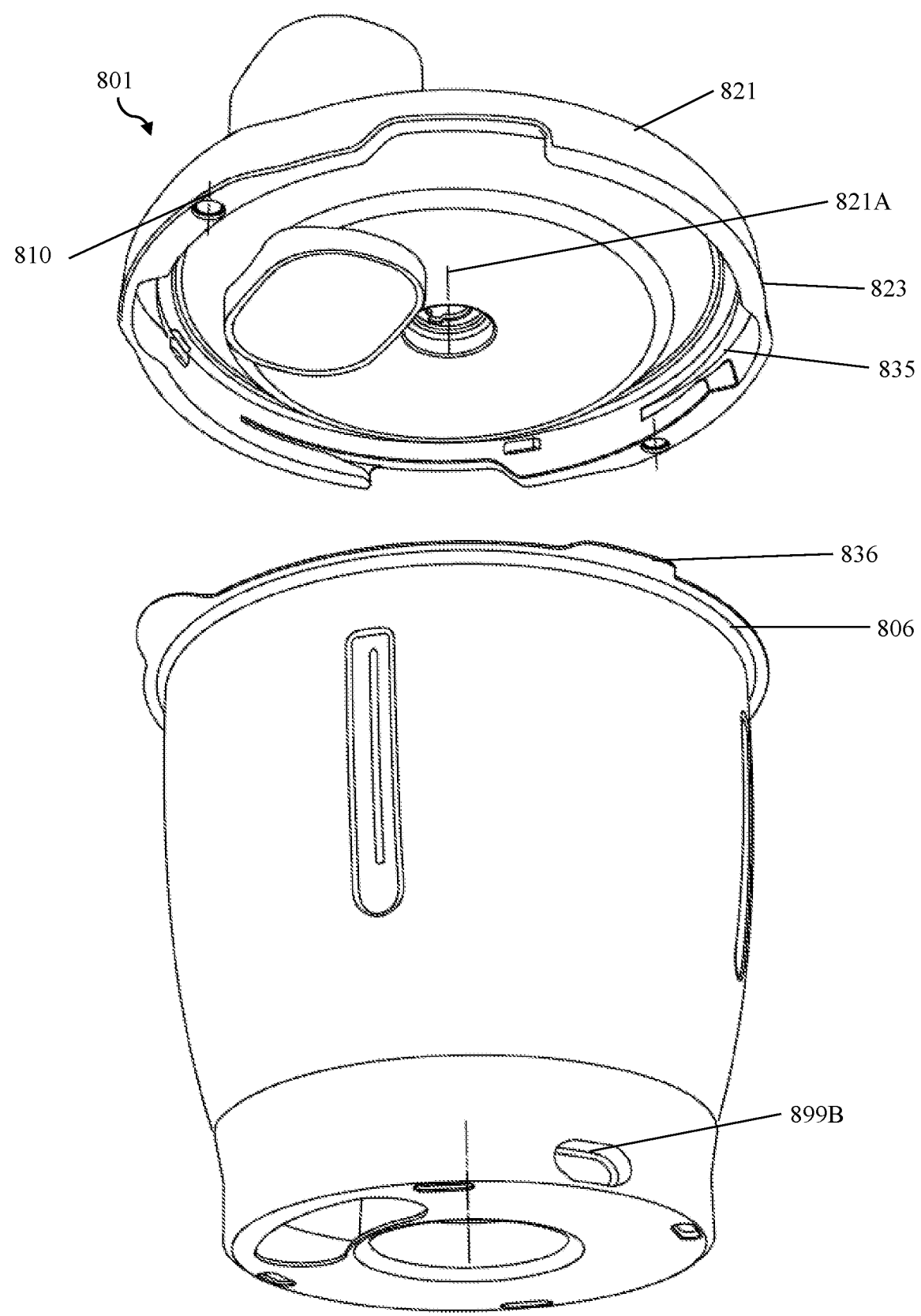
FIG. 71 is a detailed perspective view of a kitchen device having a locking mechanism according to a ninth embodiment of the invention.
Figure 72:
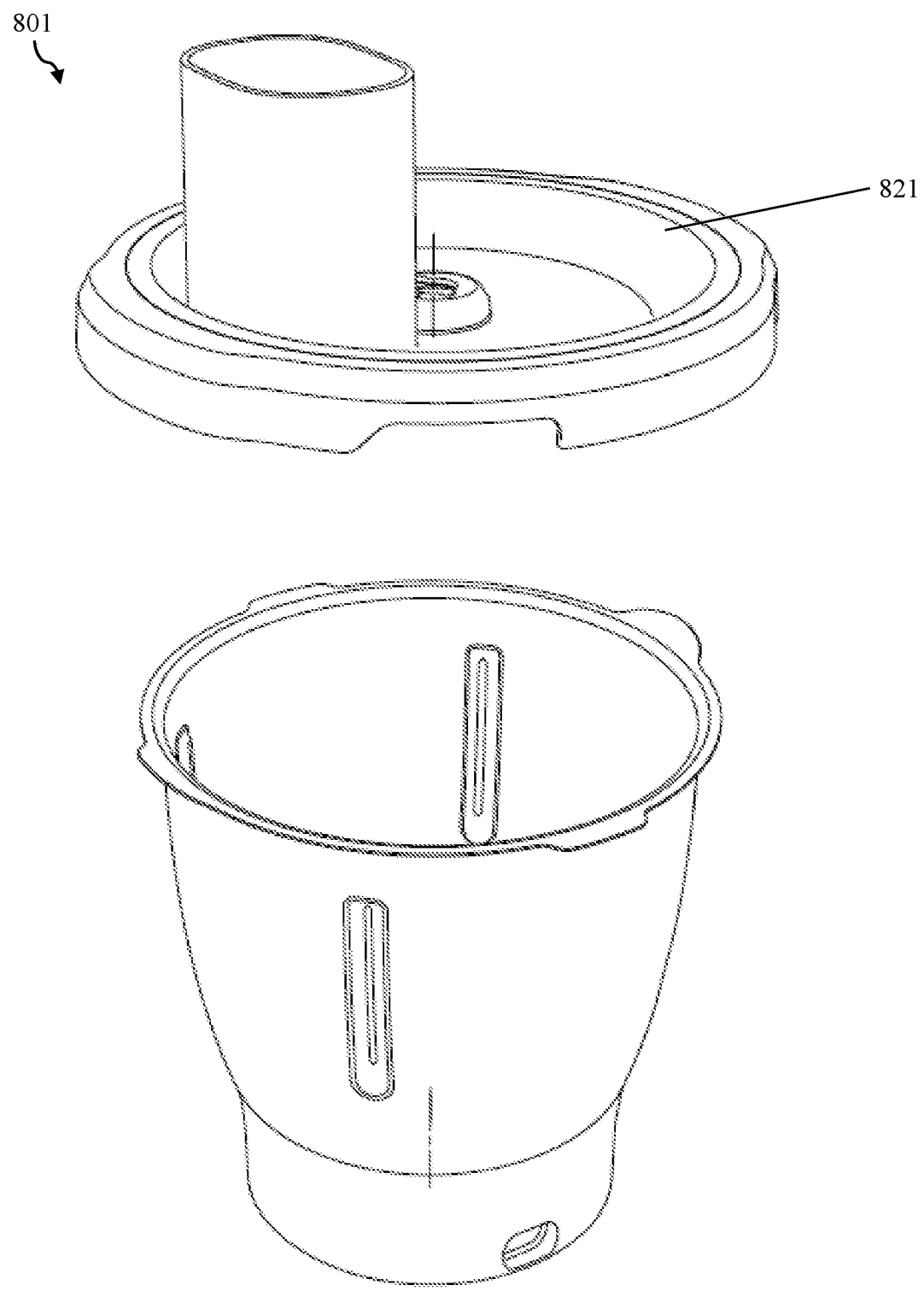
FIG. 72 is a further detailed perspective view of the kitchen device of FIG. 71.
Figure 73:
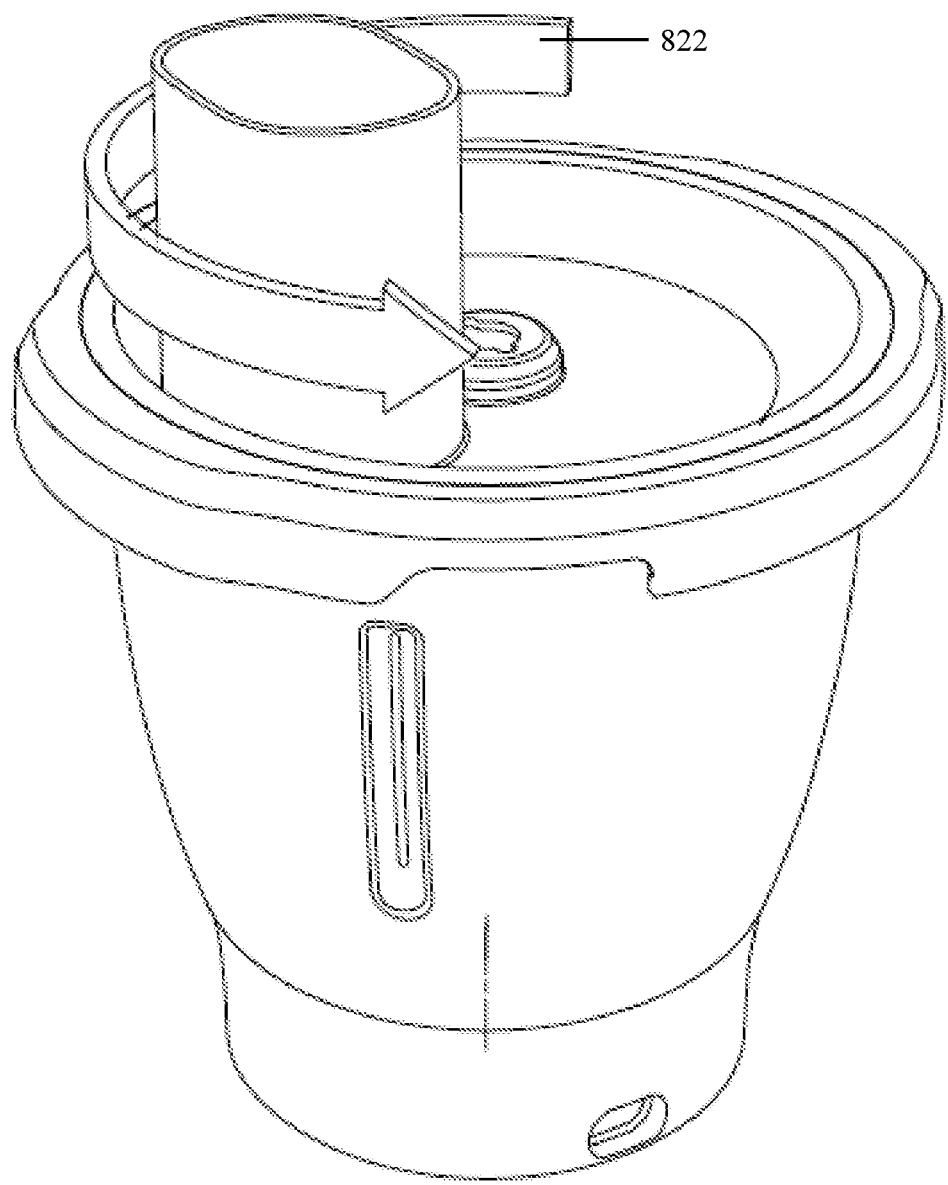
FIG. 73 is a detailed perspective view of the kitchen device of FIG. 71 in a second configuration.

However, as shown in FIG. 71, the locking mechanism 804 includes the lid 821 that is placed on the vessel 805. The lid 821 has four lid recesses 835 located on the lid rim 823 that are each adapted to receive a protrusion 836 located on a vessel rim 806 of the vessel 805. The lid 821 is movable between a free position, as shown in FIG. 73, and a locked position by pivoting the lid 821 about a lid axis 821A in a first lid direction 822. The lid rim 823 has an aperture 810. The aperture 810 is located such that, when the lid 821 is in the locked position, the aperture 810 is co-axial with the securing pin 809.

Figure 76:
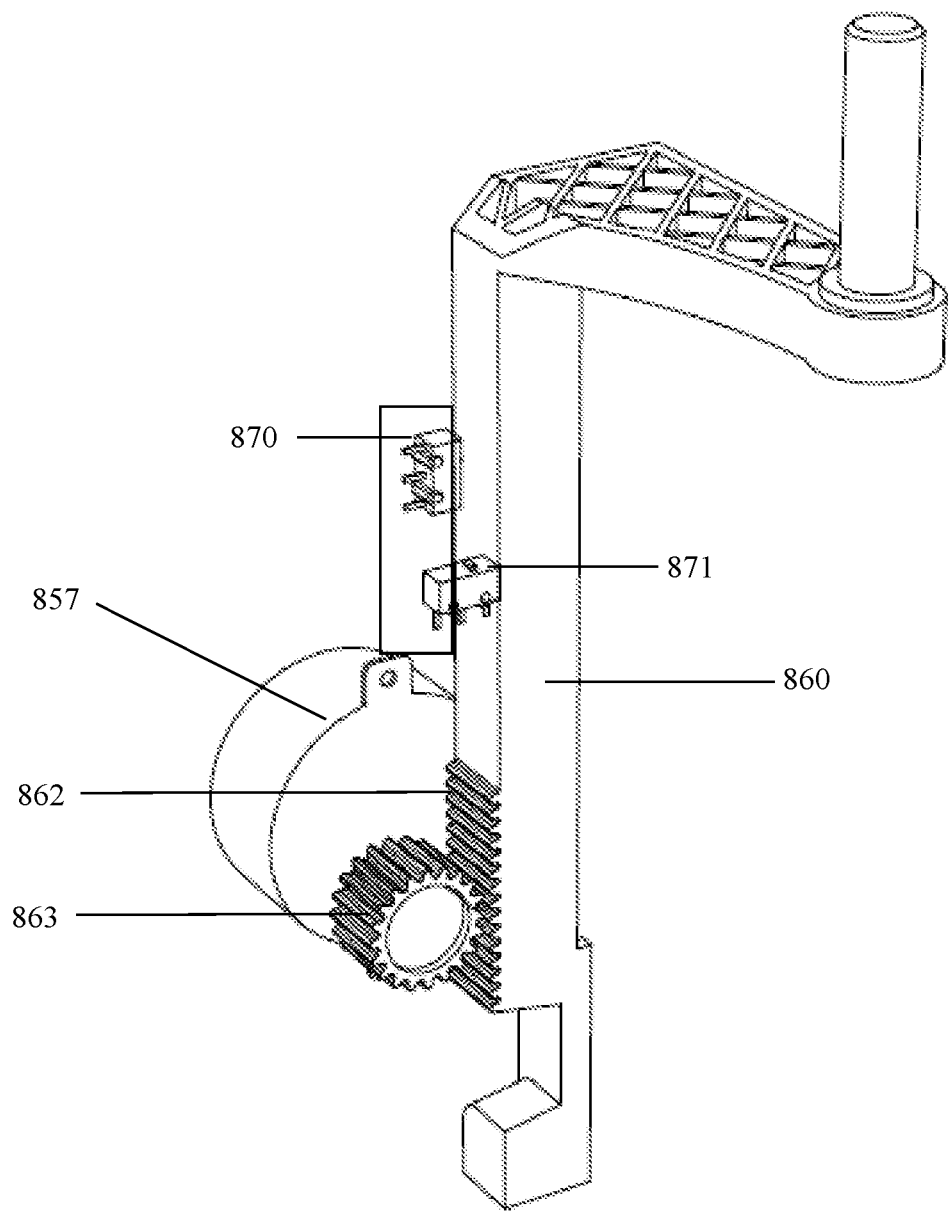
FIG. 76 is a detailed perspective view of a securing pin, moving member, and securing motor of the kitchen device of FIG. 71.

The securing pin 809 is generally vertical and generally perpendicular relative to the lid 821. The securing pin 809 is mounted on a moving member 860. As best seen in FIG. 76, the moving member 860 has a rack feature 862. The rack feature 862 is engaged by a pinion gear 863. The pinion gear 863 is driven by a securing motor 857 between a free position and a securing position, thus moving the moving member 860 between a free position shown in FIG. 74 and a securing position shown in FIG. 75 in the moving member direction 861. The moving member 860 also has a projection 869 adapted to actuate a first moving member position switch 870 when the moving member 860 is in the securing position. Further the projection 869 is adapted to actuate a second moving member position switch 871 when the moving member 860 is in the free position.

The first moving member position switch 870 is oriented parallel to the moving member direction 861 such that the moving member 860 can continue movement in the moving member direction 861 once the moving member position switch 870 has been actuated. The second moving member position switch 871 is oriented parallel to the moving member direction 861 such that the moving member 860 is prevented from moving once the second moving member position switch 871 has been actuated.

Figure 77:
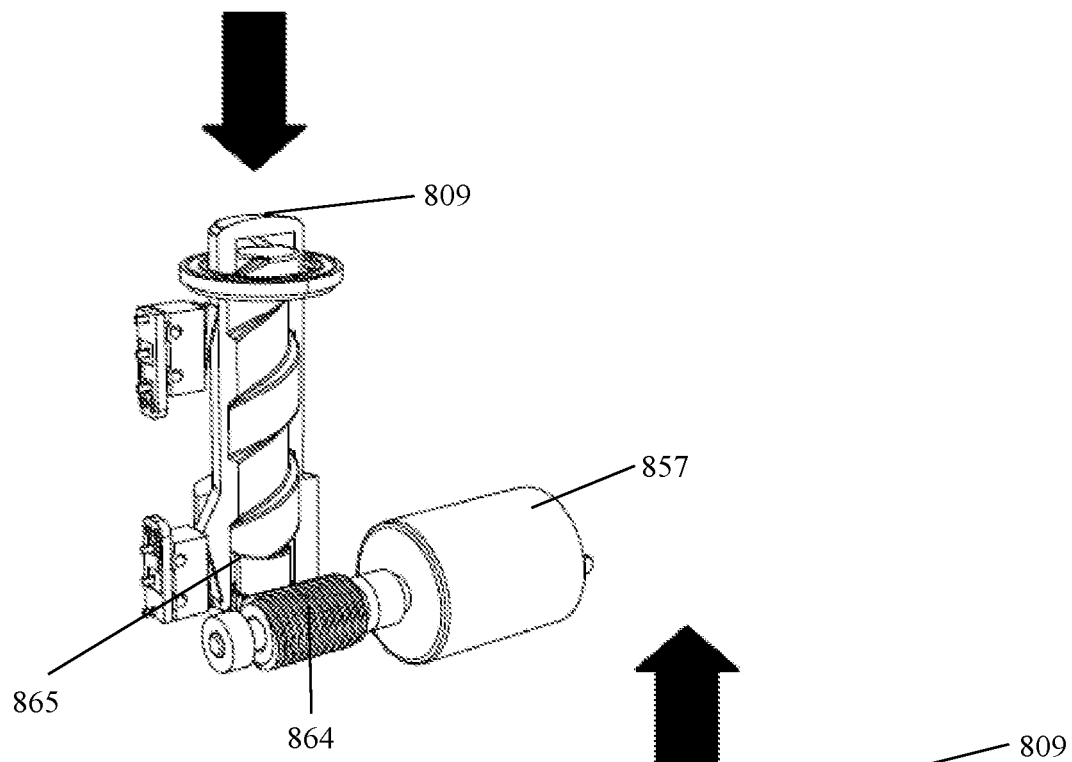
FIG. 77 is a detailed cutaway perspective view of an alternative construction of the kitchen device of FIG. 71.
Figure 78:
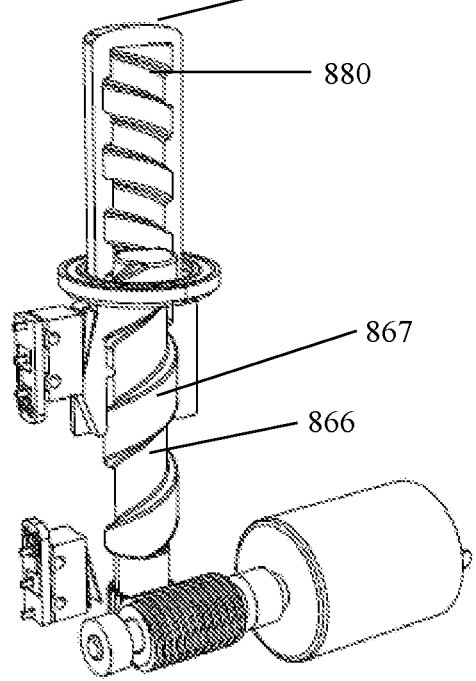
FIG. 78 is a detailed cutaway perspective view of the kitchen device of FIG. 77 in the configuration of FIG. 75.

FIGS. 77 and 78 show an alternative contemplated configuration of the securing pin 809, wherein the securing pin 809 is hollow. An internal surface 880 of the securing pin 809 is profiled in the form of a thread. The securing motor 857 drives a worm gear 864 that engages a pinion gear 865 located on a shaft 866. The shaft 866 has an external surface 867 profiled in the form of a thread to match the profile of the internal surface 880. As the shaft 866 rotates, the securing pin 809 is moved between a free position, as shown in FIG. 77, and a securing position, as shown in FIG. 78, driven by the engagement between the internal surface 880 and the external surface 867.

Figure 79:
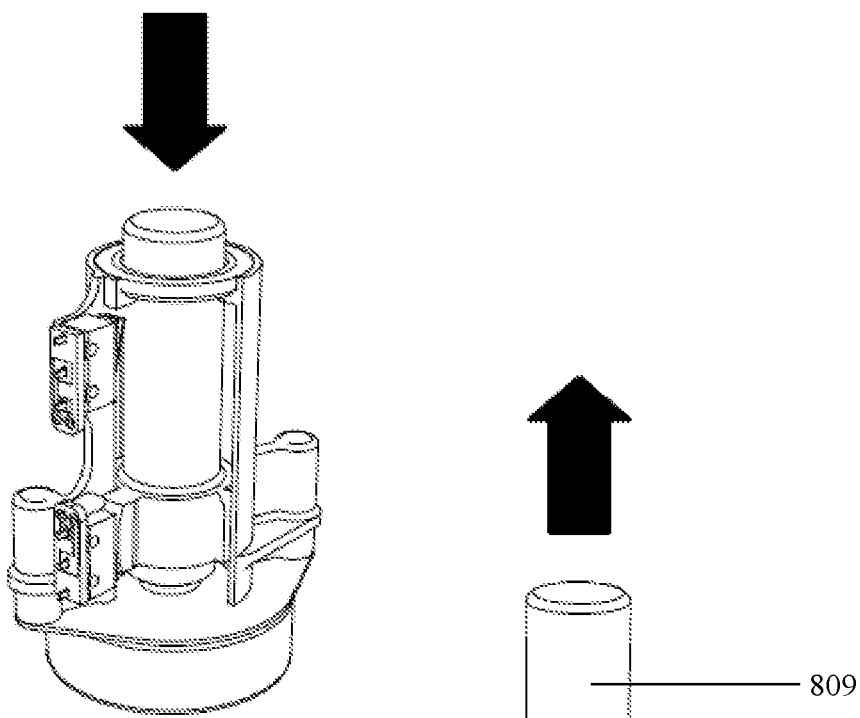
FIG. 79 is a detailed cutaway perspective view of a further alternative construction of the kitchen device of FIG. 71.
Figure 80:
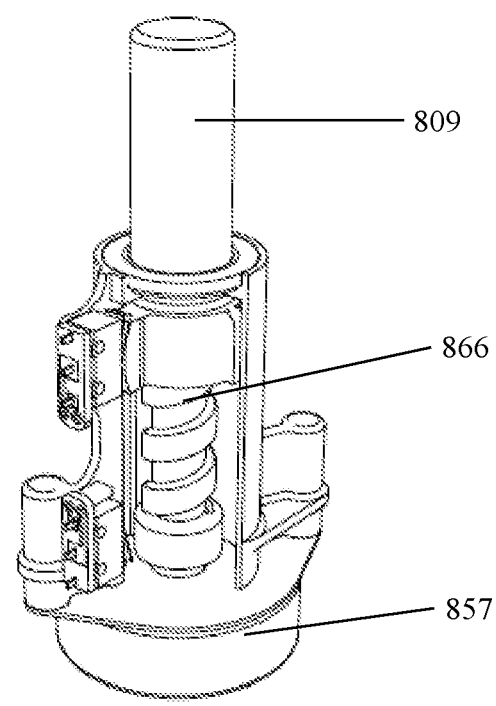
FIG. 80 is a detailed cutaway perspective view of the kitchen device of FIG. 79 in the configuration of FIG. 75.

FIGS. 79 and 80 show an alternative configuration of the securing pin 809, substantially similar to the securing pin 809 of FIGS. 77 and 78. However, in this configuration the shaft 866 is directly driven by a synchronous securing motor 857.

Figure 81:
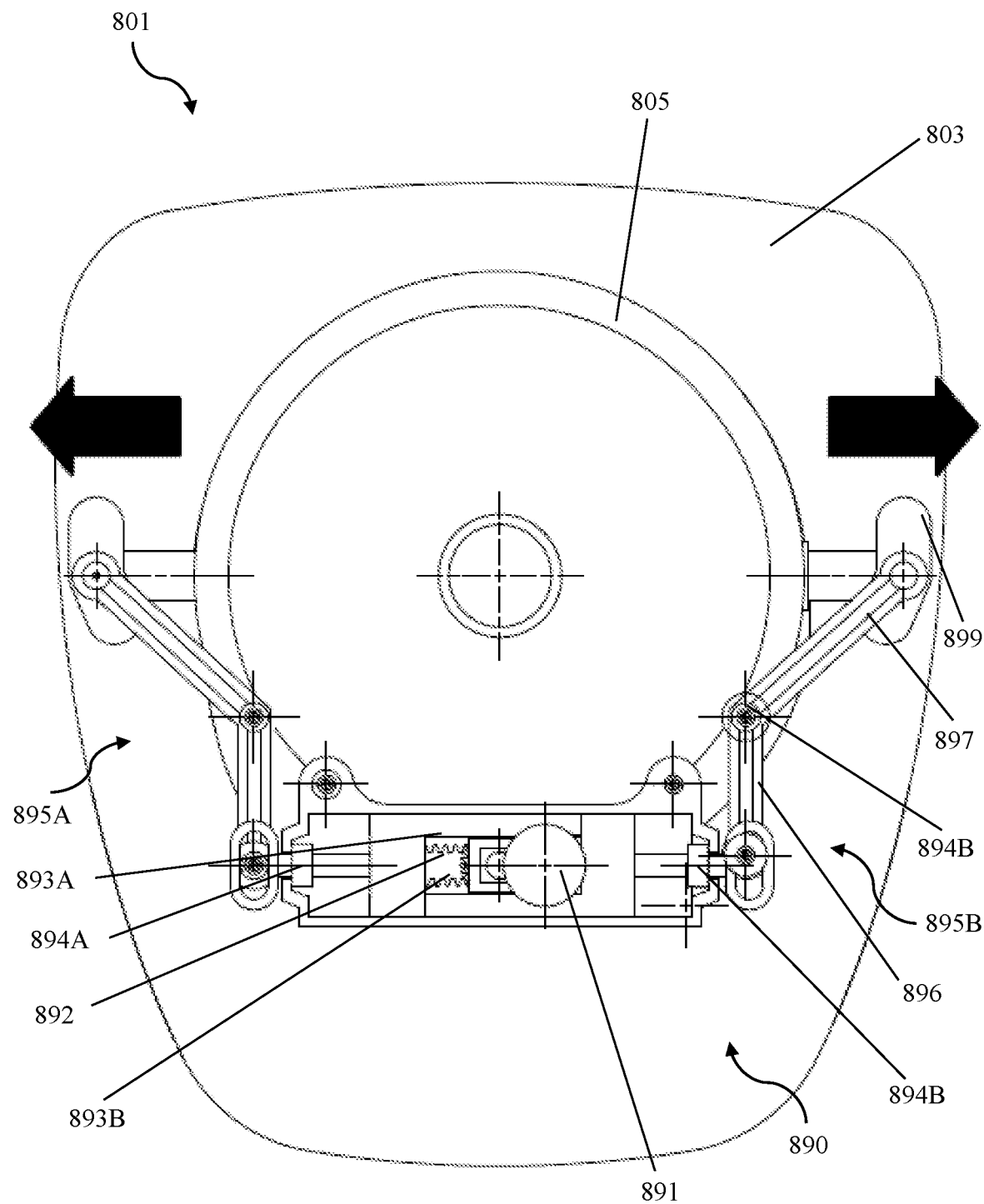
FIG. 81 is a detailed bottom section view of the kitchen device of FIG. 71.
Figure 82:
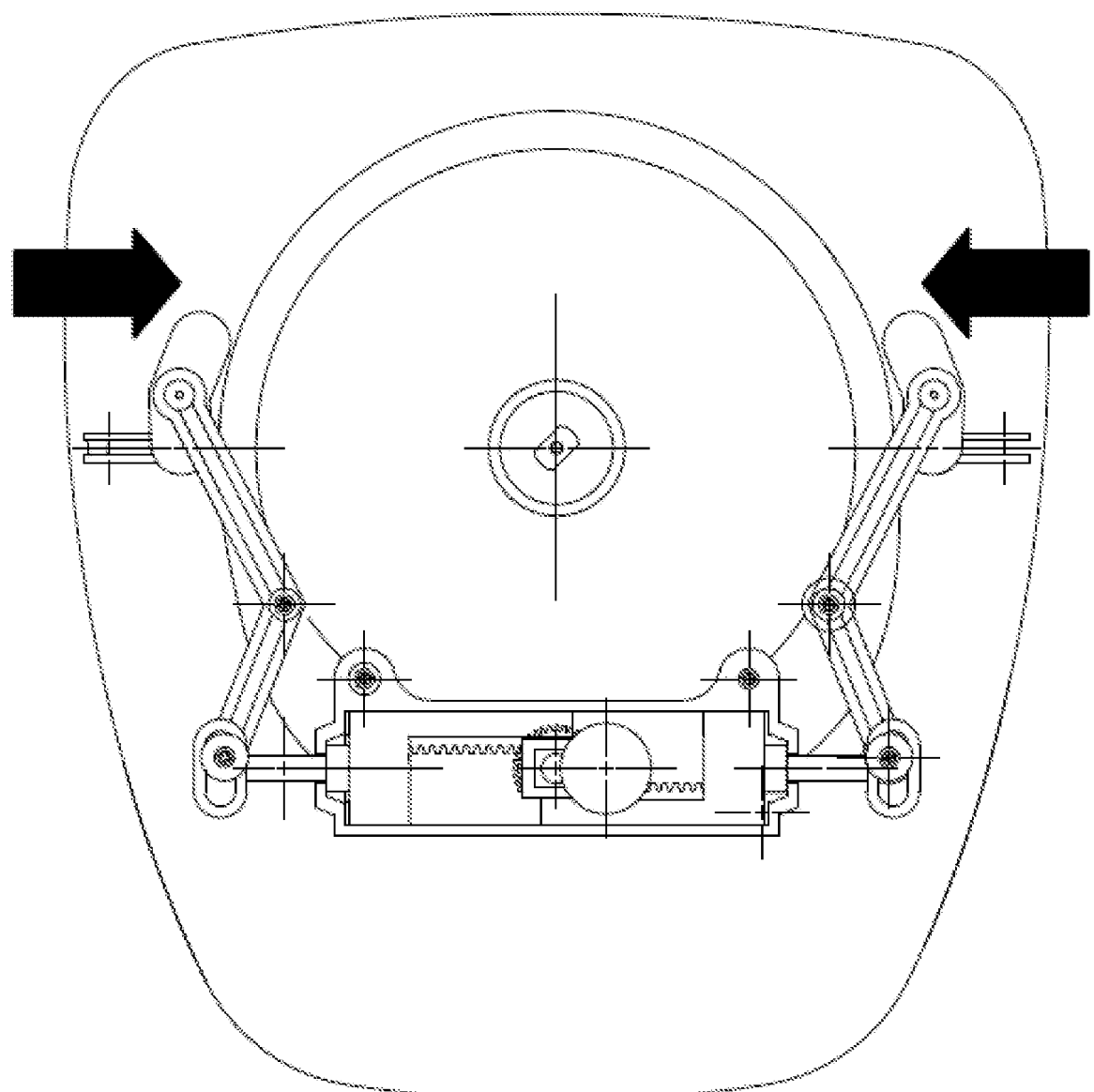
FIG. 82 is a detailed bottom section view of the kitchen device of FIG. 72 in a fourth configuration.
Figure 83:
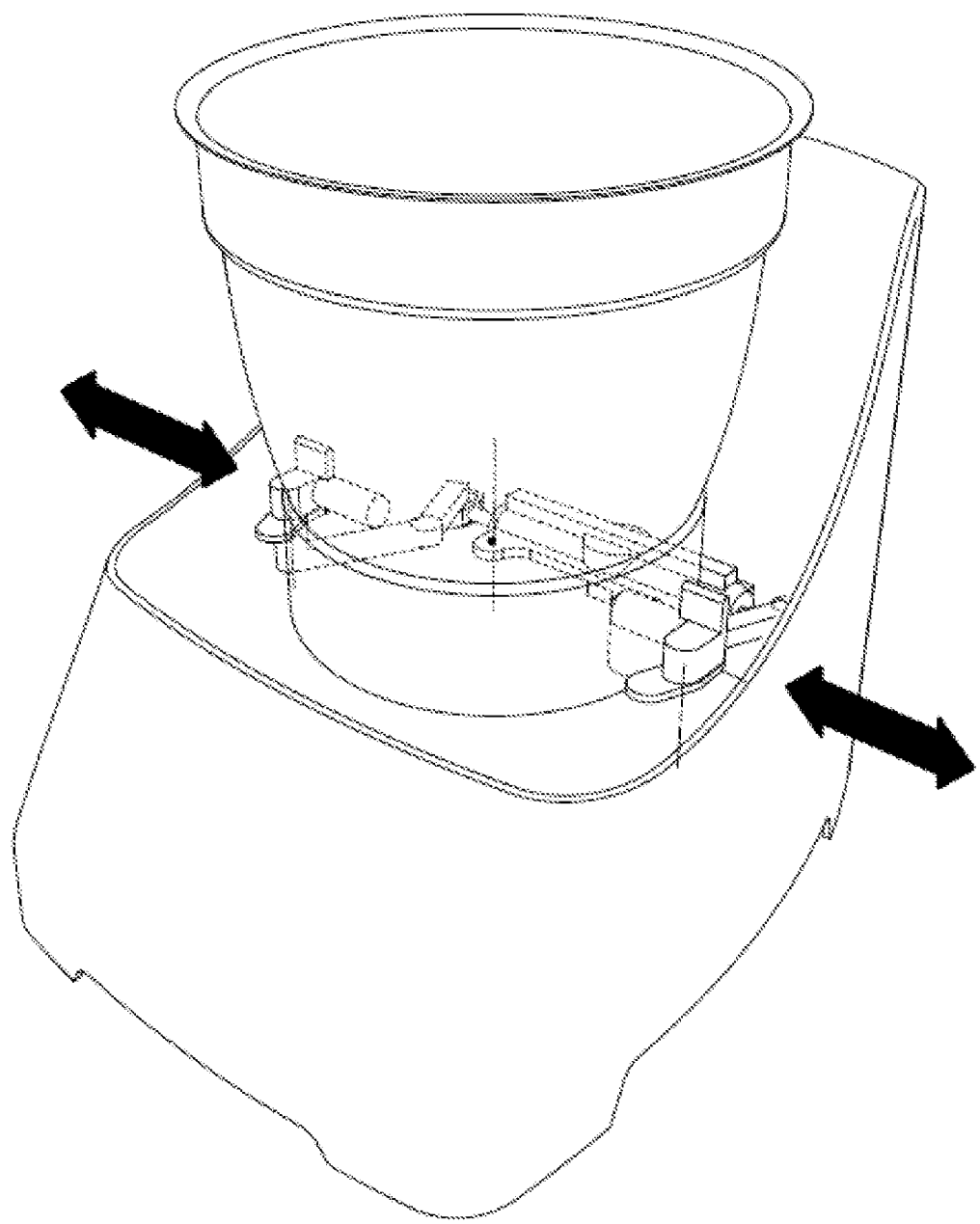
FIG. 83 is a detailed perspective view of the kitchen device of FIG. 72.

FIGS. 81 to 83 show a secondary securing mechanism 890 to retain the vessel 805 against the body 803. The secondary securing mechanism 890 includes a secondary securing motor 891 driving a pinion gear 892. The pinion gear 892 engages a first and second pinion rack 893*a*, 893*b*. The first and second pinion racks 893*a*, 893*b* engage the pinion gear 892 diametrically opposite each other such that rotation of the pinion gear 892 causes opposite and mirrored linear movement of the pinion racks 893*a*, 893*b*.

The pinion racks 893*a*, 893*b* are attached to respective driving arms 894*a*, 894*b*. Each driving arm 894*a*, 894*b* is connected to a retaining linkage 895*a*, 895*b*. The retaining linkages 895*a*, 895*b* each includes a first and second linkage member 896, 897 and a pivot joint 898 hingedly connecting the first and second linkage members 896, 897. A secondary securing member 899 is located at an end of the second linkage member 897. The secondary securing member 899 is movable between a free position, as shown in FIG. 81, and a securing position, as shown in FIG. 82. The movement of the secondary securing member 899 between the free position and the securing position is caused by operation of the secondary securing motor 891.

As shown in FIG. 83, when the secondary securing member 899 is in the securing position, each secondary securing member 899 engages a securing hold 899*b* located in a lower portion of the vessel 805, best seen in FIG. 71. The vessel 805 is thus securely retained against the body 803 of the kitchen device 801. When the secondary securing member 899 is in the free position, the vessel 805 may be removed from the body 803.

Use of the kitchen device 1 will now be discussed.

To use the kitchen device 1, the vessel 5 is connected to the body 3 of the kitchen device 1, as shown in FIGS. 1 to 9. Ingredients to be processed are placed inside the vessel 5 and the lid 21 is placed atop the vessel 5. As shown in FIG. 7, the retaining arm 7 is moved manually by the user from the free position to the retaining position. The channels 41 of the retaining arm 7 engage the contact edges 33, guiding edges 35 stop edges 31 of the lid 21, thereby retaining the lid 21 in place atop the vessel 5. The notch 36 provides tactile feedback to the user that the retaining arm 7 is in the retaining position. The lid detection switches 43 are actuated by the contact edges 33 and communicate with the processor to indicate that the lid 21 is present on the vessel 5. The processor now checks whether the retaining arm position switch 40 is also actuated, indicating that the retaining arm 7 is in the retaining position.

Figure 10:
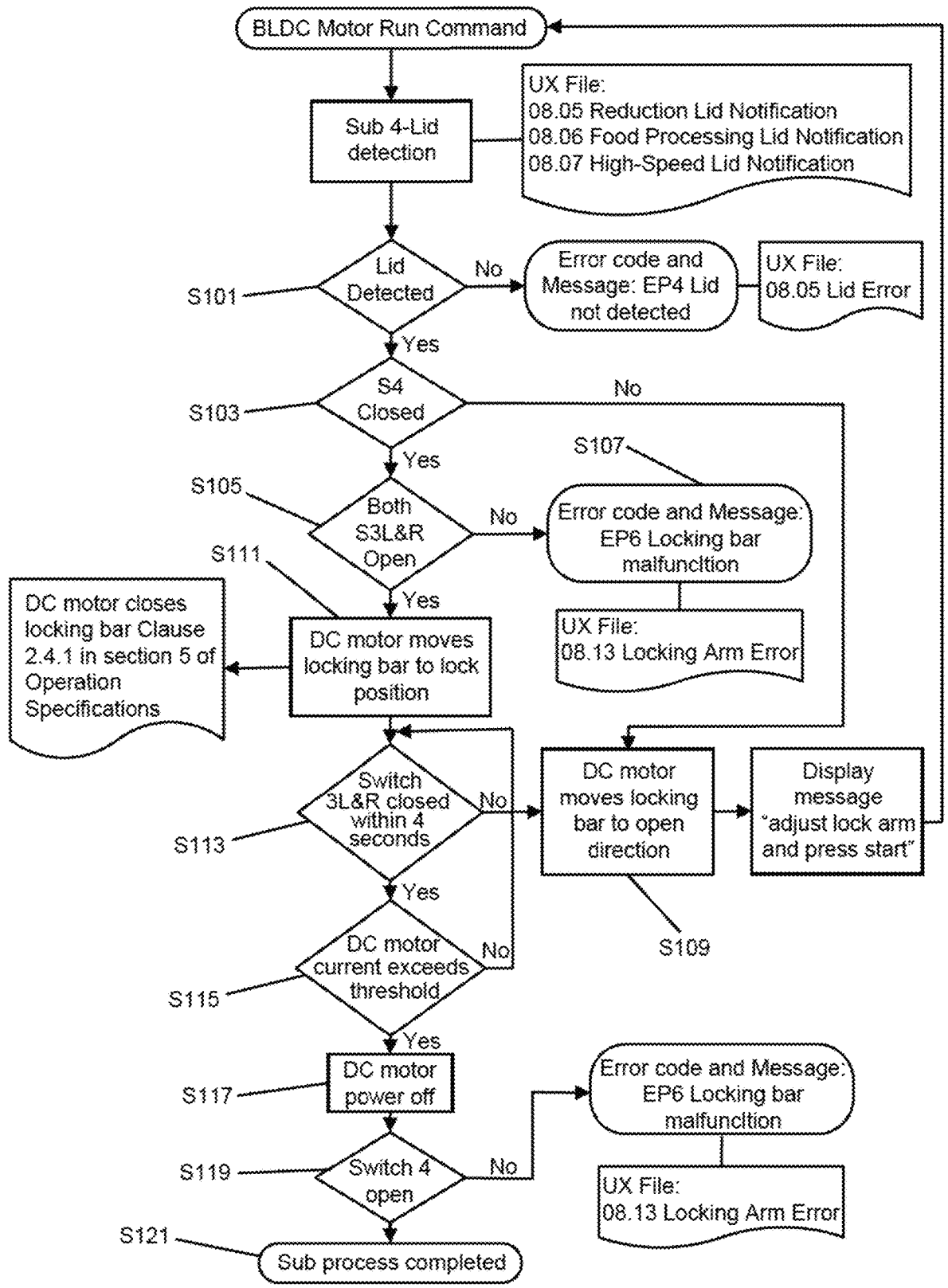
FIG. 10 is a schematic flowchart describing functionality of the kitchen device of FIG. 1.

As shown in FIG. 10, the actuation of the lid detection switches 43 and retaining arm position switch 40, at step S101, starts a lid securing process. The processor determines, at step S103, whether the bridge member position switch 70 is actuated, indicating that the bridge member 69 is in the lower position. The processor also determines, at step S105, whether both hook position switches 59 are actuated, which would indicate that at least one, or in at least one embodiment both, of the securing hooks 9 is in the securing position. If the bridge member 69 is not indicated to be in the lower position, the processor, at step S109, operates the securing motor 57 using the securing motor controller to move the bridge member 69 to the lower position. If the bridge member 69 is indicated to be in the lower position and one of the securing hooks 9 is indicated to be in the securing position, the processor, at steps S107 outputs a warning signal via a user interface (not shown) and ceases further activity.

If the bridge member 69 is indicated to be in the lower position and the securing hooks 9 are not indicated to be in the securing position, the processor, at step S111, operates the securing motor 57 using the securing motor controller. The securing motor 57 operates the reduction gear train 61 such that the shaft 60 rotates in a first motor direction 58, as shown in FIG. 8. The rotation of the shaft 60 is transmitted via the bevel gears 62, 63, which are attached to the reduction gear train 61, to the linear screw 65. As the linear screw 65 is axially constrained by the retainers 66*a*, 66*b*, rotation of the linear screw 65 moves the bridge member 69 from the lower position to the higher position. As the bridge member 69 moves to the higher position, the end portions 75 of the bridge member 69 are also moved upwards, as shown in FIG. 9. Because the end portions 75 are connected to a respective second end portion 9*b* by the pivot joint 77, the securing hook 9 pivots about the second hinge 53 from the free position to the securing position, engaging the pin 49, as shown in FIG. 8.

The securing motor 57 continues to be operated by the processor. At step S113, the processor determines whether the hook position switches 59 are actuated within 4 seconds of the securing motor 57 having started operation. If the hook position switches 59 are not actuated within 4 seconds, the processor, at step S109 reverses the rotation direction of the securing motor 57 to move the bridge member 69 towards the lower position and reset the kitchen device.

If the hook position switches 59 are actuated within 4 seconds of the securing motor 57 having started operation, the processor, at step S115, monitors the current signal to determine whether the motor current drawn by the securing motor 57 exceeds a predetermined threshold. When the motor current exceeds the predetermined threshold, the processor, at step S117, ceases operation of the securing motor 57. The processor, at step S119, determines whether the bridge member 69 is not in the lower position, by polling the bridge member position switch 70. If the bridge member 69 is determined to not be in the lower position, the processor has determined, at step S121, that the lid securing process of the locking mechanism 4 has been completed. If the bridge member position switch 70 is actuated, the processor determines an error has occurred and outputs an error message via the user interface.

After completion of the locking process, the kitchen device 1 may be used.

The use of the kitchen device 101 will now be discussed.

Figure 85:
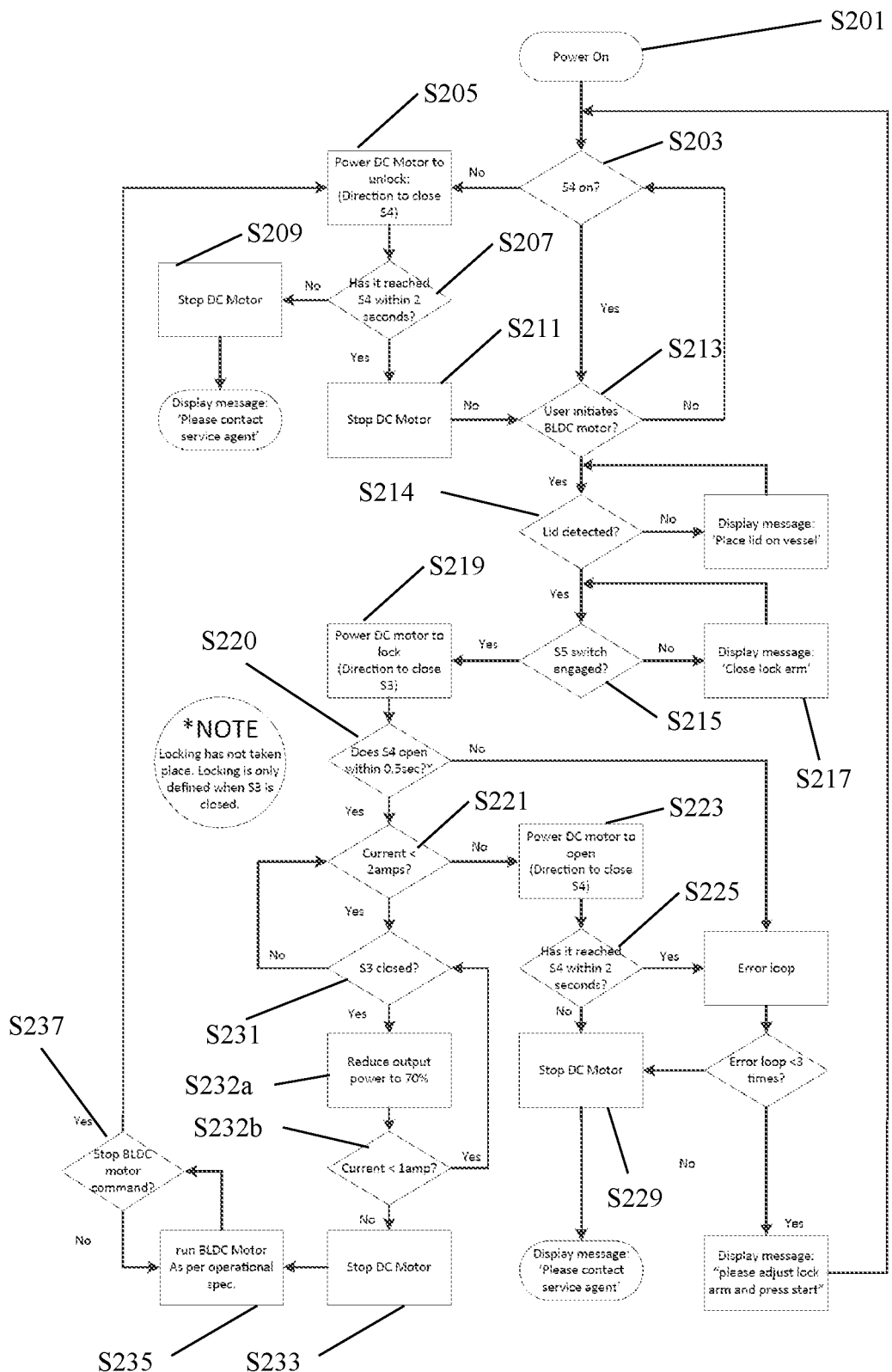
FIG. 85 is a schematic flowchart describing functionality of the kitchen device of FIG. 11.

To use the kitchen device 101, the power switch 102 is activated, step S201. As shown in FIG. 85, the processor determines, at step S203 whether the first blocking extrusion sensor 159*a* is activated, indicating that the blocking extrusion 109 is in the securing position. This may be the case if the retaining arm 107 is in the secured retaining position, or if the blocking extrusion 109 was erroneously moved to the securing position. Such a scenario may arise if the kitchen device 101 was deactivated while operating. If the first blocking extrusion sensor 159*a* is not activated, the processor proceeds to step S213: waiting for an operation to be selected.

If the first blocking extrusion sensor 159*a* is activated, the processor, at step S205, operates the securing motor 157 to pivot the crank 187, and thereby the blocking extrusion 109, from the securing position to the free position. The processor is adapted to determine, at step S207, whether the first blocking extrusion sensor 159*b* has been activated in a predetermined period of time, preferably 2 seconds, indicating that the crank 187 is in the free position. If the first blocking extrusion sensor 159*b* has not been activated within the predetermined period of time, the processor at step S209 stops operation of the securing motor 157 and displays an error message.

If the processor determines, at step S207, that it has received an indication from the first blocking extrusion sensor 159*b* that the blocking extrusion 109 is in the free position, the processor at step S211 ceases operation of the securing motor 157.

The vessel 105 is now connected to the body 103 of the kitchen device 101, as shown in FIG. 15. Ingredients to be processed are placed inside the vessel 105 and the lid 121 is placed atop the vessel 105 as shown in FIGS. 35 and 36. As shown in FIG. 36, the lid 121 rests on the rim 106 of the vessel 105 by the sealing lip 195 engaging the rim 106 of the vessel 105.

Figure 16:
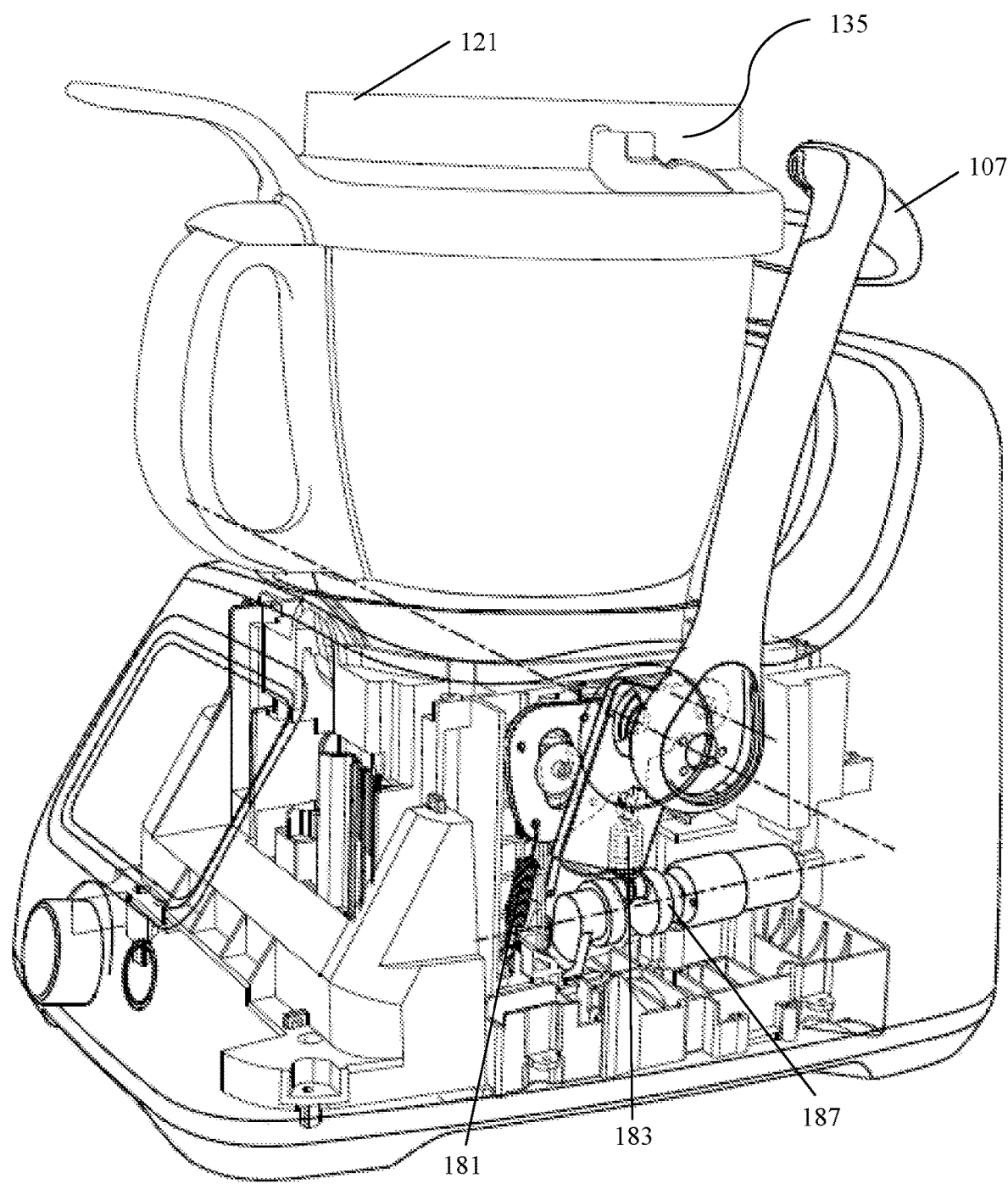
FIG. 16 is a perspective cut-away view of the kitchen device of FIG. 11.

As shown in FIGS. 16 and 18, the retaining arm 107 is moved manually by the user from the free position to the retaining position. The channels 141 of the retaining arm 107 engage the contact edges 133 and guiding edges 35 of the lid 121, thereby retaining the lid 121 in place atop the vessel 105. The engagement of the notch 135 with the protrusion 136 provides tactile feedback to the user that the retaining arm 107 is in the retaining position. As the retaining arm 107 is moved to the retaining position, it is urged upwards by the projections 127, which, in turn, moves the locking spring 181 from the predetermined state to the tensioning state. The locking spring 181 thus urges the bias plate 179 to pivot about the bias plate pin 178 such that the retaining arm 107 is urged into engagement with the lid 121 such that the lid 121 is urged towards the vessel 105. The bias plate 179 is prevented from buckling, and/or guided in its movement, by the bias plate guide pin 178. Thus, the lid 121 and vessel 105 are now under compression between the retaining arm 107 and the body 103.

As the lid 121 has been compressed against the vessel 105, the sealing lip 195 has moved along the rim 106 such that the seal 193 has two points of contact: a tip of the sealing lip 195, and a main body of the seal 193 compressed between the seal retaining member 194 and the rim 106 of the vessel 105.

An operation of the kitchen device 101 may now be selected at step S213. The processor then determines at step S214 whether the lid detection switches (not shown) in the channels 141 of the retaining arm 107 are actuated, indicating that the lid 121 is in position under the retaining arm 107. If the lid detection switches are not activated, the processor outputs a prompt to place the lid 121 on the vessel 105. The processor subsequently determines at step S215 whether the retaining arm position switch 140 is actuated, indicating that the retaining arm 107 is in the retaining position. In the case that the retaining arm position switch 140 is not actuated, the processor outputs a prompt, at step S217, to do move the retaining arm 107 to the retaining position.

If the processor determines that the retaining arm position switch 140 has been actuated, the processor, at step S219, operates the securing motor 157 to pivot the crank 187, and thereby the blocking extrusion 109, from the free position to the securing position.

The processor now determines at step S220 whether the first blocking extrusion sensor 159*b* has been de-activated in a predetermined period of time, indicating that the crank 187 is moving away from the free position. If this is not the case, the processor outputs an error message.

At step S221 the processor determines whether the current drawn by the securing motor is within a predetermined range, preferably under 2 Amperes. If the current is not within the predetermined range, the processor, at step S223, reverses operation of the securing motor 157 to pivot the crank 187 towards the free position. At step S225 the processor determines whether it has received an indication from the first blocking extrusion sensor 159*b* that the blocking extrusion 109 is in the free position within a predetermined period of time, preferable 2 seconds. If the indication has been received, the processor at step S229 ceases operation of the securing motor 157 and outputs an error message prompting the user to re-attempt the process from step S201. If the processor does not receive an indication that the blocking extrusion 109 is in the free position within the predetermined period of time, the processor ceases operation of the securing motor 157 and outputs an error message prompting the user to contact a service agent.

In a contemplated alternative, the processor may also, at step S225, determine a motor current drawn by the securing motor 157 to determine whether the securing motor 157, or drive mechanism 155, has a fault.

If, however, the processor determines that the current drawn by the securing motor 157 at step S221 remains within the predetermined range, the processor determines, at step S231 whether it has received an indication from the second blocking extrusion sensor 159*a* that the blocking extrusion 109 is in the securing position. Once the processor has determined that the blocking extrusion 109 is in the securing position the processor at step S232*a* decreases the power supply to the securing motor 157 to 70% of that previously supplied. The processor then, at step S232*b*, determines whether the current drawn by the securing motor 157 is within a second predetermined range, preferably lower than 1 Ampere. If the current drawn is within the second predetermined range the processor reverts to step S221 to determine whether the second blocking extrusion sensor 159*a* has been activated. This loop repeats until the processor determines, at step 232*b*, a securing motor current above the second predetermined range, indicating that the blocking extrusion 109 is firmly in the free position. The processor then, at step S233, stops operation of the securing motor 157 and, at step S235, commences the operation of the kitchen device 101 selected at step S213. The operation of the kitchen device 101 may be cancelled at step S237, which reverts the processor to step S205, thereby operating the locking mechanism 104 to move the blocking extrusion 109 to the free position, allowing the retaining arm 107 to be moved.

When the operation of the kitchen device 101 has finished, the user may desire to remove the lid 121 from the vessel 105. To allow the lid 121 to be removed from the vessel 105, the securing motor 157 is operated to pivot the crank 187 from the securing position to the free position. Thereby the restraining spring 183 is moved from the tensioning state to the predetermined state and the blocking extrusion 109 is moved from the securing position to the free position. The retaining arm 107 may now be moved against the resistance provided by the locking spring 181 from the retaining position against the free position. When the retaining arm 107 is in the free position, the lid 121 may be removed from the vessel 105, and/or the vessel 105 may be removed from the body 103.

Use of the kitchen device 201 will now be discussed, insofar as the use diverges from the use of the kitchen device 101.

When the processor, at step S219, operates the securing motor 257 to pivot the crank 287 from the free position to the securing position, the ledge 212 on the crank 287 pivots with the crank 287 and engages the latch 209 to move the latch 209 from the free position to the securing position.

When the processor, at steps S205 or S223, operates securing motor 257 to pivot the crank 287 from the securing position to the free position, the ledge 212 on the crank 287 pivots with the crank 287 and disengages the latch 209. The latch 209 is then urged by the latch spring 211 to move from the securing position to the free position.

Use of the kitchen device 301 will now be discussed, insofar as the use diverges from the use of the kitchen device 101.

At step S219, instead of operating a securing motor, the processor operates the solenoid 312 to exert force on the pin 309 to move the pin 309 from the free position to the securing position.

At step S205 or S223, instead of operating a securing motor, the processor operates the solenoid 312 to cease exerting a force on the pin 309. The pin 309 is then urged by a solenoid spring (not shown) to move from the securing position to the free position.

Alternatively, the solenoid spring may force the solenoid 312 to the securing position. In this case, at step S219, the processor operates the solenoid 312 to cease exerting force on the pin 309. The pin 309 is then urged by a solenoid spring (not shown) to move from the securing position to the free position. At step S219, the processor operates the solenoid 312 to exert force on the pin 309 to move the pin 309 from the securing position to the free position.

Use of the kitchen device 401 will now be discussed, insofar as the use diverges from the use of the kitchen device 101.

At steps S205 or S223, the processor operates the securing motor 457, which operates the reduction drive mechanism 455 causing a rotation of the worm gear 462b. The rotation of the worm gear 462b causes a rotation of the pinion gear 462a. As the pinion gear 462a is attached to the primary roller 460, the primary roller 460 rotates to decrease tension in the belt 465. The movement of the belt 465 is transmitted by the distribution rollers 463 to the tension rollers 466. The decreased tension in the belt 465, and the movement of the belt 465, moves the restraining springs 483 from the tensioning position to the free position.

At steps S203, S209, S229, and S231, instead of determining whether first or second blocking extrusion sensors have been activated, the processor determines whether, respectively, the first or second securing roller sensors 459a, 459b have been activated.

At step S219, the processor operates the securing motor 457, which operates the reduction drive mechanism causing a rotation of the worm gear 462b. The rotation of the worm gear 462b causes a rotation of the pinion gear 462a. As the pinion gear 462a is attached to the primary roller 460, the primary roller 460 rotates to increase tension in the belt 465. The movement of the belt 465 is transmitted by the distribution rollers 463 to the tension rollers 466. The increased tension in the belt 465, and the movement of the belt 465, moves the restraining springs 483 from the predetermined state to the tensioning state.

Use of the kitchen device 501 will now be discussed, insofar as the use diverges from the use of the kitchen device 101.

At steps S205 and S223, the processor operates the securing motor 557, which operates the reduction drive mechanism 555 causing rotation of the worm gear 562b. The rotation of the worm gear 562b causes a rotation of the pinion gear 562a. As the pinion gear 562a is attached to the securing hook 509, operation of the securing motor 557 causes the securing hook 509 to move from the securing position to the free position.

At step S219, the processor operates the securing motor 557, which operates the reduction drive mechanism 555 causing rotation of the worm gear 562b. The rotation of the worm gear 562b causes a rotation of the pinion gear 562a. As the pinion gear 562a is attached to the securing hook 509, operation of the securing motor 557 causes the securing hook 509 to move from the free position to the securing position.

The operation of the securing hook 509 to secure the retaining arm 507 in a secured retaining position is substantially identical to the operation of the securing hook 9 of the kitchen device 1.

Use of the locking mechanism 604 of the kitchen device 601 will now be discussed.

To use the kitchen device 601, the vessel 605 is connected to the body 603 of the kitchen device 601, as shown in FIG. 55A. Ingredients to be processed are placed inside the vessel 605 and the lid 621 is placed atop the vessel 605. As shown in FIG. 55A, the retaining arm 607 is moved manually by the user from the free position to the retaining position by actuating the toggle handle 611 in a toggle direction 616.

As the toggle handle 611 is moved in the toggle direction the first and second transverse member 614 creates a moment causing pivoting of the retaining arm 607 from the free position to the retaining position. Movement of the toggle handle 611 in the toggle direction 616 also moves the toggle mechanism from the free position shown in FIG. 55A towards the securing position shown in FIG. 56A.

Once the retaining arm 607 is in the retaining position, the toggle handle 611 is continued to be operated in the toggle direction 616 until the toggle mechanism 609 is in the securing position shown in FIG. 57A. This continued movement of the toggle handle 611 tensions the retaining arm 607 and compresses the lid 621 and vessel 605 between the retaining arm 607 and the body 603. When the toggle mechanism 609 is in the securing position, the toggle handle 611 is no longer operated.

Movement of the retaining arm 607 from the retaining position is prevented by the toggle mechanism 609 blocking movement of the extension arm 647. Thus, the retaining arm 607 is in the secured retaining position.

The kitchen device 601 may now be used.

Use of the kitchen device 701 will now be discussed, insofar as the use diverges from the use of the kitchen device 701.

At steps S205 and S223, the processor operates the securing motor 757, which causes rotation of the worm gear 762b. The rotation of the worm gear 562b causes a rotation of the pinion gear 762a. As the pinion gear 762a pivots it moves the tab 766 downwards, thereby urging the central yoke 767 downwards. As the central yoke 767 is retained in the rounded recesses 772 of the bridge member 769, the bridge member 769 is similarly urged downwards, and accordingly moves from the securing position to the free position. As the bridge member 769 is attached to the securing hook 709 by the pivot joints 777, the securing hook 709 similarly moves from the securing position to the free position. Additionally, as the bridge member 769 moves from the securing position to the free position, the central yoke 767 is allowed to rotate within the rounded recesses 772 about the first yoke axis 768A such that the tab 766 is not required to rotate about the first yoke axis 768A but remains substantially perpendicular to the first yoke axis 768A.

At step S219, the processor operates the securing motor 757, which causes rotation of the worm gear 762b. The rotation of the worm gear 762b causes a rotation of the pinion gear 762a. As the pinion gear 762a pivots it moves the tab 766 upwards, thereby urging the central yoke 767 upwards. As the central yoke 767 is retained in the rounded recesses 772 of the bridge member 769, the bridge member 769 is similarly urged upwards, and accordingly moves from the free position to the securing position. As the bridge member 769 is attached to the securing hook 709 by the pivot joints 777, the securing hook 709 similarly moves from the free position to the securing position. Additionally, as the bridge member 769 moves from the free position to the securing position, the central yoke 767 is allowed to rotate within the rounded recesses 772 about the first yoke axis 768A such that the tab 766 is not required to rotate about the first yoke axis 768A but remains substantially perpendicular to the first yoke axis 768A.

In the contemplated alteration shown in FIG. 70A, the rotation of the bevel gear 762b causes rotation of the bevel gear 762a which causes rotation of the screw 765. The rotation of the screw 765 in the threaded opening 766 causes axial translation of the yoke 767. The translation of the axial movement of the yoke 767 to the arcing movement of the securing hook 709 remains the same.

The operation of the securing hook 709 to secure the retaining arm 707 in a secured retaining position is substantially identical to the operation of the securing hook 9 of the kitchen device 1.

Use of the kitchen device 801 will now be discussed, insofar as the use diverges from the use of the kitchen device 101.

The vessel 805 is placed in the body 803 of the kitchen device 801. Ingredients to be processed are placed in the vessel 805 and the lid 821 is placed atop the vessel 805. The recesses of the lid 821 are located to receive the protrusions 836. The lid 821 is subsequently pivoted about the lid axis 821A to lock the lid 821 against the vessel 805. The processor (not shown) then actuates the securing motor 857 to move the securing pin 809 from the free position to the securing position. Before, during, or after the actuation of the securing motor 857 by the processor, the processor also actuates the secondary securing motor 891 to move the secondary securing members 899 from the free position to the securing position, whereby the securing members 899 engage the securing holds 899b in the vessel 805. The locking mechanism 804 is now in a secured retaining position and the kitchen device 1 may be used to process the ingredients.

To remove the lid 821 and access the processed ingredients, the processor actuates the securing motor 857 and the secondary securing motor 891, simultaneously or sequentially, allowing the lid 821 to be pivoted about the lid axis 821A and thereafter removed from the vessel 805.

Advantages of the kitchen devices 1, 101, 201, 301, 401, 501, 601 will now be discussed.

The position switches and sensors allow the processor to precisely, and deterministically, check whether the appropriate safety features, such as the retaining arm the securing feature, the lid, the locking mechanism are in their respective positions for safe operation.

The automatic locking process provided by the locking mechanism described above uses the detailed information regarding the positions of the components above to provide detailed feedback to the user of the kitchen device relating to error sources and operational status of the kitchen device, and the locking mechanism. Further, the ability to move the retaining arm to a free position well away from the lid allows clear, unrestricted access to the lid by the user, facilitating placement and removal of the lid.

The use of the securing motor that is separate from the main motor allows for electronic isolation for improved safety of the kitchen device. For example, the main motor is not allowed to operate unless the locking mechanism is in the secured retaining position.

The securing feature ensures, in the securing position, that the retaining arm is not accidentally moved from the locked position, which ensures that the lid remains on the vessel preventing an interruption to the cooking process, or a safety hazard.

The retaining arm contacts the on at least two contact areas, being channels. The retaining arm thereby retains the lid safely against the vessel in multiple degrees of freedom.

Further, the motor-drive moving parts of the locking mechanism, are all located inside the body of the kitchen device. This prevents potential injury to users as well as damage to the kitchen device that may arise by objects, or the user, being caught in the moving parts. Yet further, the connection between the recess and the retaining arm pin is also contained within the body preventing potential pinch injuries during the locking process.

Yet further, the belt drive allows versatility as to where the primary roller, distribution rollers, and tension rollers are located in the kitchen device. As the number of gears is also reduced, this leads to a reduction in operating noise emitted by the kitchen device.

Yet further, the use of a single securing motor entails significant cost savings.

Yet further, the use of a worm and pinion gear has the advantage that a reading of the current drawn by the securing motor allows the processor to determine when a particular securing load has been reached by the securing hook. As the control by the processor is determined on a load basis, the dimensional tolerances of the body. vessel, and lid are less important.

Yet further, the use of a central yoke allowing the bridge member to rotate when moving between the free position and the securing position allows a simpler and more space efficient design of the pivot joints and the second hinges, also due to the use of three pivot points (i.e. the yoke, the bridge, and the securing hook).

Yet further, the use of a secondary securing mechanism located towards a bottom of the vessel, allows portions of the locking mechanism to be hidden within the food processing device, decreasing the potential for pinching of the hands of a user, or the locking mechanism being contaminated with processed ingredients. Further, the separation of lid-locking mechanism and vessel retention mechanism allow the locking mechanism to operate invisibly to the user, which is aesthetically preferable.

The use of the retaining arm seal 134 with a concave portion 134a allows liquid to flow along the retaining arm seal 134, tending towards the lowest point 134b under the action of gravity, thereby being guided away from an interior of the body 103 and spilling along the outside of the device kitchen 101.

The use of the arm snap piece 139b results in decreased wear of the retaining arm seal 134, as the retaining arm 107 abuts the arm snap piece 139b, rather than the retaining arm seal 134. Yet further, if the arm snap piece 139b is made of plastic, movement that may be transmitted from the retaining arm 107 to the retaining arm seal 134 is transmitted by a plastic component, which results in decreased wear compared to the retaining arm 107, which may be made of metal, abutting directly against the retaining arm seal 134.

Although the invention has been described with reference to specific examples, it will be appreciated by those skilled in the art that the invention may be embodied in many other forms.

For example, instead, or in addition to, the bevel gears the drive mechanism could include a worm and gear set (not shown) such that the axes of rotations of the shaft and the linear screw are perpendicular.

The invention claimed is:

1. A locking mechanism for a kitchen device having a vessel, the vessel providing an interior space and having a rim surrounding an opening of the space, and a lid to engage the rim to close the space, the locking mechanism comprising:
   a retaining arm, the retaining arm being attachable to the device and movable between a free position, wherein the lid is movable with respect to the vessel, and a retaining position, wherein the retaining arm is engageable with the lid to retain the lid against the vessel to at least partly close the opening;
   a securing assembly, the securing assembly being attachable to the device to engage the retaining arm and movable between a free position, wherein the retaining arm may be moved between the free position and the retaining position, and a securing position, wherein the securing assembly engages the retaining arm to prevent movement of the retaining arm from the retaining position;
   a processor;
   an electric motor operated by the processor to move the securing assembly between the free position and the securing position,
   wherein the securing assembly comprises a securing member that pivots about a first axis between a free position and a securing position when the securing assembly moves between the free position and the securing position, and
   wherein the securing member comprises a restraint that, when the securing assembly is in the securing position, engages the retaining arm to secure the retaining arm in a secured retaining position.

2. The locking mechanism of claim 1, wherein, when the retaining arm is in the retaining position, the retaining arm is urged towards the vessel such that the lid is urged towards the vessel.

3. The locking mechanism of claim 2 further comprising a locking spring, wherein the retaining arm is urged towards the vessel by the locking spring, wherein the locking spring is in a predetermined state when the retaining arm is in the free position, and the locking spring is in a tensioning state relative to the predetermined state when the retaining arm is in the retaining position,
   wherein the movement of the retaining arm from the free position to the retaining position moves the locking spring from the predetermined state to the tensioning state.

4. The locking mechanism of claim 1, wherein the locking mechanism further comprises a securing sensor that communicates with the processor to indicate whether the securing assembly is in the securing position.

5. The locking mechanism of claim 1, wherein the locking mechanism further comprises a retaining sensor that communicates with the processor to indicate whether the retaining arm is in the retaining position.

6. The locking mechanism of claim 1, wherein the retaining arm further includes a lid sensor that communicates with the processor to indicate whether the lid is located on the vessel.

7. The locking mechanism of claim 1, wherein the securing assembly is, in use, located inside the kitchen device.

8. The locking mechanism claim 1, wherein the retaining arm includes a protrusion adapted to engage a recess in the lid when the retaining arm is moved in an arm direction from the free position to the retaining position.

9. A kitchen device having:
   a vessel, the vessel providing an interior space and having a rim surrounding an opening of the space;
   a lid to engage the rim to close the space; and the locking mechanism of claim 1.

10. The kitchen device of claim 9, wherein the lid has a recess located in a ramp that extends upwardly from the lid, the ramp sloping downwardly and towards the free position of the retaining arm, such that when the retaining arm is moved from the free position to the retaining position, the retaining arm engages the ramp and urges the lid against the vessel.

11. The kitchen device of claim 9, wherein the lid has a seal adapted to engage the vessel when the retaining arm is in the retaining position and thereby assisting to retain the lid against the vessel.

12. The kitchen device of claim 11, wherein the seal includes a sealing lip that engages a side wall of the vessel to seal the vessel, and wherein the sealing lip extends substantially parallel with a side wall of the vessel such that a normal force between the sealing lip and the side wall causes frictional resistance to removal of the lid from the vessel.

13. A locking mechanism for a kitchen device having a vessel and a lid, the locking mechanism comprising:
   a retaining arm movable between a free position and a retaining position;
   a securing assembly to engage the retaining arm and movable between a free position and a securing position; and
   an electric motor to move the securing assembly between the free position and the securing position,
   wherein the securing assembly comprises a securing member that pivots about a first axis between a free position and a securing position when the securing assembly moves between the free position and the securing position, and
   wherein the securing member comprises a restraint that, when the securing assembly is in the securing position, engages the retaining arm to secure the retaining arm in a secured retaining position.

14. The locking mechanism of claim 13, wherein the locking mechanism further comprises a processor adapted to control the electric motor using a motor controller.

15. The locking mechanism of claim 14, wherein the locking mechanism further comprises a first sensor that communicates with the processor to indicate whether the retaining arm is in the retaining position.

16. The locking mechanism of claim 14, wherein the locking mechanism further comprises a drive mechanism, wherein the electric motor moves the securing assembly using the drive mechanism, and wherein the drive mechanism comprises a bridge member converting a rotary motion of the electric motor to a linear motion of the bridge member.

* * * * *